US009682542B2

(12) United States Patent
Ohta et al.

(10) Patent No.: US 9,682,542 B2
(45) Date of Patent: Jun. 20, 2017

(54) METHOD FOR PRODUCING GRAPHITE FILM, METHOD FOR REWINDING SAME, AND METHOD FOR PRODUCING GRAPHITE COMPOSITE FILM AND GRAPHITE DIE-CUTTING PRODUCT

(71) Applicant: Kaneka Corporation, Osaka (JP)

(72) Inventors: Yusuke Ohta, Settsu (JP); Takashi Inada, Settsu (JP); Makoto Mishiro, Settsu (JP); Yasushi Nishikawa, Settsu (JP); Takashi Inada, Settsu (JP)

(73) Assignee: KANEKA CORPORATION, Osaka (JP)

( * ) Notice: Subject to any disclaimer, the term of this patent is extended or adjusted under 35 U.S.C. 154(b) by 1 day.

(21) Appl. No.: 14/971,765

(22) Filed: Dec. 16, 2015

(65) Prior Publication Data

US 2017/0106641 A1    Apr. 20, 2017

Related U.S. Application Data

(63) Continuation of application No. 13/579,961, filed as application No. PCT/JP2011/000810 on Feb. 14, 2011, now Pat. No. 9,249,024.

(30) Foreign Application Priority Data

Feb. 22, 2010   (JP) ................................. 2010-035865

(51) Int. Cl.
  *C01B 31/00*    (2006.01)
  *B65H 18/08*    (2006.01)
  (Continued)

(52) U.S. Cl.
  CPC ............... *B32B 37/20* (2013.01); *B32B 7/12* (2013.01); *B32B 9/007* (2013.01);
  (Continued)

(58) Field of Classification Search
  CPC ......... C01B 31/00; C01B 31/04; B65H 18/08; B65H 35/02; B65H 35/04
  (Continued)

(56) References Cited

U.S. PATENT DOCUMENTS 4,369,083 A * 1/1983 Ahmed ............. B29C 66/81453
                                                  156/307.3
5,192,605 A * 3/1993 Mercuri ................... B32B 7/12
                                                     428/408

(Continued)

FOREIGN PATENT DOCUMENTS

JP    63-256508    10/1988
JP    65-256508    10/1988
      (Continued)

OTHER PUBLICATIONS

International Search Report, International Application No. PCT/JP2011/000810, 4 pgs., Mar. 15, 2011.
(Continued)

*Primary Examiner* — Daniel C McCracken
(74) *Attorney, Agent, or Firm* — Kagan Binder, PLLC

(57) ABSTRACT

A graphite film showing an extremely low average tearing force is more likely to suffer from various kinds of defects, such as splitting, winding deviation, wrinkling, and poor dimensional accuracy, in a step of producing the graphite film and in a step of processing the graphite film. However, these defects can be prevented by using a graphite film that satisfies the following requirements: 1) having an average tearing force of not more than 0.08 N as determined by Trouser tear method in accordance with JIS K7128; and 2) having sag of not less than 5 mm and not greater than 80 mm as determined by a method of film windability evaluation in accordance with JIS C2151.

20 Claims, 20 Drawing Sheets

(51) Int. Cl.

| | | |
|---|---|---|
| *B32B 37/20* | (2006.01) | |
| *B32B 9/00* | (2006.01) | |
| *B32B 7/12* | (2006.01) | |
| *B32B 37/00* | (2006.01) | |
| *B32B 38/10* | (2006.01) | |
| *B32B 37/12* | (2006.01) | |
| *B32B 38/18* | (2006.01) | |

(52) U.S. Cl.
 CPC .......... *B32B 37/0053* (2013.01); *B32B 37/12* (2013.01); *B32B 38/10* (2013.01); *B32B 38/18* (2013.01); *B32B 2250/02* (2013.01); *B32B 2313/04* (2013.01)

(58) Field of Classification Search
 USPC ......... 242/525, 520, 526; 156/185; 264/239, 264/29.1
 See application file for complete search history.

(56) References Cited

U.S. PATENT DOCUMENTS

| | | | |
|---|---|---|---|
| 5,198,063 | A | 3/1993 | Howard et al. |
| 5,830,809 | A | 11/1998 | Howard et al. |
| 6,270,083 | B1 | 8/2001 | Hirschvogel et al. |
| 2001/0045261 | A1* | 11/2001 | Mercuri .................... B32B 9/00 156/324 |
| 2008/0050305 | A1 | 2/2008 | Nishikawa et al. |

FOREIGN PATENT DOCUMENTS

| | | |
|---|---|---|
| JP | 6-024872 | 2/1994 |
| JP | 8-143307 | 6/1996 |
| JP | 2000-081143 | 3/2000 |
| JP | 2000-169125 | 6/2000 |
| JP | 2000-178016 | 6/2000 |
| JP | 2001-26411 | 1/2001 |
| JP | 2003-127267 | 5/2003 |
| JP | 2005-60204 | 3/2005 |
| JP | 2006-44999 | 2/2006 |
| JP | 2006-327907 | 12/2006 |
| JP | 2007-261087 | 10/2007 |
| JP | 2008-168542 | 7/2008 |
| JP | 2009-190962 | 8/2009 |
| JP | 2009-235231 | 10/2009 |
| JP | 2010-001191 | 1/2010 |

OTHER PUBLICATIONS

English-language translation of the International Preliminary Report on Patentability (Ch. I), PCT Application No. PCT/JP2011/000810, 6 pgs., Mar. 15, 2011.

Notice of Allowance, U.S. Appl. No. 13/579,961, 7 pgs., Sep. 22, 2015.

* cited by examiner x (CD Direction)
y (MD Direction)

301　　　　　　　　　　　302

361

362

METHOD FOR PRODUCING GRAPHITE FILM, METHOD FOR REWINDING SAME, AND METHOD FOR PRODUCING GRAPHITE COMPOSITE FILM AND GRAPHITE DIE-CUTTING PRODUCT

This application is a continuation of U.S. application Ser. No. 13/579,961, which was filed on Sep. 9, 2012, which in turn is a national stage entry of International Application No. PCT/JP2011/000810, which was filed on Feb. 22, 2010, wherein the entireties of said patent applications are incorporated herein by reference.

TECHNICAL FIELD

The present invention relates to a graphite film having a low average tearing force, a graphite composite film, and a graphite die-cutting product.

BACKGROUND ART

Graphite films are characterized by lower tearing strength, as compared to typical plastic films and other films. Graphite films are classified into: graphite films (also referred to as "natural graphite sheets") produced by an expanding method; and graphite films (also referred to as "fired polymer-derived graphite film") produced by polymer thermal decomposition.

Most of the natural graphite sheets have tearing strength (average tearing force) of about 0.1 N. This is because typical natural graphite sheets have molecular structures in which the degree to which molecules of the graphite film are uniformly oriented in parallel to a planar direction of the film is not high. On the other hand, in the case of the fired polymer-derived graphite films, their molecular structures are such that the molecules of graphite are more uniformly oriented in parallel to its planar direction with film designing intended to enhance the performance of the graphite film in its planar direction. Therefore, the fired polymer-derived graphite films cannot resist shearing stress and thus have the tendency to show low tearing strength (average tearing force).

Graphite films can be processed with self-adhesive material layers, insulating films, other protective films, etc. into composite products. In such a stage of processing, graphite films having average tear strength suffer from defects such as splitting and winding deviation.

That is, graphite films have the problem that the occurrence of the defects in the stage of processing increasingly increases along with sophistication of the graphite films. In particular, this problem was serious for graphite films having average tearing force of not greater than 0.08 N.

A method for a reinforcing natural graphite sheet is disclosed in Patent Literature 1. According to this method, a natural graphite sheet and a thin film of thermoplastic polymer having a given softening temperature are laminated to each other as they are supplied between temperature controlled two calender rolls by a continuous method.

However, application of the technique disclosed in Patent Literature 1 to graphite films having average tearing force of not greater than 0.08 N causes the following problem. That is, the fired polymer-derived graphite film is split at the edges thereof, as shown in FIG. 18, before supplied between the two rolls. This results in the failure to laminate.

Further, a method for reinforcing a sheet-type, fired polymer-derived graphite film (This means a fired polymer-derived graphite film produced from polymer films in sheet form as a raw material. This term is used to distinguish from the fired polymer-derived graphite film produced from a roll of long polymer film as a raw material) is disclosed in Patent Literature 2. According to this method, the sheet-type, fired polymer-derived graphite film is reinforced by lamination to a sheet having a self-adhesive material by means of a laminator. However, application of the technique disclosed in Patent Literature 2 to graphite films having average tearing force of not greater than 0.08 N and having a length of not less than 1000 mm causes the following problem. That is, the fired polymer-derived graphite film is split at the edges thereof, as shown in FIG. 18, before supplied between the two rolls. This results in the failure to laminate.

For such an extremely weak graphite film showing an average tearing force of not greater than 0.08, it was a serious problem that defects (for example, occurrence of splitting, winding deviation, wrinkling, etc.) are caused in the processing step.

CITATION LIST

Patent Literatures

Patent Literature 1
Japanese Patent Application Publication, Tokukaihei, No. 6-024872 A
Patent Literature 2
Japanese Patent Application Publication, Tokukai, No. 2007-261087 A

SUMMARY OF THE INVENTION

Problems to be Solved by the Invention

An object of the present invention is to allow a graphite film having showing extremely low average tearing force to be processed with less defects caused in the processing step.

Means for Solving the Problem

That is, the present invention relates to a method (embodiment 1) for rewinding a graphite film, wherein a graphite film with the following features 1) and 2) wrapped around one roll is wound off and wound up around another roll, 1) having an average tearing force of not more than 0.08 N as determined by Trouser tear method in accordance with JIS K7128; and 2) having sag of not less than 5 mm and not greater than 80 mm as determined by a method of film windability evaluation in accordance 5 with JIS C2151.

The present invention relates to the method (embodiment 2) according to embodiment 1, wherein a value "a" obtained by subtracting (a depth of sag at a point 30 mm away from an outer edge of the film in a TD direction) from (a depth of sag at the outer edge of the film in the TD direction) is not less than 5 mm and not more than 50 mm.

The present invention relates to the method (embodiment 3) according to embodiment 1 or 2, wherein the graphite film has camber of not more than 10 mm, as determined by a method of film windability evaluation in accordance with JIS C2151.

The present invention relates to a method (embodiment 4) for producing a graphite film, comprising: a step of slitting the graphite film by means of a slitter from a time when the graphite film with the following features 1) and 2) wrapped around one roll is wound off until a time when the graphite film is wound up around another roll, 1) having an average tearing force of not more than 0.08 N as determined by Trouser tear method in accordance with JIS K7128; and 2) having sag of not less than 5 mm and not greater than 80 mm as determined by a method of film windability evaluation in accordance with JIS C2151.

The present invention relates to the method (embodiment 5) according to embodiment 4, wherein a value "a" obtained by subtracting (a depth of sag at a point 30 mm away from an outer edge of the film in a TD direction) from (a depth of sag at the outer edge of the film in the TD direction) is not less than 5 mm and not more than 50 mm.

The present invention relates to the method (embodiment 6) according to embodiment 4 or 5, wherein the graphite film has camber of not more than 10 mm, as determined by a method of film windability evaluation in accordance with JIS C2151.

The present invention relates to the method (embodiment 7) according to any one of embodiments 4 through 6, wherein the graphite film is a graphite film produced by undergoing a carbonization step of subjecting a polymer film to heat treatment, the polymer film being wrapped around a core, and the carbonization step comprises a vessel constituted by the core and an external cylinder that accommodates the core, the vessel having ventilation.

The present invention relates to the method (embodiment 8) according to any one of embodiments 4 through 6, wherein the graphite film is a graphite film produced by undergoing a carbonization step of subjecting a polymer film to heat treatment, the polymer film being wrapped around a core, and at least partially in the carbonization step, depressurization to a pressure in a range from −0.08 MPa to 0.01 kPa is carried out while an inert gas is supplied.

The present invention relates to the method (embodiment 9) according to any one of embodiments 4 through 6, wherein the graphite film is a graphite film obtained by a graphite film producing method comprising a graphitization step of subjecting a heat-treated film, which is a carbonized polymer film, to heat treatment at a temperature of not less than 2000° C., the heat-treated film being wrapped around a core, and the graphitization step comprises a tight wrapping step of tightly wrapping the heat-treated film around the core.

The present invention relates to a method (embodiment 10) for producing a graphite film, comprising: a step of compressing the graphite film during a period from a time when the graphite film with the following features 1) and 2) wrapped around one roll is wound off to completion of winding up the graphite film around another roll, 1) having an average tearing force of not more than 0.08 N as determined by Trouser tear method in accordance with JIS K7128; and 2) having sag of not less than 5 mm and not greater than 80 mm as determined by a method of film windability evaluation in accordance with JIS C2151.

The present invention relates to the method (embodiment 11) according to embodiment 10, wherein a value "a" obtained by subtracting (a depth of sag at a point 30 mm away from an outer edge of the film in a TD direction) from (a depth of sag at the outer edge of the film in the TD direction) is not less than 5 mm and not more than 50 mm.

The present invention relates to the method embodiment (12) according to embodiment 10 or 11, wherein the graphite film has camber of not more than 10 mm, as determined by a method of film windability evaluation in accordance with JIS C2151.

The present invention relates to the method (embodiment 13) 10 according to any one of embodiments 10 through 12, wherein the graphite film has a width of not less than 200 mm.

The present invention relates to the method (embodiment 14) according to any one of embodiments 10 through 13, wherein the graphite film is a graphite film produced by undergoing a carbonization step of subjecting a polymer film to heat treatment, the polymer film being wrapped around a core, and the carbonization step comprises a vessel constituted by the core and an external cylinder that accommodates the core, the vessel having ventilation.

The present invention relates to the method (embodiment 15) according to any one of embodiments 10 through 13, wherein the graphite film is a graphite film produced by undergoing a carbonization step of subjecting a polymer film to heat treatment, the polymer film being wrapped around a core, and at least partially in the carbonization step, depressurization to a pressure in a range from −0.08 MPa to 0.01 kPa is carried out while an inert gas is supplied.

The present invention relates to the method (embodiment 16) according to any one of embodiments 10 through 13, wherein the graphite film is a graphite film obtained by a graphite film producing method comprising a graphitization step of subjecting a heat-treated film, which is a carbonized polymer film, to heat treatment at a temperature of not less than 2000° C., the heat-treated film being wrapped around a core, and the graphitization step comprises a tight wrapping step of tightly wrapping the heat-treated film around the core.

The present invention relates to a method (embodiment 17) for producing a graphite composite film, comprising: a step of laminating a graphite film during a period from a time when the graphite film with the following features 1) and 2) wrapped around one roll is wound off to completion of winding up the graphite film around another roll, 1) having an average tearing force of not more than 0.08 N as determined by Trouser tear method in accordance with JIS K7128; and 2) having sag of not less than 5 mm and not greater than 80 mm as determined by a method of film windability evaluation in accordance with JIS C2151.

The present invention relates to the method (embodiment 18) according to embodiment 17, wherein a value "a" obtained by subtracting (a depth of sag at a point 30 mm away from an outer edge of the film in a TD direction) from (a depth of sag at the outer edge of the film in the TD direction) is not less than 5 mm and not more than 50 mm.

The present invention relates to the method (embodiment 19) according to embodiment 17 or 18, wherein the graphite film has camber of not more than 10 mm, as determined by a method of film windability evaluation in accordance with JIS C2151.

The present invention relates to the method (embodiment 20) according to any one of embodiments 17 through 19, wherein the graphite film has a width of not less than 200 mm.

The present invention relates to the method (embodiment 21) according to any one of embodiments 17 through 20, wherein an angle b formed by a line connecting a starting point of contact between the graphite film and a first roll and a center point of the first roll and a line connecting the center point of the first roll and a point of contact between the first roll and a second roll is not less than 5 degrees.

The present invention relates to the method (embodiment 22) according to any one of embodiments 17 through 20, wherein: the graphite composite film is produced by laminating the graphite film to a sheet having a self-adhesive layer or an adhesive layer, the sheet having a thickness of not more than 60 μm.

The present invention relates to the method (embodiment 23) according to any one of embodiments 17 through 22, wherein: the sheet having the self-adhesive layer or the adhesive layer is continuously supplied between the first roll and the second roll while a separator is peeled off from the sheet, and an angle at which the separator is peeled off from the sheet is not greater than 90 degrees.

The present invention relates to the method (embodiment 24) according to any one of embodiments 17 through 23, wherein (a length of the sheet having the self-adhesive layer or adhesive layer in the TD direction) is larger by not less than 5 mm than (a length of the graphite film in the TD direction).

The present invention relates to the method (embodiment 25) according to any one of embodiments 17 through 24, wherein the first roll and the second roll are a combination of a crown roll and a flat roll.

The present invention relates to the method (embodiment 26) according to any one of embodiments 17 through 25, wherein the graphite film is a graphite film produced by undergoing a carbonization step of subjecting a polymer film to heat treatment, the polymer film being wrapped around a core, and the carbonization step comprises a vessel constituted by the core and an external cylinder that accommodates the core, the vessel having ventilation.

The present invention relates to the method (embodiment 27) according to any one of embodiments 17 through 25, wherein the graphite film is a graphite film produced by undergoing a carbonization step of subjecting a polymer film to heat treatment, the polymer film being wrapped around a core, and at least partially in the carbonization step, depressurization to a pressure in a range from −0.08 MPa to 0.01 kPa is carried out while an inert gas is supplied.

The present invention relates to the method (embodiment 28) according to any one of embodiments 17 through 25, wherein the graphite film is a graphite film obtained by a graphite film producing method comprising a graphitization step of subjecting a heat-treated film, which is a carbonized polymer film, to heat treatment at a temperature of not less than 2000° C., the heat-treated film being wrapped around a core, and the graphitization step comprises a tight wrapping step of tightly wrapping the heat-treated film around the core.

The present invention relates to a method (embodiment 29) for producing a graphite die-cutting product, comprising: a step of die-cutting a graphite film with the following features 1) and 2) wrapped around one roll or a graphite composite film according to any one of embodiments 17 through 25 wrapped around one roll, during a period from a time when the graphite film or the graphite composite film is wound off to completion of winding up the graphite film or the graphite composite film around another roll, 1) having an average tearing force of not more than 0.08 N as determined by Trouser tear method in accordance with JIS K7128; and 2) having sag of not less than 5 mm and not greater than 80 mm as determined by a method of film windability evaluation in accordance with JIS C2151.

The present invention relates to the method (embodiment 30) according to embodiment 29, wherein a graphite film according to embodiment 29 is such that a value "a" obtained by subtracting (a depth of sag at a point 30 mm away from an outer edge of the film in a TD direction) from (a depth of sag at the outer edge of the film in the TD direction) is not less than 5 mm and not more than 50 mm.

The present invention relates to the method (embodiment 31) according to embodiment 29 or 30, wherein a graphite film according to embodiment 29 or 30 has camber of not more than 10 mm, as determined by a method of film windability evaluation in accordance with JIS C2151.

The present invention relates to the method (embodiment 32) according to any one of embodiments 29 through 31, comprising: a step of forming a sheet having (i) a graphite film according to any one of embodiments 29 through 31 and (i) a self-adhesive layer or an adhesive layer formed at least on one side of the graphite film; and a half-cutting step.

The present invention relates to the method (embodiment 33) according to any one of embodiments 29 through 32, comprising: a step of coating a part of an edge of a graphite film according to any one of embodiments 29 through 32 with a sheet having a self-adhesive layer or an adhesive layer.

The present invention relates to the method (embodiment 34) according to any one of embodiments 29 through 33, wherein a graphite film according to any one of embodiments 29 through 33 is a graphite film produced by undergoing a carbonization step of subjecting a polymer film to heat treatment, the polymer film being wrapped around a core, and the carbonization step comprises a vessel constituted by the core and an external cylinder that accommodates the core, the vessel having ventilation.

The present invention relates to the method (embodiment 35) according to any one of embodiments 29 through 33, wherein a graphite film according to any one of embodiments 29 through 33 is a graphite film produced by undergoing a carbonization step of subjecting a polymer film to heat treatment, the polymer film being wrapped around a core, and at least partially in the carbonization step, depressurization to a pressure in a range from −0.08 MPa to 0.01 kPa is carried out while an inert gas is supplied.

The present invention relates to the method (embodiment 36) according to any one of embodiments 29 through 33, wherein a graphite film according to any one of embodiments 29 through 33 is a graphite film obtained by a graphite film producing method comprising a graphitization step of subjecting a heat-treated film, which is a carbonized polymer film, to heat treatment at a temperature of not less than 2000° C., the heat-treated film being wrapped around a core, and the graphitization step comprises: a tight wrapping step of tightly wrapping the heat-treated film around the core.

The present invention relates to the method (embodiment 37) according to embodiment 29, wherein a graphite film utilized for a graphite composite film according to embodiment 29 is such that a value "a" obtained by subtracting (a depth of sag at a point 30 mm away from an outer edge of the film in a TD direction) from (a depth of sag at the outer edge of the film in the TD direction) is not less than 5 mm and not more than 50 mm.

The present invention relates to the method (embodiment 38) according to embodiment 29 or 30, wherein a graphite film utilized for a graphite composite film according to embodiment 29 or 30 has camber of not more than 10 mm, as determined by a method of film windability evaluation in accordance with JIS C2151.

The present invention relates to the method (embodiment 39) according to any one of embodiments 29 through 31, comprising: a step of forming a sheet having (i) a graphite film utilized for a graphite composite film according to any one of embodiments 29 through 31 and (ii) a self-adhesive layer or an adhesive layer formed at least on one side of the graphite film; and a half-cutting step.

The present invention relates to the method (embodiment 40) according to any one of embodiments 29 through 32, comprising: a step of coating a part of an edge of a graphite film utilized for a graphite composite film according to any one of embodiments 29 through 32 with a sheet having a self-adhesive layer or an adhesive layer.

The present invention relates to the method (embodiment 41) according to any one of embodiments 29 through 33, wherein a graphite film utilized for a graphite composite film according to any one of embodiments 29 through 33 is a graphite film produced by undergoing a carbonization step of subjecting a polymer film to heat treatment, the polymer film being wrapped around a core, and the carbonization step comprises a vessel constituted by the core and an external cylinder that accommodates the core, the vessel having ventilation.

The present invention relates to the method (embodiment 42) according to any one of embodiments 29 through 33, wherein a graphite film utilized for a graphite composite film according to any one of embodiments 29 through 33 is a graphite film produced by undergoing a carbonization step of subjecting a polymer film to heat treatment, the polymer film being wrapped around a core, and at least partially in the carbonization step, depressurization to a pressure in a range from −0.08 MPa to 0.01 kPa is carried out while an inert gas is supplied.

The present invention relates to the method (embodiment 43) according to any one of embodiments 29 through 33, wherein a graphite film utilized for a graphite composite film according to any one of embodiments 29 through 33 is a graphite film obtained by a graphite film producing method comprising a graphitization step of subjecting a heat-treated film, which is a carbonized polymer film, to heat treatment at a temperature of not less than 2000° C., the heat-treated film being wrapped around a core, and the graphitization step comprises: a tight wrapping step of tightly wrapping the heat-treated film around the core.

The present invention relates to the method (embodiment 44) according to any one of embodiments 1 through 3, wherein the graphite film utilized in rewinding is a graphite film obtained by subjecting a polymer film to heat treatment at a temperature of not less than 2000° C. in such a state that the polymer film is wrapped with its first side facing inside.

The present invention relates to the method (embodiment 45) according to any one of embodiments 4 through 9, wherein the graphite film utilized in slitting is a graphite film obtained by subjecting a polymer film to heat treatment at a temperature of not less than 2000° C. in such a state that the polymer film is wrapped with its first side facing inside.

The present invention relates to the method (embodiment 46) according to any one of embodiments 10 through 16, wherein the graphite film utilized in compression is a graphite film obtained by subjecting a polymer film to heat treatment at a temperature of not less than 2000° C. in such a state that the polymer film is wrapped with its first side facing inside.

The present invention relates to the method (embodiment 47) according to any one of embodiments 17 through 28, wherein the graphite film utilized in laminating is a graphite film obtained by subjecting a polymer film to heat treatment at a temperature of not less than 2000° C. in such a state that the polymer film is wrapped with its first side facing inside.

The present invention relates to the method (embodiment 48) according to any one of embodiments 29 through 36, wherein the graphite film utilized in die-cutting is a graphite film obtained by subjecting a polymer film to heat treatment at a temperature of not less than 2000° C. in such a state that the polymer film is wrapped with its first side facing inside.

The present invention relates to the method (embodiment 49) according to any one of embodiments 37 through 43, wherein the graphite film which is utilized for a graphite composite film utilized in die-cutting is a graphite film obtained by subjecting a polymer film to heat treatment at a temperature of not less than 2000° C. in such a state that the polymer film is wrapped with its first side facing inside.

The present invention relates to a graphite film (embodiment 50), having an average tearing force of not more than 0.08 N as determined by Trouser tear method in accordance with JIS K7128, and having sag of not less than 5 mm and not greater than 80 mm as determined by a method of film windability evaluation in accordance with JIS C2151.

Advantageous Effects of Invention

According to a method for rewinding a graphite film of the present invention, a graphite film can be rewound without suffering from splitting.

Further, according to a method for rewinding a graphite film of the present invent ion, a graphite film can be rewound without suffering from winding deviation.

Still further, according to a method for producing a graphite film of the present invent ion, a graphite film can be produced without suffering from splitting.

Yet further, according to a method for producing a graphite film of the present invention, a graphite film can be produced without suffering from winding deviation.

Further, according to a method for producing a graphite film of the present invent ion, a graphite film can be produced without suffering from defects at the edges thereof.

Still further, according to a method for producing a graphite composite film of the present invention, the occurrence of wrinkling can be reduced at the lamination of a graphite film to a self-adhesive material layer or the like object to be laminated to the graphite film.

Yet further, according to a method for producing a graphite composite film of the present invention, the occurrence of winding deviation can be reduced at the lamination of a graphite film to a self-adhesive material layer or the like object to be laminated to the graphite film.

Further, according to a method for producing a graphite composite film of the present invention, the occurrence of splitting can be reduced at the lamination of a graphite film to a self-adhesive material layer or the like object to be laminated to the graphite film.

Still further, according to a method for producing a graphite-film die-cutting product of the present invention, the occurrence of splitting can be reduced.

Yet further, according to a method for producing a graphite-film die-cutting product of the present invention, the occurrence of poor dimensional accuracy can be reduced.

DESCRIPTION OF EMBODIMENTS

The present invention relates to a method for rewinding a graphite film that satisfies the following requirements: 1) having an average tearing force of not more than 0.08 N as determined by Trouser tear method in accordance with JIS K7128; and 2) having a sag of not less than 5 mm and not greater than 80 mm as determined by film windability evaluation in accordance with JIS C2151, a method for producing a graphite film, a method for producing a graphite composite film using the graphite film, and a method for producing a graphite die-cutting product.

Even for an extremely easy-tearing graphite film having an average tearing force of not more than 0.08 N as determined by Trouser tear method in accordance with JIS K7128, when the graphite film satisfies the requirement that a sag is not less than 5 mm and not greater than 80 mm as determined by a method of film windability evaluation in accordance with JIS C2151, it is possible to prevent the defects in the following modes (Hereinafter referred to as "five modes" when collectively referred to).

Figure 1:
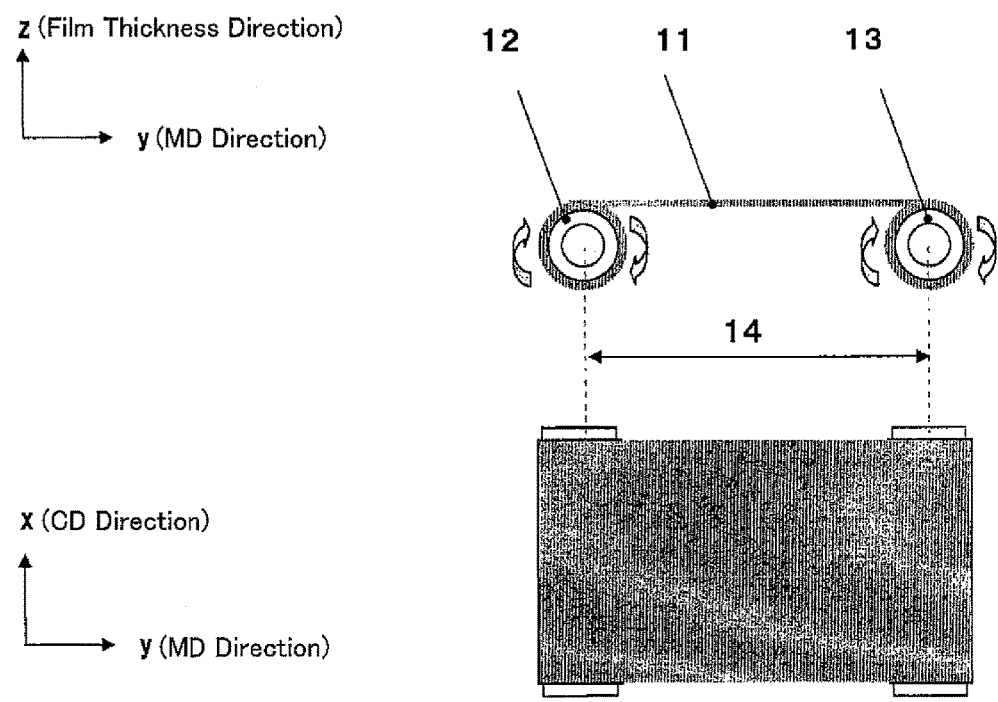
FIG. 1 is a schematic diagram showing a rewinding method.

First, in a method for rewinding a graphite film according to the present invention, the graphite film can be rewound by winding off the graphite film from a first roll and winding up the graphite film around a second roll, as shown in FIG. 1, for example. With regard to a path of the film, the present invent ion is not limited to a method of directly winding up the film as shown in FIG. 1. Alternatively, the film may be rewound while being folded by passing through a free roll.

Figure 18:
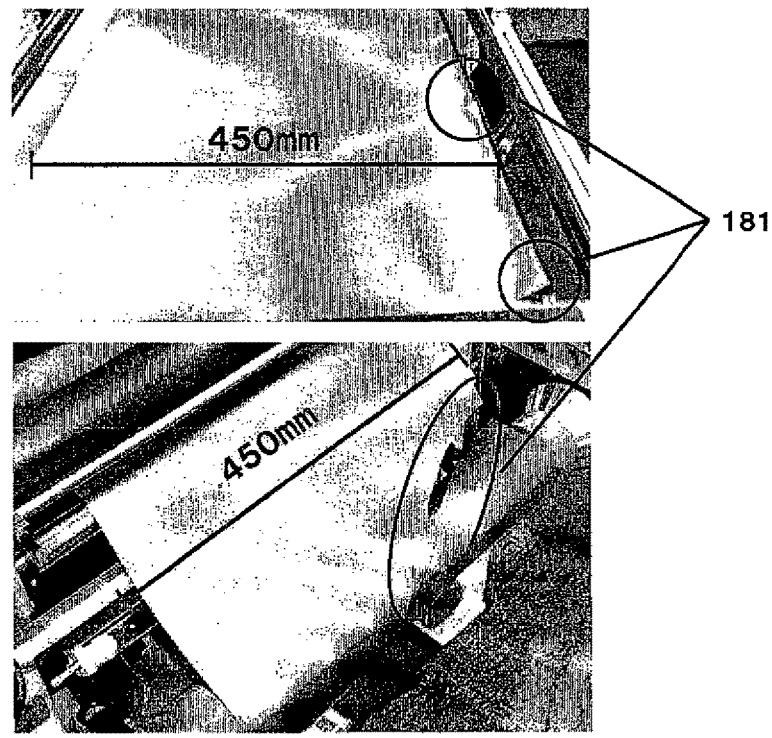
FIG. 18 is a photograph showing an appearance of splitting of a graphite film.
Figure 19:
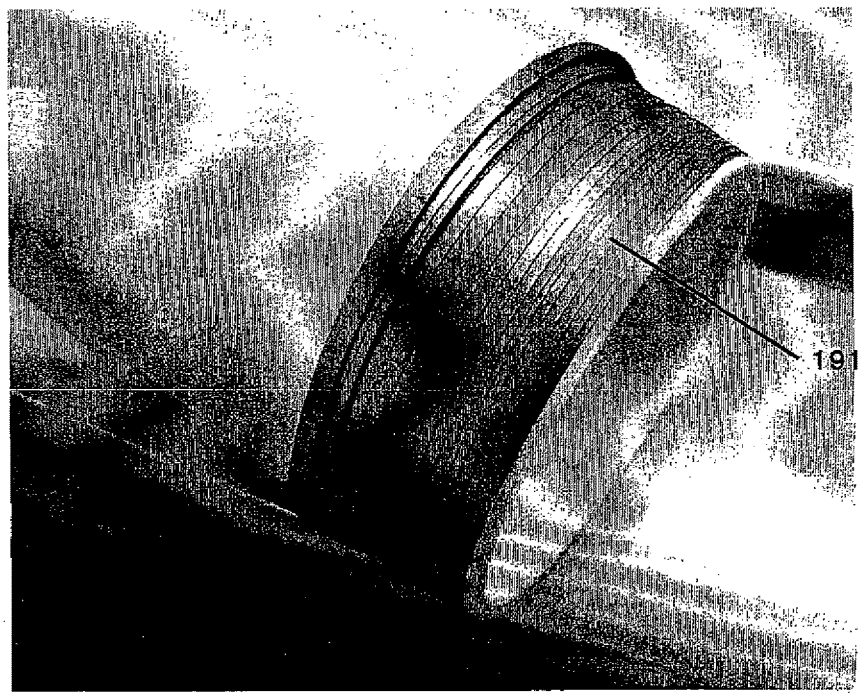
FIG. 19 is a photograph showing an appearance of winding deviation of a graphite film.

When the graphite film satisfies the above-described requirements 1) and 2), it is possible to prevent the graphite film from suffering from the defects such as splitting as shown in FIG. 18 and winding deviation as shown in FIG. 19.

Figure 2:
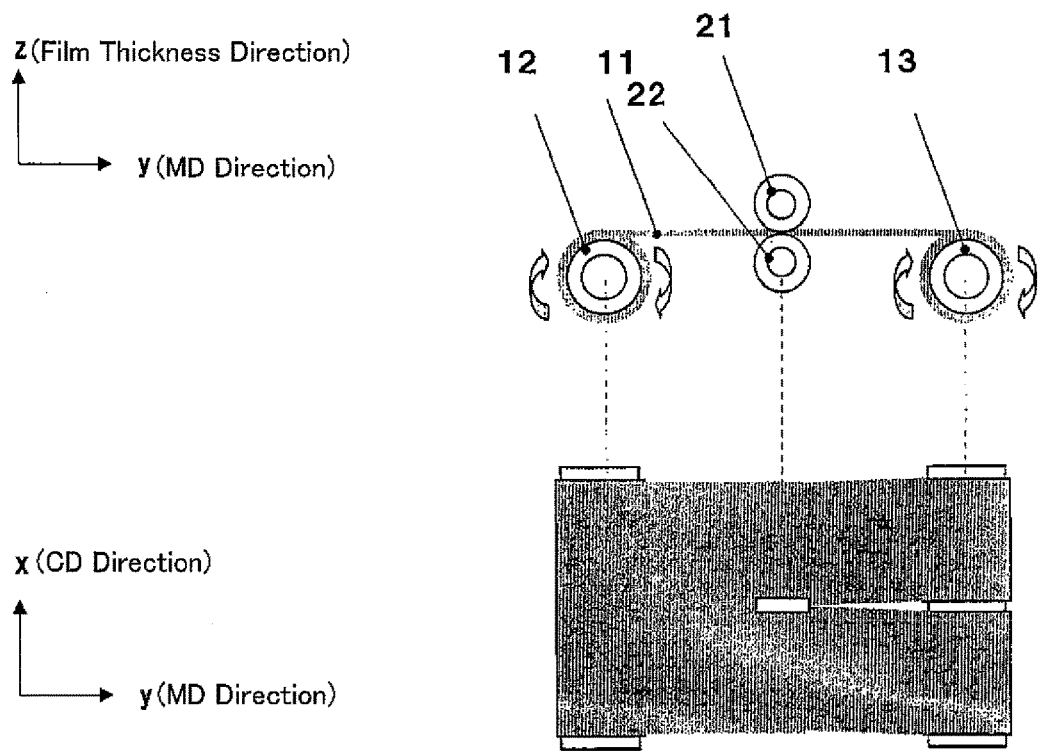
FIG. 2 is a schematic diagram showing a slitting step.

Next, in a method for producing a graphite film according to the present invent ion, a step of slitting a graphite film is a step of separating the graphite film into two each having a predetermined width, as shown in FIG. 2, for example.

Figure 20:
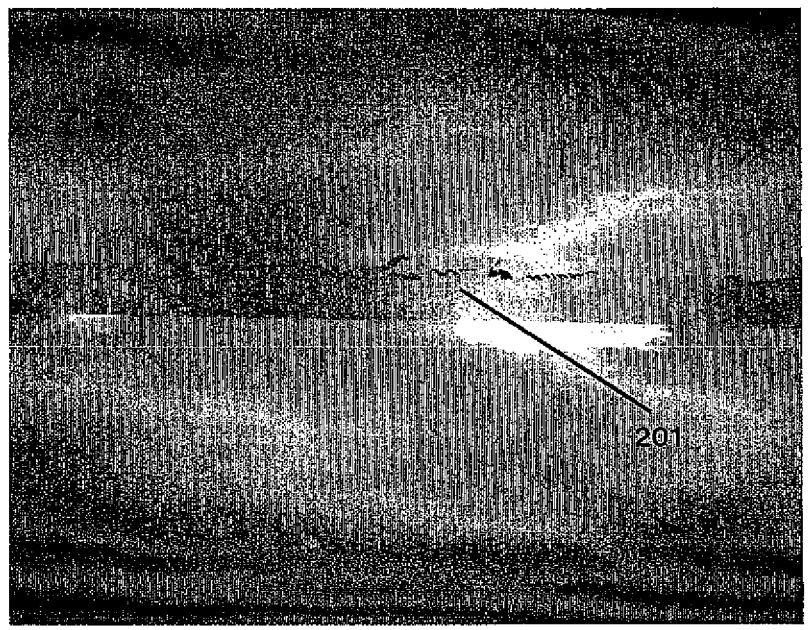
FIG. 20 is a photograph showing an appearance of edge burrs of a graphite film.

When the graphite film satisfies the above-described requirements 1) and 2), it is possible to prevent the graphite film from suffering from the defects such as splitting as shown in FIG. 18, winding deviation as shown in FIG. 19, and edge burr as shown in FIG. 20.

Figure 3:
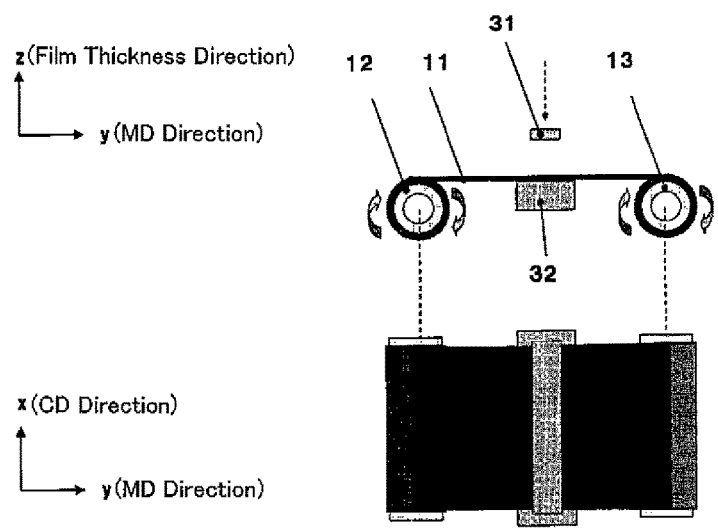
FIG. 3 is a schematic diagram showing a single-plate continuous press.
Figure 4:
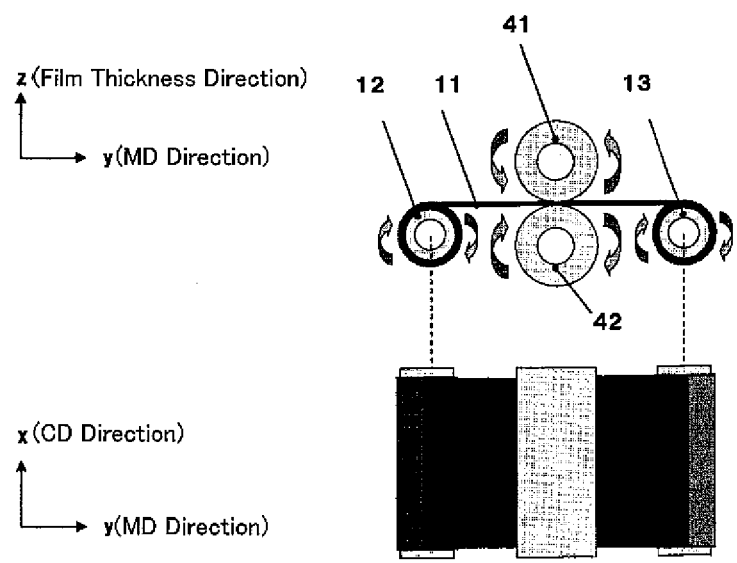
FIG. 4 is a schematic diagram showing a step of using a rolling mill.

A step of compressing a graphite film is a step of compressing a foamed graphite to impart flexibility to the foamed graphite. In particular, a great effect is yielded for a graphite film produced by subjecting a polymer film to heat treatment. Examples of a compression method include: the use of a single-plate continuous press by which a single plate is continuously pressed against a film while the film is transferred, as shown in FIG. 3; and the use of a rolling mill by which a film is compressed while passing between the rotated rolls, as shown in FIG. 4.

Figure 21:
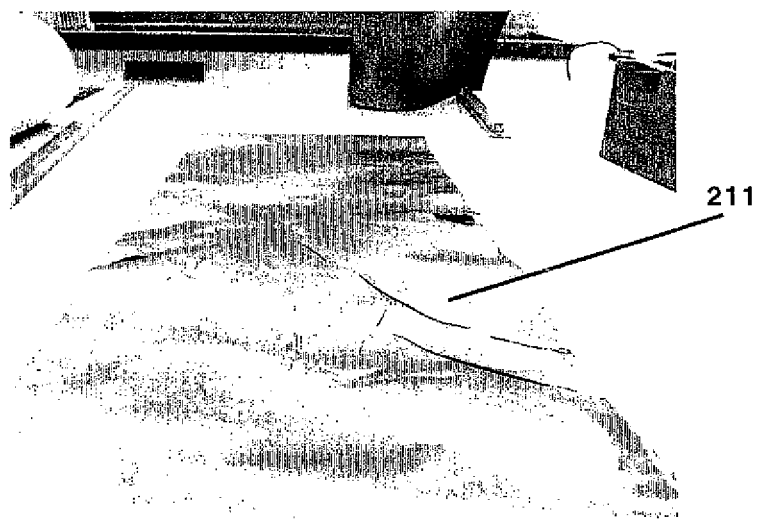
FIG. 21 is a photograph showing an appearance of folding wrinkles of a graphite film.

When the graphite film satisfies the above-described requirements 1) and 2), it is possible to prevent the graphite film from suffering from the defects such as splitting as shown in FIG. 18, winding deviation as shown in FIG. 19, and folding wrinkles as shown in FIG. 21.

Figure 5:
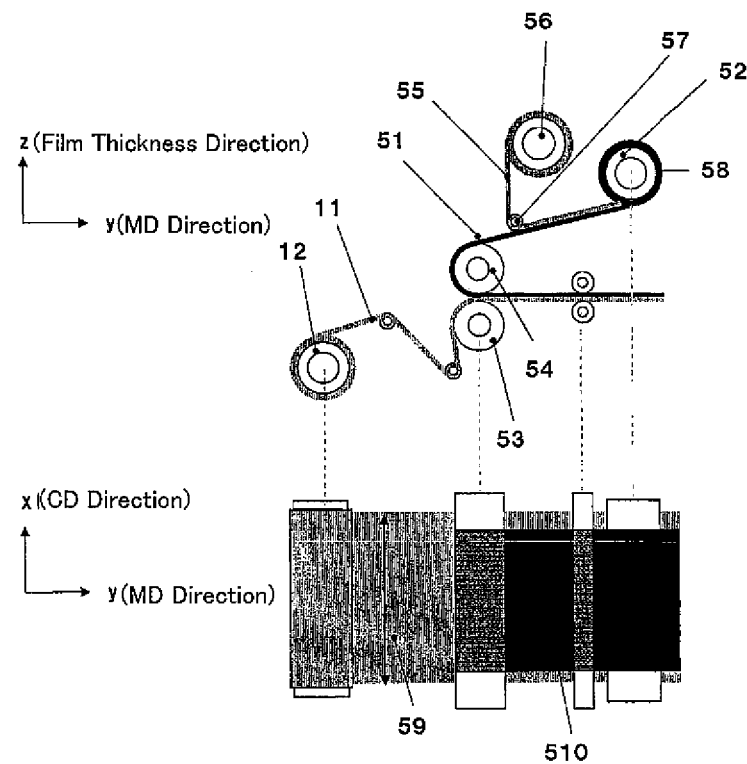
FIG. 5 is a schematic diagram showing a laminating step.

Next, in a method for producing a graphite composite film according to the present invention, a step of laminating a graphite film is a step of laminating a graphite film to a sheet having a self-adhesive layer or adhesive layer, as shown in FIG. 5, for example. The graphite film and the sheet having a self-adhesive layer or adhesive layer can be laminated to each other while being continuously supplied between first and second rolls that are aligned in parallel with each other. Alternatively, heat laminating can be carried out in which the graphite film and the sheet having a self-adhesive layer or adhesive layer are laminated to each other with a resin molten by application of heat to the rolls.

Figure 22:
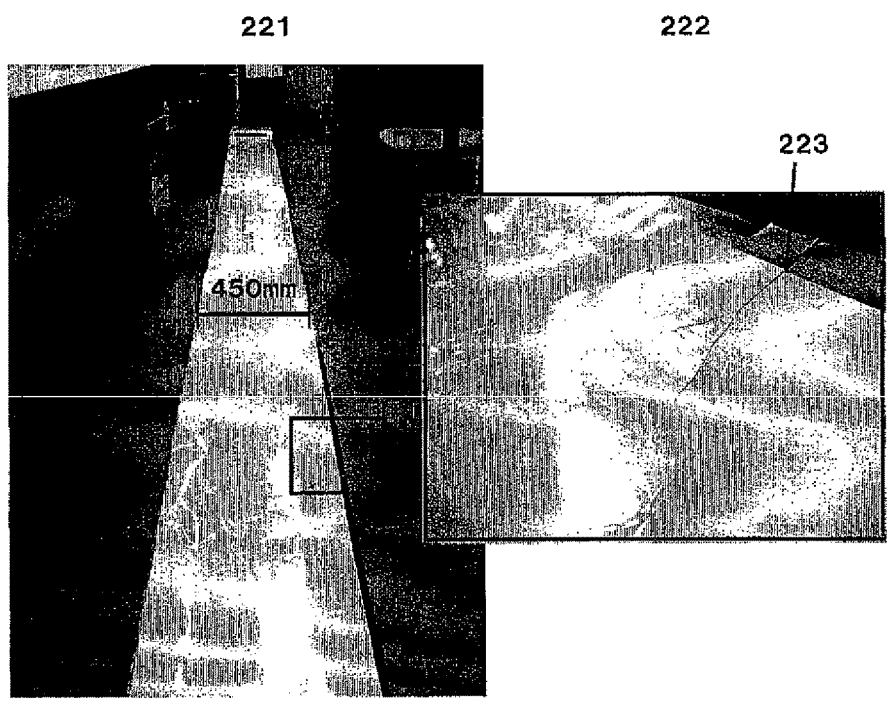
FIG. 22 is a photograph showing an appearance of laminating wrinkles of a graphite film.

When the graphite film satisfies the above-described requirements 1) and 2), it is possible to prevent the graphite film from suffering from the defects such as splitting as shown in FIG. 18 and laminating wrinkles as shown in FIG. 22.

Figure 6:
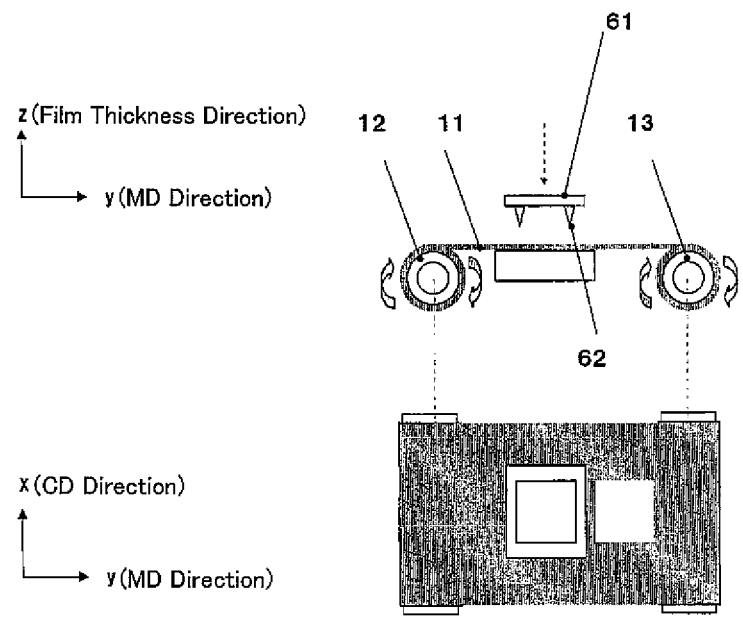
FIG. 6 is a schematic diagram showing a die-cutting step.

Next, in a method for producing a graphite die-cutting product according to the present invention, a step of die-cutting a graphite film or a graphite composite film can be realized, for example, by cutting out the film into a predetermined shape by using a pinnacle die as shown in FIG. 6. Alternatively, the graphite film may be singly cut out, and the graphite composite film obtained in the laminating step may be punched. Further, by adjusting the degree of punching depth, half-cutting with only a particular layer remained in the laminate can also be carried out.

When the graphite film satisfies the above-described requirements 1) and 2), it is possible to prevent the graphite film from suffering from the defects such as splitting as shown in FIG. 18 and poor dimensional accuracy, which is a poor accuracy of dimension of a die-cut film.

<Average Tearing Force and Sag of Graphite Film>

A graphite film used in the present invention has an average tearing force of not more than 0.08 N as determined by Trouser tear method in accordance with JIS K7128. In particular, a graphite film having superior thermal electrical conductivities has graphite crystallites highly oriented in a planar direction of a film. In such a graphite film, the average tearing force is more likely to become not more than 0.08 N.

Even for a graphite film of the present invent ion having an average tearing force of not more than 0.08 N, further not more than 0.05 N, particularly 0.03 N, when the graphite film satisfies the requirement that a sag is not less than 5 mm and not greater than 80 mm as determined by a method of film windability evaluation in accordance with JIS C2151, it is possible to prevent the defects in the five modes.

Figure 7:
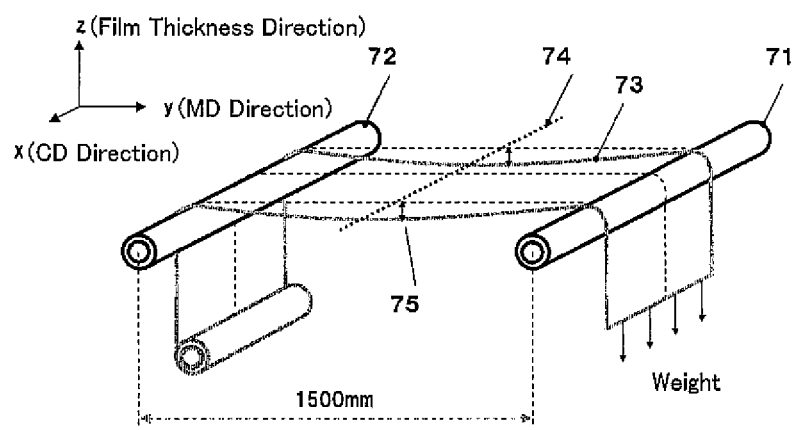
FIG. 7 is a schematic diagram showing sag measurement described in JIS C2151.
Figure 7:
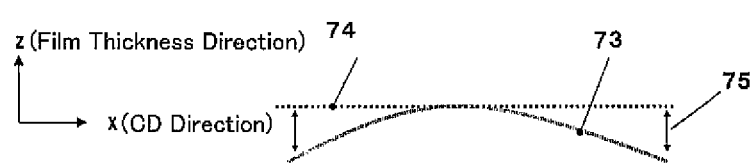

A film having "sag" of the film described in JIS C2151 is defined as follows. When the film is pulled, part of the film sags to a height lower than a normal height of the part of the film. Sag measurement is carried out by the following method. A film in a given length is wound of f and placed between two parallel sticks spaced 1500 mm apart in a direction at right angles to the sticks, as shown in FIG. 7. Then, a deviation from a uniform suspended line is measured at a midpoint between the sticks. For example, assume that a uniform tensile force is applied to the film in a MD direction of the film. In this case, when the film has sag, the force is less likely to be exerted on the sagged part of the film. That is, when the film has sag at its edges, the force is less likely to be exerted on the sagged part of the film. This makes it possible to prevent splitting.

A graphite film used in the present invent ion has sag of not less than 5 mm and not greater than 80 mm, as determined by a method of film windability evaluation in accordance with JIS C2151. The sag is optimally not less than 5 mm and not greater than 80 mm, preferably not less than 20 mm and not greater than 70 mm, more preferably not less than 30 mm and not greater than 50 mm. When the film has sag of not less than 5 mm, the film scatters stress against twist and tensile force. Therefore, it is possible to prevent splitting. On the other hand, when the film has sag of not greater than 80 mm, it is possible to prevent winding deviation, wrinkling, and poor dimensional accuracy of a graphite die-cutting product. According to the present invention, it is possible to further prevent the defects such as splitting by controlling a value "a" and camber to fall within particular ranges.

<Graphite Film's value "a" Obtained by Subtracting (Depth of Sag at Point 30 mm Away From Outer Edge of the Film in the TD Direction) From (Depth of Sag at Outer Edge of the Film in the TD Direction)>

Figure 8:
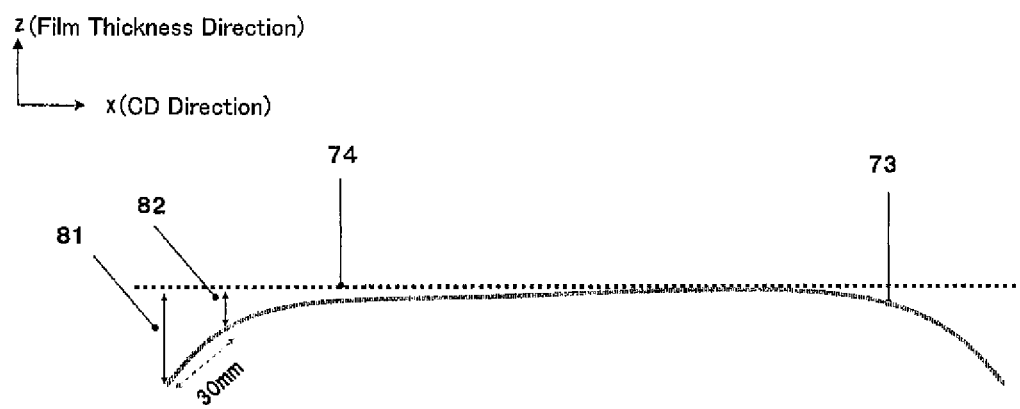
FIG. 8 shows a schematic diagram showing value "a".

With regard to a graphite film used in the present invention, it is preferable that the value "a" obtained by subtracting (a depth of sag at a point 30 mm away from an outer edge of the film in the TD direct ion) from (a depth of sag at the outer edge of the film in the TD direction) is not less than 5 mm and not more than 50 mm, from the viewpoint of preventing splitting of the graphite film. FIG. 8 shows a schematic diagram of the value "a". Since splitting of the film occurs from the edges of the film, the susceptibility of the film to splitting depends on the value "a" that indicates sag at the edges of the film. The value "a" is more preferably not less than 10 mm and not more than 45 mm, further preferably not less than 20 mm and not more than 40 mm. When the film has the value "a" of not less than 5 mm, the film scatters stress applied on the edges thereof against twist and tensile force. Therefore, it is possible to prevent splitting in five modes. When the film has the value "a" of not more than 50 mm, it is possible to prevent winding deviation, laminating wrinkles, and poor dimensional accuracy of a graphite die-cutting product.

<Camber of Graphite Film>

Figure 9:
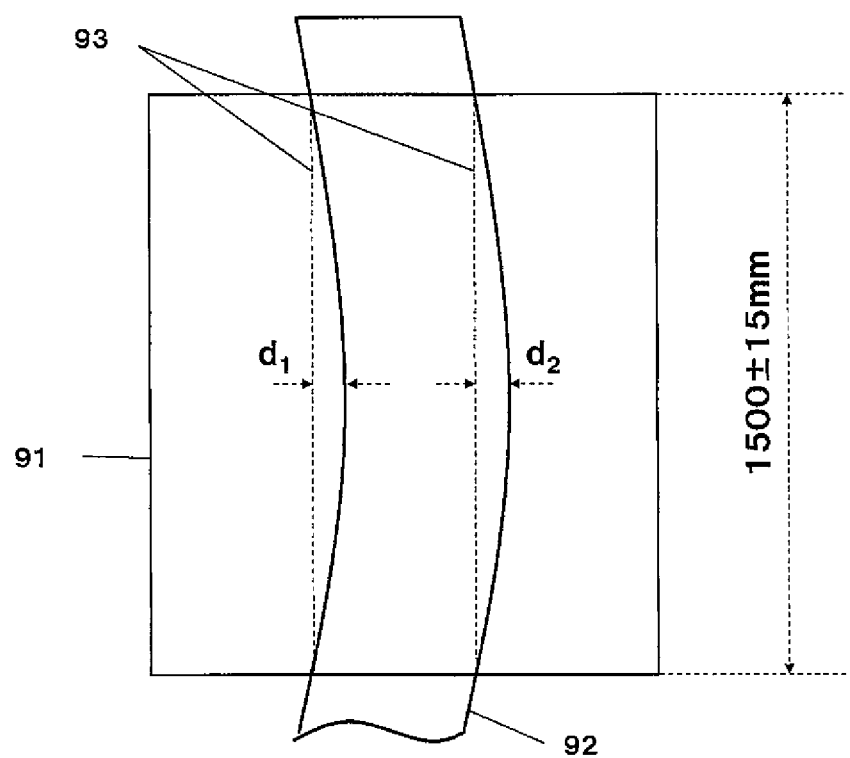
FIG. 9 is a schematic diagram showing camber measurement described in JIS C2151.

With regard to a graphite film used in the present invention, it is preferable that camber is not more than 10 mm, as determined by a method of film windability evaluation in accordance with JIS C2151. FIG. 9 shows a schematic diagram of camber. Camber of a graphite film used in the present invent ion is more preferably not more than 5 mm, and further preferably not more than 3 mm. When the film has camber of not more than 10 mm, the film scatters stress against twist and tensile force. Therefore, it is possible to prevent splitting in the five modes. Further, it is possible to prevent winding deviation, wrinkling, and poor dimensional accuracy of a graphite die-cutting product.

<Length of Graphite Film>

A length of a graphite film is a length in a longitudinal direction of the film. Even though graphite films have the same degree of sag, the graphite films having shorter lengths are easy to rewind. A graphite film having a length of about 180 mm with a sheet-feed size is extremely easy to handle. When the graphite film has a length exceeding 1000 mm, stress concentration occurs on the edges of the film, and the film therefore becomes more likely to suffer from the defect, such as splitting of the film. According to the present invention, in particular, even with a graphite film that is extremely hard to handle due to its length of not less than 1000 mm, it is possible to work without the occurrence of splitting of the film by appropriately controlling the sag, the value "a", and camber of the film.

<Rewinding Tensile Force>

With regard to a method for rewinding a graphite film according to the present invention, there is a connection between film rewinding tensile force and the defects of splitting and winding deviation. When a week tensile force is applied to the film, the film becomes more likely to suffer from winding deviation. In this case, it is necessary to strengthen a tensile force to be applied. However, the strengthening of the rewinding tensile force contributes to splitting of the film. The rewinding tensile force is preferably not less than 3 g/cm and not greater than 400 g/cm, more preferably not less than 10 g/cm and not greater than 200 g/cm, and further preferably not less than 20 g/cm and not greater than 80 g/cm. When the rewinding tensile force is not less than 3 g/cm and not greater than 400 g/cm, it is possible to carry out rewinding without the occurrence of the defects such as splitting and winding deviation.

<Rewinding Speed>

With regard to a method for rewinding a graphite film according to the present invention, enhancement of a rewinding speed is important from the viewpoint of productivity. However, for a graphite film used in the present invention, enhancement of the rewinding speed contributes to the defects such as splitting and winding deviation.

The rewinding speed of a graphite film used in the present invention is preferably not less than 1 m/min and not greater than 50 m/min, more preferably not less than 3 m/min and not greater than 30 m/min, and further preferably not less than 5 m/min and not greater than 20 m/min.

When the rewinding speed is not less than 1 m/min, productivity is enhanced. When the rewinding speed is not greater than 50 m/min, it is possible to carry out rewinding without the occurrence of the defects such as splitting and winding deviation.

<Thickness of Graphite Film>

A thickness of the graphite film used in the present invention is preferably not less than 5 μm and not greater than 200 μm, more preferably not less than 10 μm and not greater than 100 μm, and further preferably not less than 20 μm and not greater than 50 μm. When the thickness of the film is not less than 5 μm and not greater than 200 μm, it is possible to carry out rewinding while preventing splitting and winding deviation.

<Width of Graphite Film>

A width (length in the TD direction) of the graphite film used in the present invention is such that even though graphite films have the same degree of sag, the graphite films having smaller widths are easy to rewind. When the graphite film has a width of not less than 200 mm, further not less than 300 mm, and particularly not less than 400 mm, stress concentration to the edges is likely to occur, thus causing more splitting. However, by regulating the causes of sag, the value "a", and camber, it is possible to prevent the defects such as splitting and winding deviation in the five modes of the present invention.

<Slitter>

The graphite film has crystallites highly oriented in a planar direct ion of the film, resulting in poor film cutting property. Therefore, in the slitting step of a method for producing a graphite film according to the present invention, a roll cutter is suitably used because it causes no load on the film.

<Compression Method>

In the compressing step in a method for producing a graphite film according to the present invention, for example, a single-plate continuous press by which a single plate is continuously pressed against a film while the film is transferred or a rolling mill by which a film is compressed while passing between rotated rolls is used. The single-plate continuous press is able to compress a film without causing wrinkles regardless of whether the film is flat. However, the single-plate continuous press tends to cause splitting of the film due to application of nonuniform tensile force to the film resulting from continuous pressing of the single plate against the film. In the compressing step using the single plate continuous press according to the present invention, it is possible to prevent splitting and winding deviation by controlling the factors such as the sag, the value "a", and the camber. On the contrary, the rolling mill is able to produce uniform tensile force, causing less film splitting.

However, when the film has great sag, the rolling mill tends to cause winding wrinkles when the film becomes entangled with the rolls. In the compressing step using the rolling mill according to the present invention, it is possible to prevent splitting, winding deviation, and winding wrinkles by controlling the factors such as the sag, the value "a", and the camber.

<Sheet Having Self-Adhesive Layer or Adhesive Layer>

With regard to a graphite composite film of the present invention, a sheet having a self-adhesive layer or an adhesive layer to which a graphite film is to be laminated is not particularly limited. Examples of the sheet having a self-adhesive layer includes a film composed of a self-adhesive layer, a film composed of a self-adhesive layer and a substrate, and a laminate of a self-adhesive layer, a substrate, and a self-adhesive layer. As the self-adhesive layer, a self-adhesive material such as a silicone material, an acrylic material, and a synthetic rubber can be used. As the substrate, a polyimide resin, a polyethylene terephthalate (PET) resin, a polyphenylene sulfide (PPS) resin, a polyethylene naphthalate (PEN) resin, a polyester resin, and a metallic sheet such as aluminum foil and copper foil can be used. Examples of the sheet having an adhesive layer include a film composed of an adhesive layer, a film composed of an adhesive layer and a substrate, and a laminate of an adhesive layer, a substrate, and an adhesive layer. As the adhesive layer, a thermosetting resin adhesive material such as a polyimide resin and an epoxy resin can be used. Also, as the adhesive layer, a thermoplastic resin or the like that allows adhesion in a molten state can be used. As the substrate, a polyimide resin, a polyethylene terephthalate (PET) resin, a polyphenylene sulfide (PPS) resin, a polyethylene naphthalate (PEN) resin, a polyester resin, and a metallic sheet such as aluminum foil and copper foil, CFRP (carbon fiber reinforced plastics), a carbon fiber felt, and other carbon-based materials can be used.

<First Roll and Second Roll>

The first roll and second roll used in a method for producing a graphite composite film according to the present invention serve as rolls for laminating the graphite film set on a laminator device or the like to the sheet having the self-adhesive layer or adhesive layer. The first roll is a roll placed on the side of the graphite film, whereas the second roll is a roll placed on the side of the sheet having the self-adhesive layer or adhesive layer. Positional relation between the first roll and the second roll is not particularly limited, and it is safe that whichever of the rolls is located on a higher place than the other. The first roll and the second roll used in the present invent ion may be of types capable of temperature control.

The graphite film and the material to be laminated thereto are continuously supplied between the first roll and the second roll. A method for continuously supplying them is, for example, a method of installing a long roll of sheet in a wind-off roll and then supplying the roll between the two roll while the roll is wound off. It is also possible to supply the roll while controlling a tensile force by applying a torque to the wind-off roll.

Figure 10:
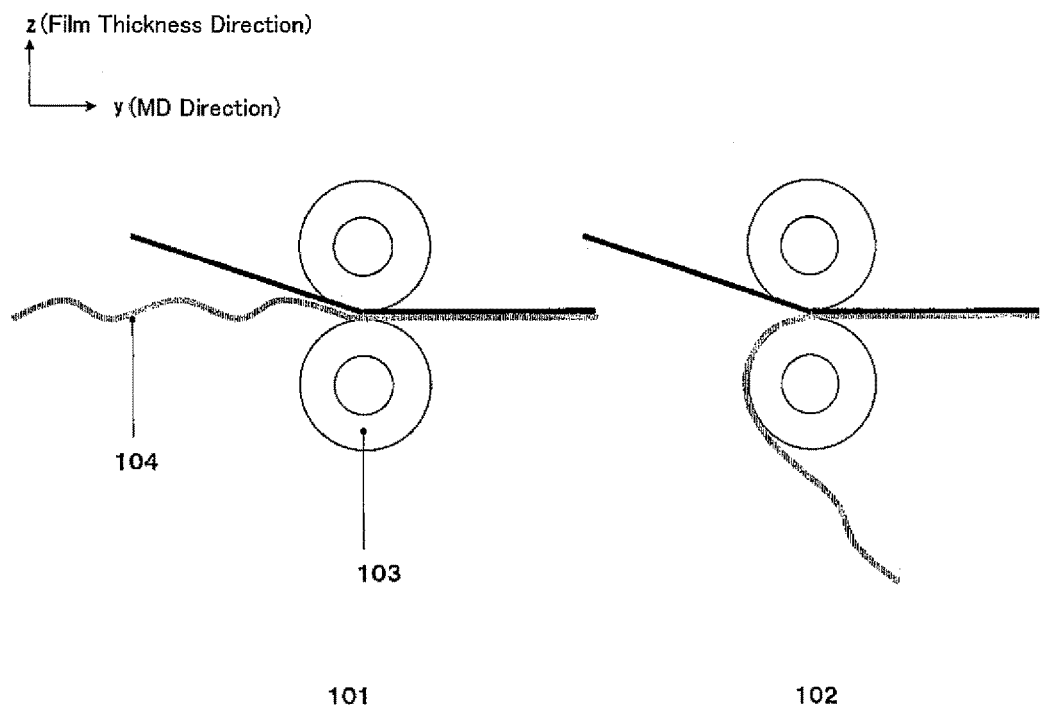
FIG. 10 is a schematic diagram showing a method of supplying a graphite film to a first roll.

With regard to a method of supplying a graphite film between the rolls (between the first roll and the second roll) according to the present invention, it is safe that the graphite film is supplied in contact with the first roll. As indicated by reference numeral 101 shown in FIG. 10, when a soft film that cannot be supplied in a flat state or a film having great sag is supplied between the rolls, the laminating wrinkles occur because uneven surfaces of the film are caught between the rolls. On the other hand, as indicated by reference numeral 102 shown in FIG. 10, by supplying the film or the like in contact with the roll, it is possible to laminate the film to the sheet without the occurrence of wrinkles while eliminating uneven surfaces of the film.

<Angle b Formed by Line Connecting Starting Point of Contact Between the Graphite Film Used in Present Invention and First Roll and Center Point of First Roll and Line Connecting the Center Point of First Roll and Point of Contact Between First Roll and Second Roll>

Figure 11:
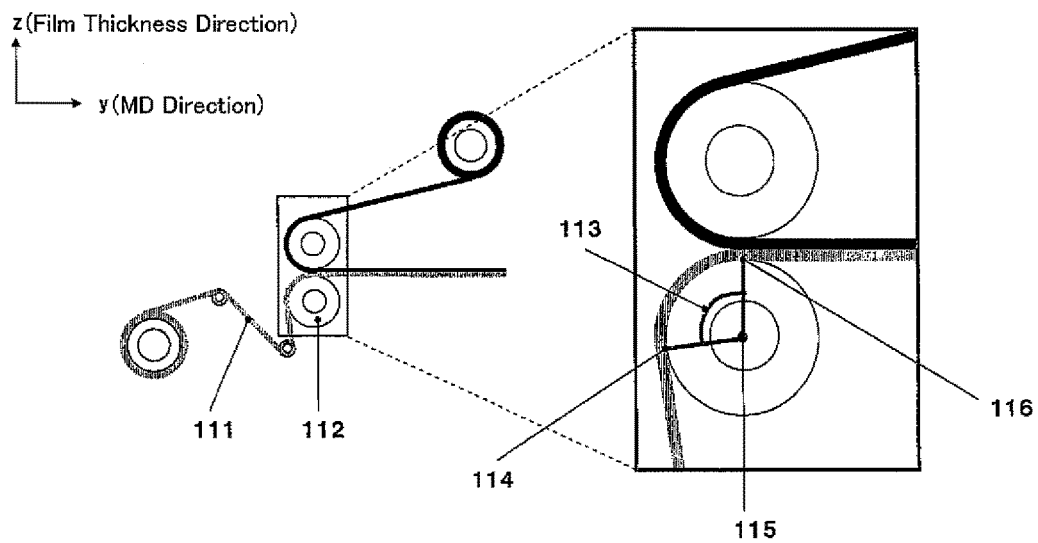
FIG. 11 is an explanatory view of an angle b formed by a line connecting a starting point of contact between the graphite film and a first roll and a center point of the first roll and a line connecting the center point of the first roll and a point of contact between the first roll and a second roll.

An angle b formed by a line connecting a starting point of contact between the graphite film used in the present invention and the first roll and a center point of the first roll and a line connecting the center point of the first roll and a point of contact between the first roll and the second roll is an angle at which the graphite film is wrapped around the first roll, as shown in FIG. 11. In FIG. 11, the starting point of contact between the first roll and the graphite film is indicated by reference numeral 114, the center point of the first roll is indicated by reference numeral 115, and the point of contact between the first roll and the second roll is indicated by reference numeral 116. In continuously supplying the graphite film between the rolls with the graphite film in contact with the first roll, it is important to control the angle b. For example, in cases where a graphite film having great sag and a large value "a" is used, the laminating wrinkles can be prevented by increasing the angle b. The angle b according to the present invention is preferably not less than 5 degrees, more preferably not less than 45 degrees, and further preferably not less than 90 degrees. When the angle b is not less than 5 degrees, it is possible to eliminate the occurrence of the laminating wrinkles at the laminating.

<Angle c Formed by Line Connecting (Starting Point of Contact Between the Second Roll and the Sheet Having Self-Adhesive Layer or Adhesive Layer) and (Center Point of the Second Roll) and Line Connecting (Center Point of the Second Roll) and (Point of Contact Between the First Roll and the Second Roll)>

To laminate the graphite film used in the present invention to the sheet having a small thickness (sheet having the self-adhesive layer or adhesive layer), it is important to control the angle c formed by a line connecting (the starting point of contact between the second roll and the sheet having the self-adhesive layer or adhesive layer) and (the center point of the second roll) and a line connecting (the center point of the second roll) and (the point of contact between the first roll and the second roll).

The angle c according to the present invention is preferably not less than 5 degrees, more preferably not less than 45 degrees, and further preferably not less than 90 degrees. When the angle b is not less than 5 degrees, it is possible to eliminate the occurrence of the laminating wrinkles at the laminating.

<Separator>

The sheet having the self-adhesive layer or adhesive layer for use in the present invention has a separator laminated on a self-adhesive surface or an adhesive surface thereof. This arrangement needs only a slight force to unwind the sheet having a self-adhesive material with a separator, thus facilitating laminating to the graphite film. For example, as shown in FIG. 5, the sheet having the self-adhesive layer or adhesive layer is supplied between the rolls while the separator is peeled off at an angle of not greater than 90 degrees when a bar is a starting point of peeling of the separator.

<Width of Sheet Having Self-Adhesive Layer or Adhesive Layer>

As shown in FIG. 5, it is desirable that a width of the sheet having the self-adhesive layer or adhesive layer for use in the present invent ion is narrower than the width of the graphite film to be laminated thereto. Making the sheet having the self-adhesive layer or adhesive layer narrower than the graphite film makes it possible to prevent the problem that the sheet becomes entangled when the self-adhesive layer or adhesive layer is unfortunately bonded to the first roll or the second roll.

Figure 12:
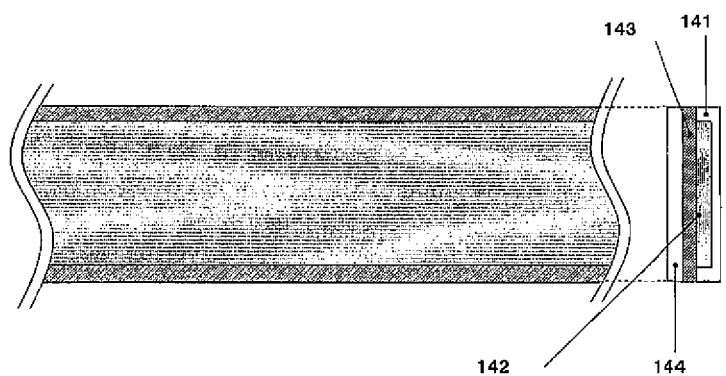
FIG. 12 is a schematic diagram showing a graphite composite film with two sides sealed.

On the other hand, as shown in FIG. 12, a laminating method such that the graphite film and the sheet having the self-adhesive layer or adhesive layer, which sheet is wider than the graphite film, are laminated to each other, and edges of long sides of the graphite film are sealed is also effective from the viewpoints of preventing dust fall of the graphite film.

<Shape of Rolls>

Shapes of the rolls used in a method for producing a graphite composite film according to the present invention are not particularly limited. For example, a crown roll and a flat roll can be used.

Figure 13:
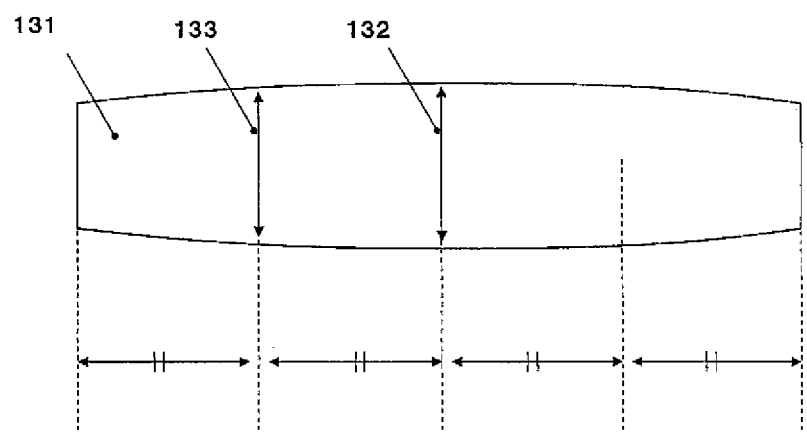
FIG. 13 is a schematic diagram showing a roll in crown shape.

The crown roll is shaped like a crown as shown in FIG. 13 and is designed to reduce the occurrence of float in the middle of the roll at the application of a pressure.

In the present invention, it is preferable that at least one of the rolls is the flat roll. In particular, it is suitable that the first roll with which the graphite film comes into contact is the flat roll. With the arrangement in which at least one of the rolls is the flat roll, it is possible to prevent the laminating wrinkles at the edges. In particular, when the first roll is the flat roll, the graphite film is more likely to come into close contact with the roll in supplying the graphite film between the rolls. This makes it possible to prevent the occurrence of wrinkling.

It should be noted that in the present invention, a roll such that a difference between a diameter of the middle of the roll and a diameter at a distance equivalent to one-fourth of the roll from the edge of the roll is not less than 50 µm is defined as the crown roll, and a roll such that the difference is less than 50 µm is defined as the flat roll.

With regard to the crown roll for use in the present invention, the difference between the diameter of the middle of the crown roll and the diameter at a distance equivalent to one-fourth of the crown roll from the end of the crown roll is not less than 50 µm and not greater than 500 µm, preferably not less than 100 µm and not greater than 300 µm, and more preferably not less than 150 µm and not greater than 250 µm.

<Method of Continuously Supplying Long Graphite Film to Laminator to Carry Out Continuous Lamination>

Figure 29:
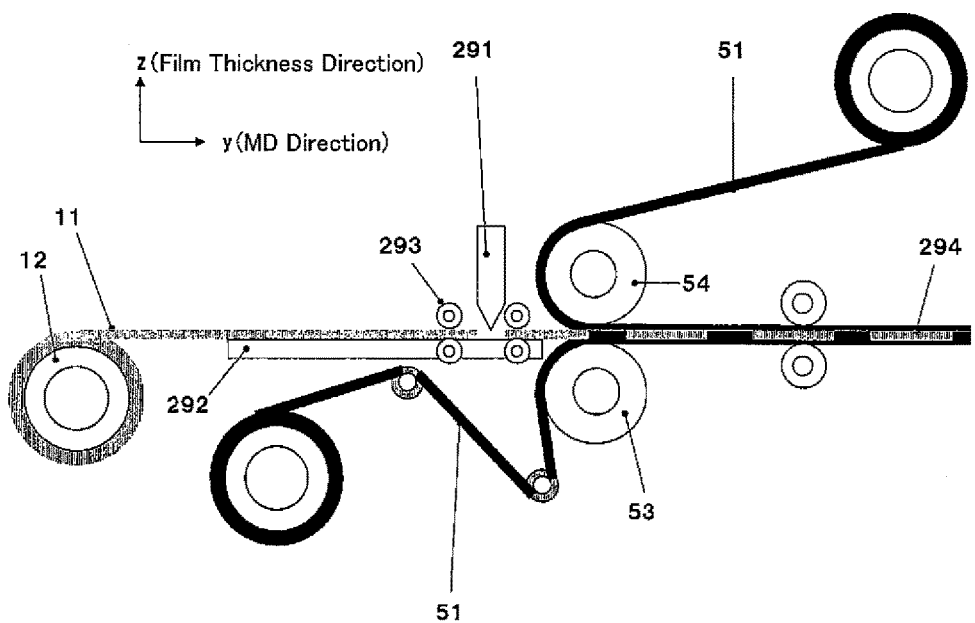
FIG. 29 is a view showing a method of continuously supplying a long graphite film to a laminator to continuously laminate the graphite film.

In the present invention, as shown in FIG. 29, intermittent lamination can also be carried out by continuously supplying a long graphite film to a laminator while cutting the graphite film into a desired shape to carry out continuous lamination.

<Example of Graphite Die-Cutting Product>

Figure 14:
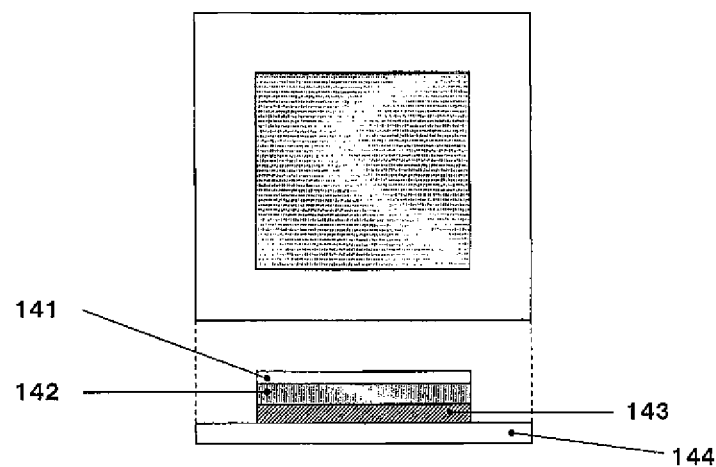
FIG. 14 is a view showing a graphite die-cutting product (No. 1)

A graphite die-cutting product of the present invention is a sticker-like product that is made by laminating the graphite film to the sheet having a self-adhesive layer or adhesive layer, such as a protective tape and/or double-sided tape, and then subjecting the laminate to die-cutting process into a desired shape, as shown in FIG. 14. A sticker shown in FIG. 14 lies on a separator, and the sticker is peeled off from the separator to use it.

An example of the graphite die-cutting product is given. The die-cutting product as shown in FIG. 14 can be obtained by laminating a separator and a double-sided tape to one side of the graphite film, further laminating a protective tape such as a PET tape thereto, and then half-cutting the laminate into a desired shape. The double-sided tape and the PET tape may be laminated in an inverse order. The term "half-cutting" as used herein means cutting the laminate to a predetermined layer without cutting out the laminate.

In a method for producing a graphite die-cutting product according to the present invention, the graphite film and the sheet having the self-adhesive layer or adhesive layer are laminated to each other, and an obtained composite sheet is subjected to die-cutting process. When a long graphite film is used in these processes, the laminating process and the die-cutting process can be carried out continuously.

Figure 15:
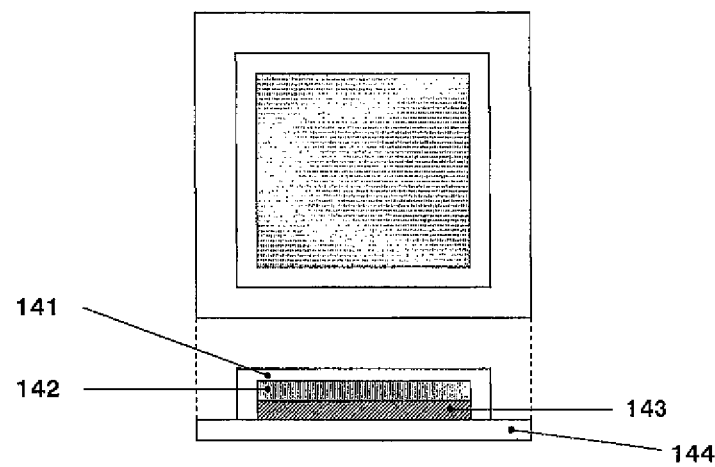
FIG. 15 is a view showing a graphite die-cutting product (No. 2)
Figure 16:
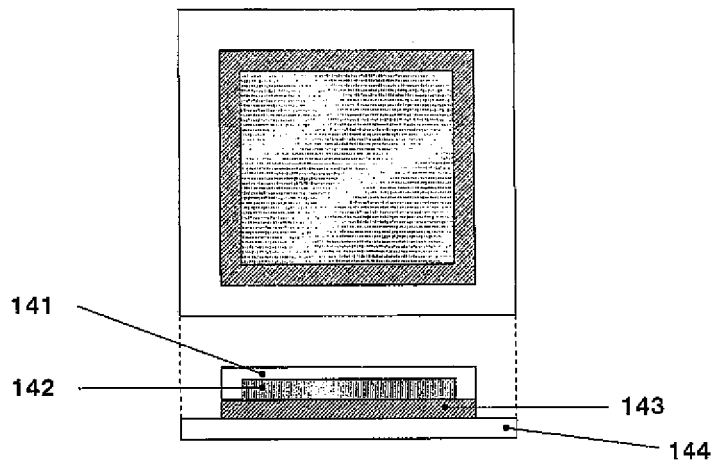
FIG. 16 is a view showing a graphite die-cutting product (No. 3)

For example, as shown in FIG. 14, a die-cutting product can be obtained by laminating the double-sided tape to one side of the long graphite film, and further laminating the PET tape thereto, and then half-cutting the laminate into a desired shape. Either the double-sided tape or the PET tape may be laminated first. Further, as shown in FIG. 15, a die-cutting product can be obtained by laminating the double-sided tape to one side of the long graphite film, half-cutting an obtained graphite sheet into a desired shape, laminating the PET tape to the graphite sheet, and then half-cutting an obtained laminated sheet into a shape such that its size is slightly larger than the graphite sheet. Still further, a die-cutting product as shown in FIG. 16 can be obtained in the following manner. The long graphite film is laminated to a slightly self-adhesive film, an obtained graphite sheet is subjected to half-cutting into a desired shape, and an unnecessary part of the graphite sheet is then peeled off. Next, the double-sided tape is laminated to the slightly self-adhesive film side of the graphite sheet, and the slightly self-adhesive film is then peeled off. Subsequently, the PET tape is laminated to the double-sided tape side of the graphite sheet, and the graphite sheet is subjected to half-cutting into such a shape that the self-adhesive tape remains in the rim of the graphite sheet, in a size slightly larger than the graphite film. Either the double-sided tape or the PET tape may be laminated first.

Figure 17:
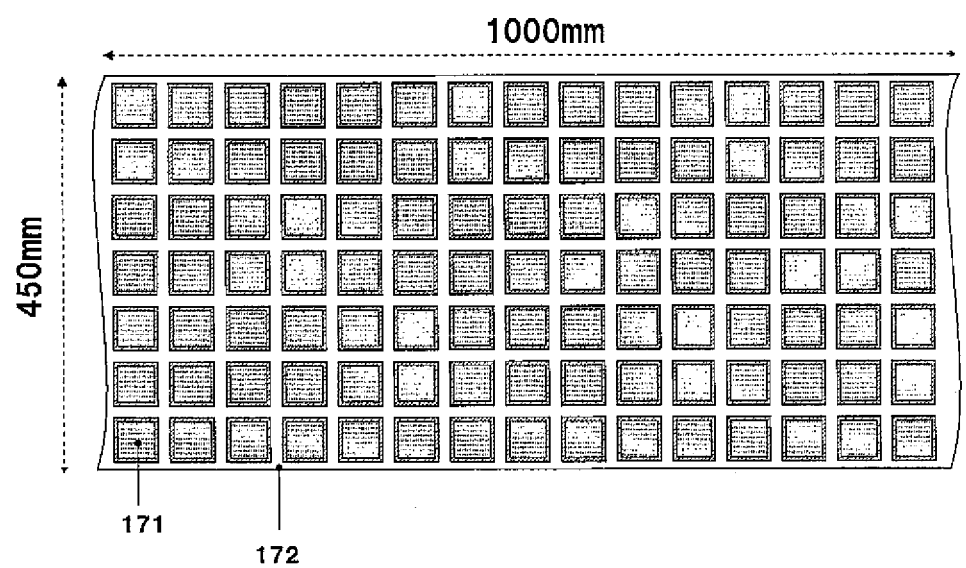
FIG. 17 is a view showing a form of graphite die-cutting products as merchandise.

From the viewpoint of productivity, it is preferable that several lines are processed in one operation to obtain graphite die-cutting products in a form shown in FIG. 17.

<Method for Producing Graphite Film Used in the Present Invention>

A graphite sheet used in the present invent ion may be either (i) a natural graphite sheet produced by allowing natural graphite to be foamed with acid and then roll-molding the foamed graphite or (ii) a thermally-decomposed graphite produced by subjecting a polymer film as a raw material to temperatures at not less than 2000° C., as long as the graphite sheet satisfies the following requirements: 1) having an average tearing force of not more than 0.08 N as determined by Trouser tear method in accordance with JIS K7128; and 2) having a sag of not less than 5 mm and not greater than 80 mm as determined by film windability evaluation in accordance with JIS C2151.

A graphite film used in the present invention shows an average tearing force of not greater than 0.08 N.

The following will describe a method for producing a fired polymer-derived graphite film as an example of the graphite film used in the present invention.

A graphite film can be produced by undergoing a carbonization step of wrapping a polyimide film (about 500 mm wide, 50 m long) around a graphite cylindrical core (ϕ 100 mm) to be shaped like a cylinder and then subjecting the polyimide film in cylindrical shape to heat treatment at temperatures reaching about 1000° C., and a graphitization step of subjecting a carbonized film having been obtained in the carbonization step to heat treatment at temperatures reaching 2500° C. or higher. In the conventional method in which a raw material film is wrapped around a carbon core, a graphite film such that its cylindrical film shape (curling) can be stretched (rolled out) was obtained, but a graphite film of higher quality level having optimum sag, value "a", and camber was not obtained. Such a graphite film suffers in the five modes from a high frequency of defects such as splitting, winding deviation, folding wrinkles, laminating wrinkles, and poor dimensional accuracy.

Figure 23:
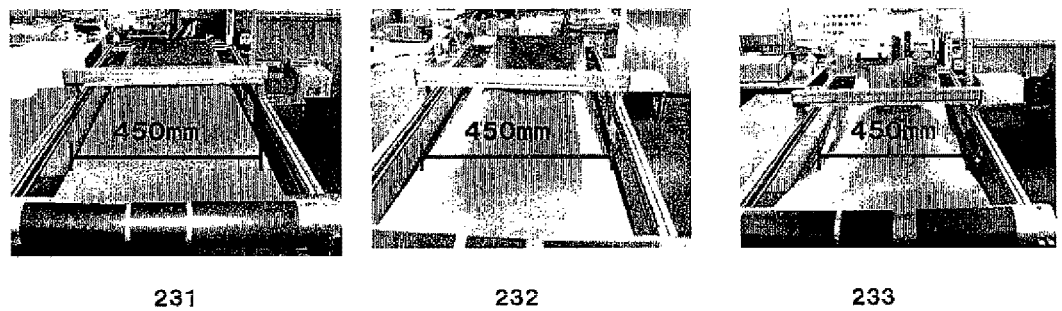
FIG. 23 is a view showing variations of sag between graphite films due to differences in conditions of manufacture of the graphite films

FIG. 23 shows three types of graphite films with different degrees of sag. In FIG. 23, a film 231 has sag of 10 mm, a film 232 has sag of 40 mm, a film 233 has sag of 80 mm. Optimization of conditions in the product ion enables preparation of rip-resistant graphite films having sag and the value "a" both of which are adjusted in an optimum range and being less likely to suffering from other defects, like the graphite film used in the present invention.

Figure 24:
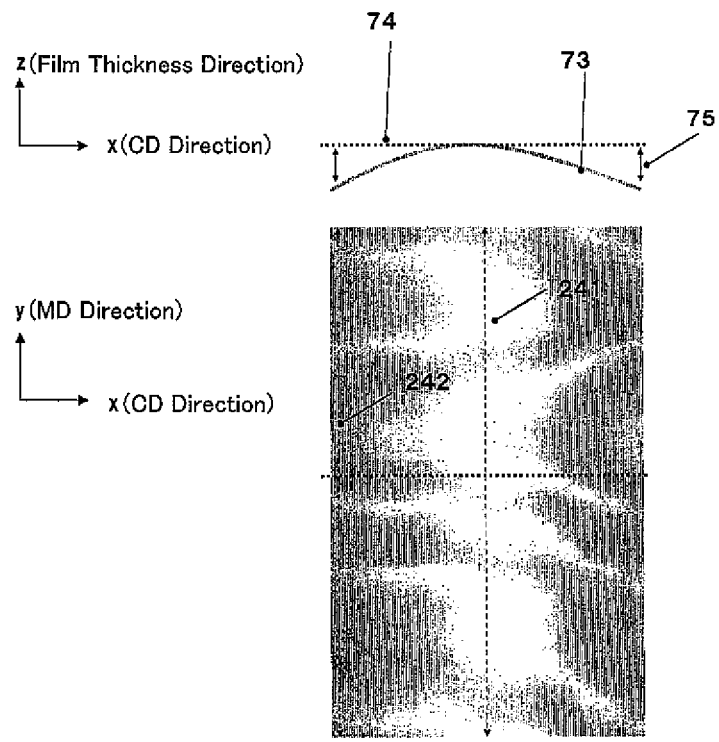
FIG. 24 is an explanatory view of sag.

A method for controlling sag of the graphite film used in the present invent ion will be described. As shown in FIG. 24, the occurrence of sag results from differences in length of the film in the MD direction among several points in the TD directions. A sagged part of the film is longer (242). That is, the sag of the graphite film used in the present invention is obtained by controlling the lengths of the film at different points in the TD directions. The following will list methods for controlling the sag.

(1) Sag Control by Heat Treatment

Figure 25:
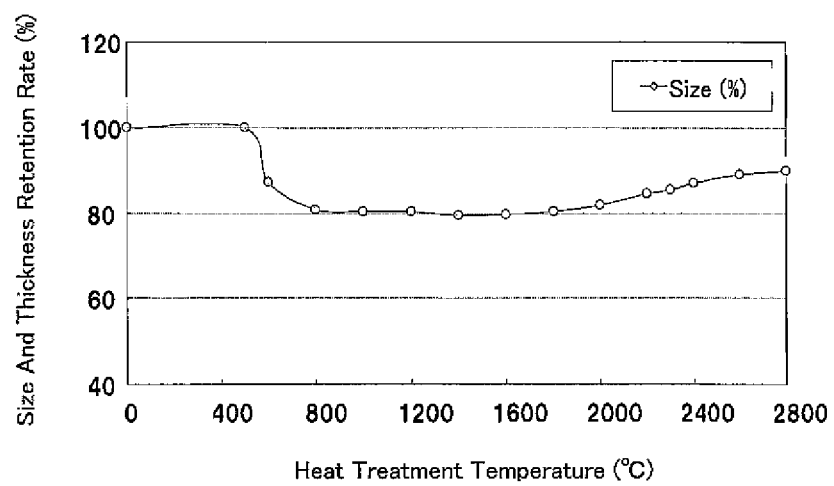
FIG. 25 is a graph showing a relationship between heat treatment temperatures and shrinkage/expansion of a polyimide film.

FIG. 25 shows a relationship between heat treatment temperatures and shrinkage/expansion of a polyimide film. As the polyimide film undergoes change into a carbonized film and change into a graphite film, the film suffers from shrinkage and expansion. Shrinkage and expansion occurs due to conversion of molecular structure of the film in the course of changing into the carbonized film and changing into the graphite film. For example, in the case of the polyimide film, the polyimide film shrinks to 80% of it original size before the temperatures reach around 600° C.

By taking advantage of such properties, change of the conditions in the heat treatment enables film size adjustment and sag control.

(1-1) Heat Treatment of Polyimide Film in a State being Wrapped Around Cylinder

The polyimide film is subjected to heat treatment in a state being wrapped around a graphite cylindrical container. When the heat treatment is carried out with the film being wrapped in a cylindrical shape, application of heat starts from the edges of the film when the film is rolled out, and graphitization of the film further proceeds at the edges to which much heat is applied. This is more likely to cause the film to expand in a planar direction, thus enabling the formation of sag at the edges of the graphite film.

(1-2) Control of Rate of Temperature Rise

Optimization of a rate of temperature rise also enables controlling the degree of sag. For example, with decrease in rate of temperature rise, temperatures of the entire film rise uniformly. This allows graphitization to proceed uniformly in the entire film, thus enabling the formation of sag with small depth.

(2) Method of Forming Sag by Using Gas Pressure of Decomposed Gas

A decomposed gas is generated in the course of graphitization of the polymer film. The decomposed gas escapes toward a direct ion in parallel to a film surface during the heat treatment, if the polymer film is wrapped around the cylindrical core. In this case, since gas pressure received by the edge of the film is extremely high, the edge of the film is stretched. Consequently, the graphite film thus obtained tends to have sag with a large depth at the edge thereof. In this manner, by adjusting pressure (gas pressure) of the generated decomposed gas, it is possible to control the degree of sag.

As an example of adjusting the gas pressure, a vessel with an air vent can be used to produce smooth flow of the decomposed gas toward the edge part of the film. In particular, as indicated by reference numeral 264 in FIG. 26, provision of air vents on the edge part side of the film yields a great effect.

As an example of producing smooth flow of the decomposed gas, the following method can also be given. That is, while inert gas such as N2 or Ar is supplied, depressurization to a pressure in a range from −0.08 MPa to 0.01 kPa is carried out so that the gas is more likely to escape from an exit of gas.

(3) Sag Control of Polymer Film

By using a sag-controlled polymer film, it is possible to obtain a graphite film having sag derived from the polymer film.

(4) Straightening for Flatness

A graphite film hardly expands at room temperature. However, sag of a graphite film having poor flatness can be straightened by pulling and pushing the film in such a state that the film is retained at temperatures of not less than 2500° C.

One example of straightening a graphite film is a method using difference in linear expansion between a graphite core and a graphite film. Specifically, a graphite film tightly wrapped around a graphite cylindrical core is subjected to the heat treatment at temperatures reaching 2600° C. or higher. At temperatures of not less than 2600° C., the graphite core expands more than the graphite film. Because of this, the graphite film is tightened by the core and is thus straightened to a flatter state. By adjusting a degree to which the graphite film is tightened by the cylindrical core and/or by adjusting a maximum temperature in the heat treatment, it is possible to adjust the degree of sag of the film.

<Polyimide Film>

As the polymer film used as a material for the fired polymer-derived graphite film, preferably used is a polyimide film for the following reasons.

(1) Carbonization and graphitization of a polyimide film easily proceed, which facilitates obtaining a graphite film with favorable crystallinity and favorable thermal diffusivity.

(2) A polyimide film allows selection of a variety of material monomers. With use of the polyimide film, a film having various structures and characteristics can be obtained by easy molecule designing.

Also, a polyimide film obtained by performing a chemical curing method of a polyamic acid as a precursor using a dehydrating agent and an amine in combination to execute imide inversion is more preferably used.

<Direction and Amount of Warpage of the Polymer Film>

With regard to the graphite film used in the present invention, the polymer film may be wound either with its first side facing either inside or with its first side facing outside. However, it is more preferable that the graphite film is completed by subjecting the polymer film to heat treatment at temperatures of not less than 2000° C. in such a state that the polymer film is wound with the first side thereof facing inside (hereinafter, the rolled polymer film is also referred to as "roll"). By winding the polymer film with the first side thereof facing inside the roll, it is possible to prevent the cylindrical shape of the polymer film from being deformed after heat-treated and to prevent the occurrence of splitting in rewinding the film.

Figure 30:
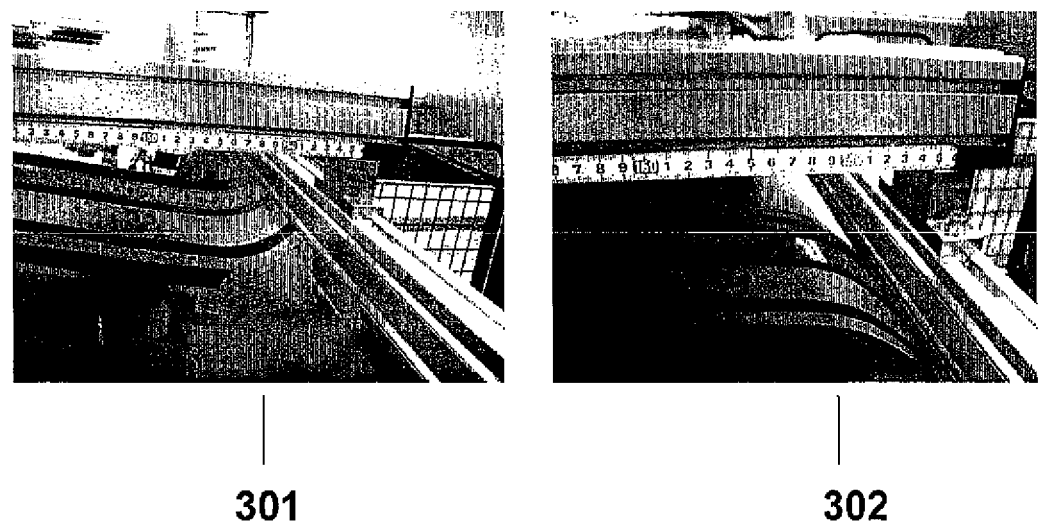
FIG. 30 is a view showing warpage of a polymer film.

The polymer film used in the present invention should have warpage. The warpage can be determined by the sag measurement in the film windability evaluation test in accordance with JIS C2151. For the specifics, refer to Examples. The direction of the warpage is confirmed by observing edges of the film as indicated by reference numerals 301 and 302 shown in FIG. 30. Reference numeral 301 indicates upward warpage, whereas reference numeral 302 indicates downward warpage. The amount of warpage of the polymer film can be measured by the sag measurement in the film windability evaluation test in accordance with JIS C2151. In the measurement, the specimen having 100 mm in width (TD direction) and 3000 mm in length (MD direction) is used. For the specifics, refer to Examples.

The amount of warpage of the polymer film used in the present invention is not less than 0.5 mm and not more than 16 mm, preferably not less than 1.0 mm and not more than 16 mm, more preferably not less than 1.5 mm and not more than 10 mm, and further preferably not less than 2 mm and not more than 8 mm. For the polymer film having warpage in amount of not less than 0.5 mm and not more than 16 mm, when the polymer film is subjected to heat treatment in such a state that the polymer film is wound with the first side facing inside, it is possible to obtain a graphite film without deformation of its cylindrical shape after the firing, suffering from less splitting at the edges thereof even after stretched, and suffering from no splitting when the graphite film is rewound.

<Definition of First Side and Second Side of Polymer Film>

Figure 31:
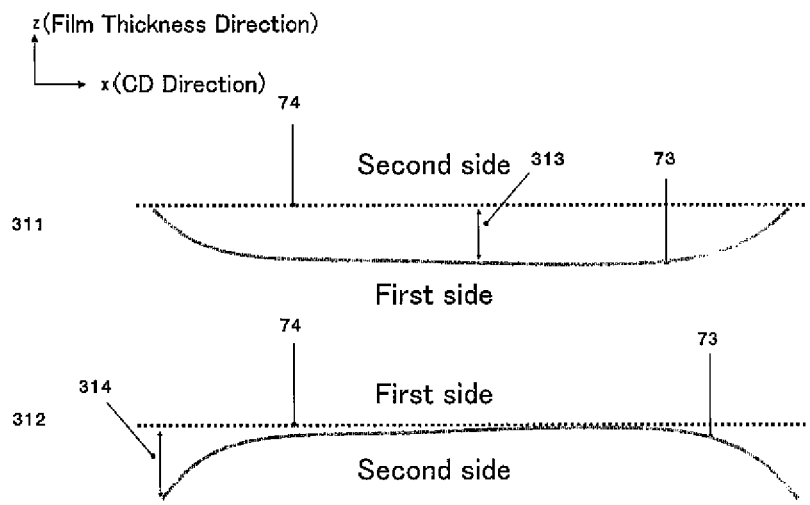
FIG. 31 is a schematic view showing sag occurring in the middle and sag occurring at the edges
Figure 32:
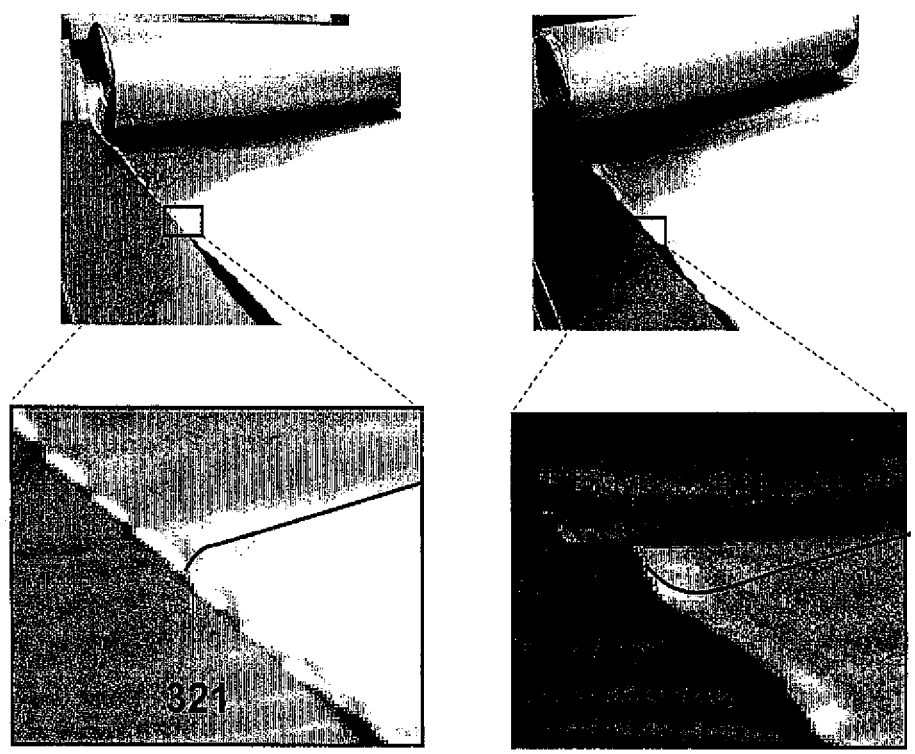
FIG. 32 is a view showing warpage at the edge of a graphite film.

In the present invention, a second side of the polymer film refers to a side in which the polymer film warps as shown in FIG. 31. The side opposite the second side is defined as the first side. By subjecting the polymer film to heat treatment in such a state that the polymer film is wound with the first side facing inside, it is possible to obtain a graphite film without deformation of its cylindrical shape after the firing, suffering from less splitting at the edges thereof even after stretched, and suffering from no splitting when the graphite film is rewound.

<Method for Producing Graphite Film>

A method for producing the graphite film used in the present invention is a method for producing a graphite film by subjecting a polymer film, and should include: 1) a preparatory step; 2) a carbonization step; and 3) a graphitization step. In order to prevent deformation of the shape of the film and the occurrence of splitting at the rewinding, it is preferable that the graphitization step is carried out in such a state that the first side of the polymer film faces inside of the roll.

1) The preparatory step is carried out by: a method of cutting a polymer film such as a polyimide film into sheet shape and then holding the polymer films in sheet form between plates or sheets in a rectangular jig; a method of winding a long polymer film around an inner 5 core jig to hold the polymer film; or the like method. The jig used in the preparatory step is preferably a jig that is made from a heat-resistant material like graphite. Further, it is preferable that the internal core around which the polymer film is wound is of cylindrical shape. A method for producing a graphite film according to the present invention is characterized by subjecting the polymer film to heat treatment in such a state that the polymer film is wound with its first side facing inside. Thus, when the preparation is carried out in the stage of the preparatory step so that the polymer film is wound with its first side facing inside, it is possible to produce a graphite film without carrying out rewinding or the like process in the carbonization step and the graphitization step.

2) The carbonization step is a step of subjecting the polymer film held with the jig to preliminary heating at temperatures reaching approximately 800° C., and is also a step of decomposing the polymer film by heat to obtain a carbonized film. The carbonized film thus obtained is a grass-like film weighing 60% of a weight of the polymer film.

3) The graphitization step is a step of heating the carbonized film formed in the carbonization step or the polymer film at temperatures of not less than 2000° C. to graphitize the carbonized film or polymer film. A maximum temperature for the graphitization is not less than 2000° C., preferably not less than 2700° C., more preferably not less than 2800° C., and further preferably not less than 2900° C. When the maximum temperature for the graphitization is not less than 2000° C., the graphitization proceeds so that the carbonized film or the polymer film turns into a high-quality graphite film that resists splitting.

Continuous carbonization treatment may be carried out in such a manner that a continuous strip of the polymer film is transferred while being rewound and is run through the furnace during the transfer. At the wind-up of the polymer film, when the polymer film is wound up in such a state that the first side of the original polymer film faces inside, graphitization can be directly carried out without being processed.

In the graphitization step, the film does not need to be held with the jig. However, it is preferable that the polymer film is subjected to heat treatment in such a state that the polymer film is wound with the first side facing inside, in order to prevent the shape of the film from being deformed.

Therefore, from the viewpoint of workability, it is preferable that the polymer film is wound with the first side facing inside in the preparatory step. Alternatively, graphitization treatment may be carried out after the carbonized film is unwound and wound up with the first side of the polymer film facing inside. Further, the carbonization step and the graphitization step may be continuously carried out.

Alternatively, after the carbonization step is completed, the graphitization step may be carried out singly.

<Screening Step>

A screening step of the present invent ion is a step of making preparation for the graphitization step by screening the polymer film to make sure that the polymer film is wound with the first side of the original polymer film facing inside. The screening step may be carried out at any time, whatever a phase of the polymer film is or whatever a phase of the carbonized film is, as long as the screening step is carried out before the graphitization step.

<Method of Forming Polyimide Film>

Deformation of a graphite film after the firing, splitting occurring when a cylinder-shaped graphite film is stretched, and splitting occurring at the rewinding are attributed to warpage of a polyimide film that is a material for the graphite film. The warpage of the polyimide film occurs during a process for producing the polyimide film.

An apparatus for allowing a polyimide precursor to be imidized and finally producing a polyimide film as a product is mainly constituted by the following two chambers: (i) a drum chamber or belt chamber including heating means for flow-casting and carrying out a chemical-curing process; and (ii) a tenter chamber in which a heat-curing process is carried out. One example of processes for producing a polyimide film according to the present invention is shown below with reference to FIG. 33. In the process executed in a belt chamber 3310, a polyimide precursor mixed by a blender is extruded in the shape of a film by a T-die 3312, and in a curing reaction chamber the film-shaped polyimide precursor extruded by the T-die 3312 is formed in the shape of a film on an endless belt or on a casting drum 3314. The film-shaped polyimide precursor is heated by heating means to be imidized while being moved by rotation of the belt or the drum. In the belt chamber, reaction products which are combustible volatile constituents consisting mainly of acetic acid and organic solvents are evaporated.

Examples of temperature conditions in the belt chamber are as follows: 100° C. in a first belt chamber, 120° C. in a second belt chamber, 130° C. in a third belt chamber, and 80° C. in a cooling pulley 3326. Such temperature conditions impart a self-supporting property to a casted film. Although the precise mechanism is unknown, temperature conditions in the belt chamber, temperature conditions in the cooling pulley, and the rotation speed of the belt affect the warpage of the polyimide film.

By undergoing these processes, a film of a polyimide precursor is imidized, a gel film having a self-supporting property is thus formed, and the gel film is stripped from the endless belt.

Figure 33:
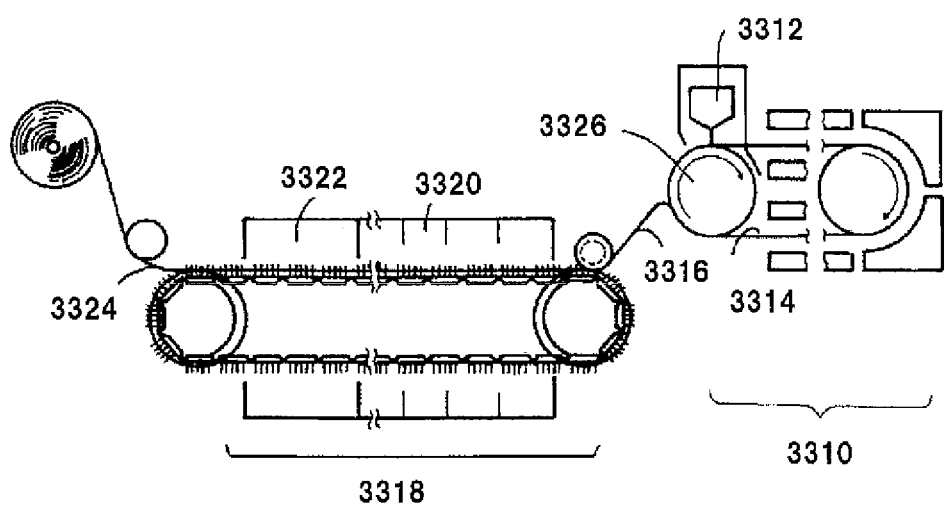
FIG. 33 is a schematic diagram showing an apparatus for producing a polyimide film.
Figure 34:
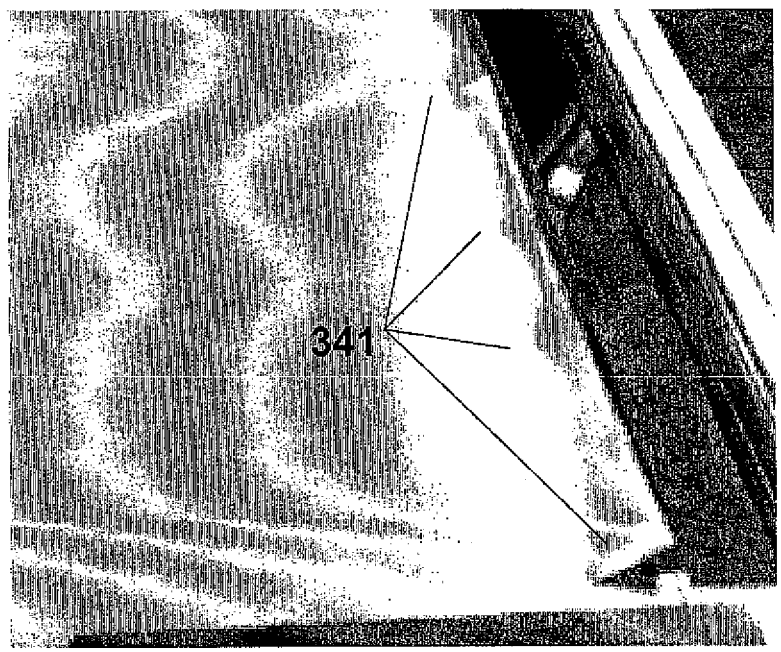
FIG. 34 is a view showing splitting caused when a graphite film is stretched.

A gel film 3316 is heat-treated in the tenter chamber 3318 with its edges fixed. For example, the tenter chamber 3318 is constituted by a heating furnace 3320 and a slow-cooling furnace 3322. In FIG. 33, a pin sheet, which is the film being fixed with pins, is shifted by rotation of a pin conveyer so that the film is moved in the tenter chamber. The gel film is further imidized by slow heating in the heating furnace 3320 in which the heat-curing process is carried out.

For example, a hot-air oven or a far-infrared heater is used as the heating furnace 3320. The temperatures in the heating furnace 3320 are gradually risen to complete the imidization of the polyimide film.

With regard to the temperatures in the heat treatment, initial temperatures are determined depending upon a thickness of the film, a type of organic solvent for use in the reaction of the polyimide precursor, etc. Depending upon the initial temperatures, the degree of drying varies. Specifically, it is preferable that the initial temperature for a film having a final thickness of 25 µm is in a range from 200° C. to 250° C., and the initial temperature for a film having a final thickness of 125 µm is in a range from 150° C. to 200° C. In this step, it is considered that the gel film is effectively dried, and imidization reaction proceeds simultaneously.

Thereafter, by gradual heating, the temperature reaches to a maximum temperature. The maximum temperature is preferably in a range from 500° C. to 630° C. and more preferably in a range from 540° C. to 580° C. Temperature gradient before reach to the maximum temperature is not particularly limited as long as the heat treatment is carried out in the above temperature ranges. A heat-treatment time is from several seconds to several tens of minutes, preferably from one minute to five minutes. The heat-treatment time is determined as appropriate depending upon the temperatures in the heat treatment.

Temperature gradient is not particularly limited, but is determined in accordance with the state of a film, such as a thickness of film and the degree of drying. A specific example of the temperature gradient is given. For a film having a thickness of 25 µm, the heat treatment is carried out for 30 seconds at a temperature ranging from 200° C. to 250° C., for 30 seconds at a temperature ranging from 300° C. to 350° C., for 30 seconds at a temperature ranging from 400° C. to 450° C., and for 60 seconds at a temperature ranging from 500° C. to 580° C.

The polyimide film completely imidized in the heating furnace 3320 during the above heat-curing process is allowed to cool slowly in the slow-cooling furnace 3322.

<Belt Side and Air Side>

In the present invention, in forming the polymer film by a casting method, one side of the gel film contacting the endless belt is referred to as "belt side", and the other side is referred to as "air side". Generally, the belt side is the first side.

EXAMPLES

The following will describe various Examples of the present invent ion together with several Comparative Examples. It should be noted that the term "graphite film" herein can be abbreviated as "GS".

<Graphite Films 1 through 20>

Graphite Film 1 (GS1)

Figure 26:
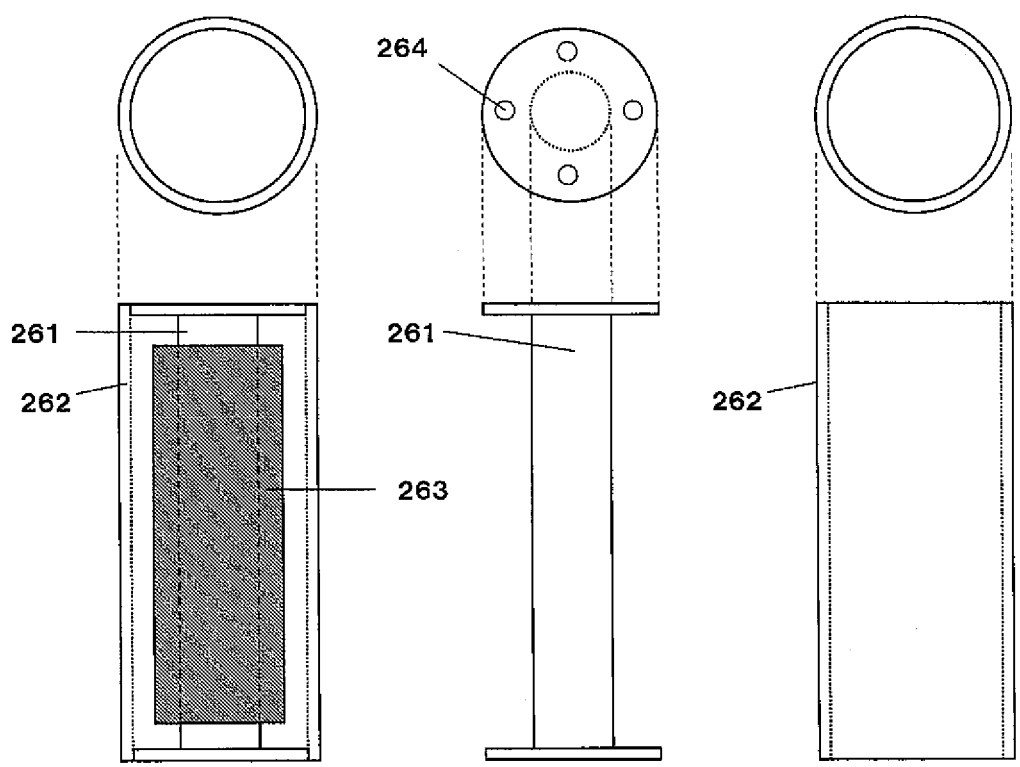
FIG. 26 is a view showing an example of carbonization of a polyimide film in such a state that the polyimide film is wrapped around a cylindrical container.
Figure 27:
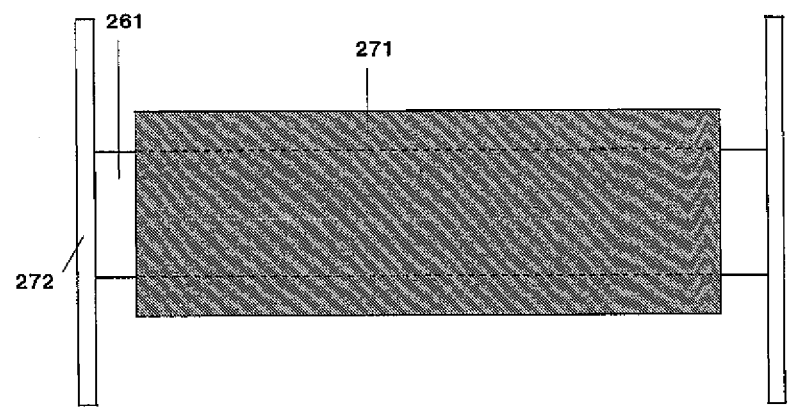
FIG. 27 is a view showing an example of graphitization of a polyimide film in such a state that the polyimide film is wrapped around a cylindrical container.

A polyimide film manufactured by Kaneka Corporation (Apical AV), having a thickness of 50 µm, a width of 500 mm, and a length of 50 m was wrapped around a cylindrical internal core made of graphite having an external diameter of 100 mm and a length of 600 mm, as shown in FIG. 26, and then covered with an external cylinder having an inner diameter of 130 mm. A vessel has several holes, as indicated by reference numeral 264, for allowing the vessel to have ventilation. This vessel was transversely set in an electric furnace. For better circulation of gas, the atmosphere in the furnace was depressurized to −0.05 MPa from an outlet of the furnace while 5 l of nitrogen per minute is supplied. Carbonization treatment was carried out under the conditions where the temperature was increased by 2° C. per minute to reach 1400° C. Next, an obtained carbonized film in the form of a roll was set to the internal core having an external diameter of 100 mm, as shown in FIG. 27, and this vessel was transversely set in a graphitization furnace (internal core being floated by means of an anchorage), and subjected to graphitization treatment under the conditions where the temperature was increased by 5° C. per minute to reach 2900° C. Further, the graphite film thus obtained was again wound up around a cylindrical core having an external diameter of 100 mm and heated at temperatures reaching 2900° C. again to carry out second graphitization treatment. Thereafter, by adjusting the force of winding of the obtained graphitized film, GS1 was prepared. The GS1 was such that the sag was 10 mm, the value "a" was 5 mm, the camber was less than 1 mm, the thickness was 25 µm, the width was 450 mm, the length was 35 m, the area was 25 15.75 m², and the average tearing force was 0.01 N.

Graphite Film 2 (GS2)

Except that the force of winding after the second graphitization treatment was adjusted, and the value "a" was adjusted to 2 mm, GS2 was prepared in the same manner as the GS1.

Graphite Film 3 (GS3)

Except that the force of winding after the second graphitization treatment was adjusted, and the sag and the value "a" were adjusted to 20 mm and 10 mm, respectively, GS3 was prepared in the same manner as the GS1.

Graphite Film 4 (GS4)

Except that the force of winding after the second graphitization treatment was adjusted, and the sag and the value "a" were adjusted to 40 mm and 30 mm, respectively, GS4 was prepared in the same manner as the GS1.

Graphite Film 5 (GS5)

Except that the force of winding after the second graphitization treatment was adjusted, and the sag, the value "a", and the average tearing force were adjusted to 40 mm, 30 mm, and 0.05 N, respectively, GS5 was prepared in the same manner as the GS1.

Graphite Film 6 (GS6)

Except that the force of winding after the second graphitization treatment was adjusted, and the sag and the value "a" were adjusted to 40 mm and 2 mm, respectively, GS6 was prepared in the same manner as the GS1.

Graphite Film 7 (GS7)

Except that the force of winding after the second graphitization treatment was adjusted, and the sag and the value "a" were adjusted to 70 mm and 50 mm, respectively, GS7 was prepared in the same manner as the GS1.

Graphite Film 8 (GS8)

Except that the force of winding after the second graphitization treatment was adjusted, and the sag and the value "a" were adjusted to 70 mm and 60 mm, respectively, GS8 was prepared in the same manner as the GS1.

Graphite Film 9 (GS9)

Except that a 75 µm-thick polyimide film (Apical AV) manufacture by Kaneka Corporation was used as a raw material, the force of winding after the second graphitization treatment was adjusted, and the sag, the value "a", and the thickness were adjusted to 40 mm, 30 mm, and 40 µm, respectively, GS9 was prepared in the same manner as the GS1.

Graphite Film 10 (GS10)

Except that a 275 mm-wide polyimide film (Apical AV) manufacture by Kaneka Corporation was used as a raw material, the force of winding after the second graphitization treatment was adjusted, and the sag, the value "a", and the width were adjusted to 10 mm, 5 mm, and 250 mm, respectively, GS10 was prepared in the same manner as the GS1.

Graphite Film 11 (GS11)

Except that a 140 mm-wide polyimide film (Apical AV) manufacture by Kaneka Corporation was used as a raw material, the force of winding after the second graphitization treatment was adjusted, and the sag, the value "a", and the width were adjusted to 10 mm, 5 mm, and 120 mm, respectively, GS11 was prepared in the same manner as the GS1.

Graphite Film 12 (GS12)

Except that the force of winding after the second graphitization treatment was adjusted, and the camber was adjusted to 5 mm, GS12 was prepared in the same manner as the GS11.

Graphite Film 13 (GS13)

Except that the force of winding after the second graphitization treatment was adjusted, and the camber was adjusted to 10 mm, GS13 was prepared in the same manner as the GS11.

Graphite Film 14 (GS14)

Except that the force of winding after the second graphitization treatment was adjusted, and the sag and the value "a" were adjusted to 2 mm and 2 mm, respectively, GS14 was prepared in the same manner as the GS1.

Graphite Film 15 (GS15)

Except that the force of winding after the second graphitization treatment was adjusted, and the sag and the value "a" were adjusted to 100 mm and 60 mm, respectively, GS15 was prepared in the same manner as the GS1.

Graphite Film 16 (GS16)

Except that the force of winding after the second graphitization treatment was adjusted, and the sag, the value "a", and the average tearing force were adjusted to 40 10 mm, 30 mm, and 0.12 N respectively, GS16 was prepared in the same manner as the GS1.

Graphite Film 17 (GS17)

By allowing natural graphite powder to be foamed with acid and then performing compression-molding using a reduction roll, GS17 having a thickness of 50 μm was prepared. The GS17 was such that the sag was 2 mm, the value "a" was 2 mm, the camber was less than 1 mm, the thickness was 50 μm, the width was 450 mm, the length was 35 m, the area was 15.75 m2, and the average tearing force was 0.12 N.

Graphite Film 18 (GS18)

A polyimide film manufactured by Kaneka Corporation (Polyimide Apical AH), having a length of 20 m, a width of 250 mm, and a thickness of 75 μm, was wrapped around a cylindrical carbonaceous core having an external diameter of 150 mm. By using an electric furnace, the polyimide film was heated in temperatures reaching 1000° C. in an atmosphere of nitrogen and then heat-treated for 1 hour at 1000° C. to carry out carbonization treatment (conversion into carbon). Subsequently, by using an ultrahigh temperature furnace, the carbonizad film thus obtained was heated in temperatures reaching 2800° C. in an atmosphere of argon, and the maximum temperature of 2800° C. was maintained for 1 hour. Thereafter, the resultant film was cooled to obtain GS18. The GS18 was such that the sag was 85 mm, the value "a" was 60 mm, the camber was less than 1 mm, the thickness was 40 μm, the width was 225 mm, the length was 18 m, the area was 4.05 m$^2$, and the average tearing force was 0.06 N.

Graphite Film 19 (GS19)

Except that a polyimide film manufactured by Kaneka Corporation (Polyimide Apical AH), having a length of 30 m, a width of 250 mm, and a thickness of 75 μm, was wrapped around a cylindrical carbonaceous core having an external diameter of 250 mm, GS19 was prepared in the same manner as the graphite film 18. The GS19 was such that the sag was 86 mm, the value "a" was 55 mm, the camber was less than 1 mm, the thickness was 40 μm, the width was 225 mm, the length was 27 m, the area was 6.075 m2, and the average tearing force was 0.06 N.

Graphite Film 20 (GS20)

Except that a polyimide film manufactured by Kaneka Corporation (Apical AV), having a thickness of 50 μm, a width of 500 mm, and a length of 50 m, was wrapped around a cylindrical carbonaceous core having an external diameter of 250 mm, GS20 was prepared in the same manner as the graphite film 18. The GS20 was such that the sag was 120 mm, the value "a" was 70 mm, the camber was less than 1 mm, the thickness was 25 μm, the width was 450 mm, the length was 35 m, the area was 15.75 m2, and the average tearing force was 0.06 N.

<Conditions for Measuring Various Types of Physical Properties>

<Measurement Principles for Evaluation of Sag and Camber>

The following will describe a camber-and-sag evaluation measuring method carried out in accordance with film windability evaluation described in JIS C2151.

The windability is evaluated on the basis of "distortion" that appears on the film supplied in the form of a roll. The film can have the following two patterns of appearance of "distortion" which can deteriorate adequate windability.

1) Film having "camber": not having a straight film edge.
2) Film having "sag": where the film is stretched, the film sags below its general level in areas where it have been stretched.

Although two camber and sag measurement methods, "method A" and "method B", are defined, sag and camber evaluations of the graphite film in the present invention are made in accordance with the method A.

<Sag Measurement of Graphite Film in Accordance with JIS C2151>

The film in a certain length is wound off and placed between two parallel sticks in a direct ion at right angles to the sticks under prescribed conditions. Then, a deviation from a uniform suspended line is measured. As an apparatus for sag evaluation, rolls of a winder can be used. However, if any doubt arises as to the result of the sag evaluation, apparatuses described below are used.

(Apparatuses) Apparatuses employed will be described in the following (FIG. 7).

a) Mount Equipped with Rolls

Freely-rotated two metallic rolls and a rigid mount supporting these two rolls in parallel Each of the rolls has a diameter of 100 mm±10 mm, and has a length to such an extent that a maximum width of the film to be tested can be sufficiently placed on the rolls. Axes of the two rolls are aligned in one horizontal plane and are fixed in parallel at a spacing of 1500 mm±10 mm within 0.1 degree (i.e. within 1.8 mm per meter of the roll's length). Each of the rolls has a cylindrical shape having a cylindricity of not greater than 0.1 mm, and has a surface subjected to appropriate pearskin finishing (not subjected to abrasive finishing). To the mount is attached a device (detachable shaft) for placing a film roll to be tested right below one of the rolls (first roll). The device is as follows:

1) The detachable shaft on which the film is placed is in parallel with the axis of the first roll within 1 degree.
2) Position of a lateral part of the film can be freely adjusted.
3) Drawing the film from the film roll while adjusting the tensile force for rewinding is enabled.

b) Device for Applying Tensile Force to the Film

The device enables the film freely sagged from the other roll (second roll) to be fixed to a weight or a spring-joint clamp at an opposite end of the mount. The device enables a load of 50 g per cm of the width of the film to be applied with the weight or spring, and adjusts a tensile force to be applied as uniformly as possible in the width direction of the film. Alternatively, the film may be wrapped around a tension roll, and a uniform tensile force of 50 g per cm of the width may be applied thereto.

c) Tools for Measuring Dimension

Tools by which a distance from a plane between the two rolls to the film sagged downward is measured at a midpoint between the two rolls along a line parallel to the rolls. The tools for use in the measurement are a steel straightedge ruler having a length of not less than 1525 mm and a steel graduated ruler having a length 5 of 150 mm and being marked with 1 mm increments. Alternatively, a complex device may be used that indicates the position of the film automatically or semiautomatically.

(Test Piece) A fresh test piece having a length of approximately 2 m slowly drawn from the roll of film with a minimum tensile force required for rewinding is used. In this process, the test piece is taken from around the center of the wound roll of film. More specifically, in the case of a roll of 100 m, three test pieces are taken from around 50 m away from the roll end.

(Measurement Procedure) As shown in FIG. 7, a test piece is placed in a length direction on two rolls of the apparatus. A tensile force is applied to the free end of the film. A final position of the film that passes over the second roll is adjusted such that the film becomes nearly level in the middle of the two rolls.

Using the steel straightedge ruler and the steel graduated ruler, or other appropriate tool, the film is confirmed along the width direction at the midpoint between the two rolls, and a sag with a maximum depth among all sags that lie at positions lower than normal height of the film therearound is measured at a minimum scale of 1 mm. This measurement is defined as a value of sag of the test piece.

(Results) The value of sag is determined as a median of three measurements.

<Measurement of Value "a" of Graphite Film>

The measurement of the value "a" of the graphite film was carried out after the film was set in the same state as in the above-described sag measurement in accordance with JIS C2151. As shown in FIG. 8, a depth of sag at the outer edge of the film from a suspended line was measured, and a depth of sag at the point 30 mm away from the outer edge of the film from the suspended line was then measured. Thereafter, (a depth of sag at the point 30 mm away from the outer edge) was subtracted from (a depth of sag at the outer edge). For the right and left edges of the film, the same measurement was carried out, and one measured value was determined as a mean value of the obtained two measurements for the right and left edges. A value of sag at the edge was determined as a median of the measurements obtained for three test pieces. The test pieces for used in the measurement were fresh test pieces having approximately 2 m slowly drawn from a roll of graphite film with a minimum tensile force required for rewinding. In this process, the test pieces were taken from around the center of the wound roll. More specifically, in the case of a roll of 100 m, three test pieces are taken from around 50 m away from the roll end.

<Measurement of Camber 5 of Graphite Film>

The film in a given length is rewound and placed on a plane, and each deviation from the straight line is measured for two edges of the film.

(Apparatus) Apparatuses employed will be described in the following (FIG. 9).

a) Table

The table employed has a width sufficiently greater than the maximum width of the film to be tested, a length of 1500 mm±15 mm, and a degree of parallelization at two ends being not greater than 0.1 degree (or not greater than 1.8 mm/m of the width of the table). The surface should be flat and horizontal which has been subjected to pearskin finishing with an appropriate material entity (not subjected to abrasive finishing). When the table has a greater length than that defined, two parallel reference lines with an interval of 1500 mm±15 mm should be clearly marked on the surface of the table. The degree of parallelization of the reference lines is to be not greater than 0.1 degree (i.e., not greater than 1.8 mm/m of the length of the reference line).

b) Brush

A soft brush for flattening the film placed on the surface of the table.

c) Straightedge ruler

A steel ruler having a length of not less than 1525 mm.

d) Graduated ruler

A steel graduated ruler having a length of 150 mm and being marked with 1 mm increments.

(Test Pieces) Three fresh test pieces each having a length of approximately 2 m are taken from the roll of film. To take the test pieces, the test pieces are slowly drawn from the roll of film with a minimum tensile force required for rewinding. In this process, the test pieces are taken from around the center of the wound roll of film. More specifically, in the case of a roll of 100 m, three test pieces are taken from around 50 m away from the roll end.

(Measurement Procedure) The test piece is placed on the table along a longitudinal direction as shown in FIG. 9. The film is gently brushed with weak force from one end to allow the test piece to be in close contact with the table such that trapped air does not remain as far as possible.

An edge of the straightedge ruler is placed along one edge of the film such that the deviation of the film edge from the straight line can be well observed. The steel straightedge ruler is adjusted so as to agree with the edges of the film at two ends of the table (or on reference line). Nearly in the middle between the reference positions, deviation $d_1$ of the film edge from the steel straightedge ruler is measured at a minimum scale of 1 mm using the steel graduated ruler.

Deviation $d_2$ of the other edge of the film from the straightedge ruler is also measured in the same way.

The camber value of the test piece is determined as sum $(d_1+d_2)$ of deviations of the film edge from the edge of the straightedge ruler represented by millimeter at two ends of the film in the middle of the interval between the reference lines. Furthermore, this process is repeated for other two test pieces. $R_{gs}$ is defined as $(d_1+d_2)$.

(Results) The camber is determined as a median of three measurements.

<Determination of Direction of Warpage of Polymer Film and Measurement of Amount of Warpage>

In order to determine the direction of warpage of the polymer film and evaluate the amount of warpage, the magnitude of warpage at the edge of the film was measured at room temperature (23° C.) by the sag measurement in accordance with film windability evaluation defined in JIS C2151.

(How to Prepare a Test Piece) 1) A fresh film having a length of approximately 3 m is drawn from a roll of polymer film. 2) Using a cutter, a test piece of 100 mm in width (TD direction) and of 3000 mm in length (MD direction) is cut away from around the center of the film. In this step, care should be taken to see that the TD and MD direct ions of the original roll of polymer film coincide with those of the test pieces obtained. In the same manner, the steps 1) and 2) are repeated to prepare three test pieces.

(Apparatus) As to an apparatus, the same one as shown in FIG. 7 is used.

(How to Determine the Direction of Warpage) As indicated by reference numeral 311 in FIG. 31, when the test piece is warped toward an upper side thereof, the upper side is determined as a second side. On the other hand, as indicated by reference numeral 312, when the test piece is warped toward a lower side thereof, the lower side is determined as the second side.

(How to Measure the Amount of Warpage) As indicated by reference numeral 311 in FIG. 31, the upper side is the second side, the film is turned upside down so that the lower side becomes the second side as indicated by reference numeral 312. In this manner, the measurement is carried out. As indicated by reference numeral 314 in FIG. 31, the sag at an outer edge of the test piece from a suspended line is measured. The sag measurement was carried out for the right and left edges, and the amount of warpage of the test piece is reported to be a mean value of the two measurements for the right and left edges.

(Results) The amount of warpage is determined as a median of three measurements.

<Measurement of the Area of Graphite Film>

The area of the graphite film can be evaluated from the product of measurements of the width and the length of the film. However, when the measurement of the length is difficult due to distorted shape, or due to the film property being easily broken, total weight of the graphite film in the form of a roll is measured, and the area may be determined based on the ratio to the weight of a piece cut away in part (100 mm×100 mm).

<Measurement of Thickness of Graphite Film>

Figure 28:
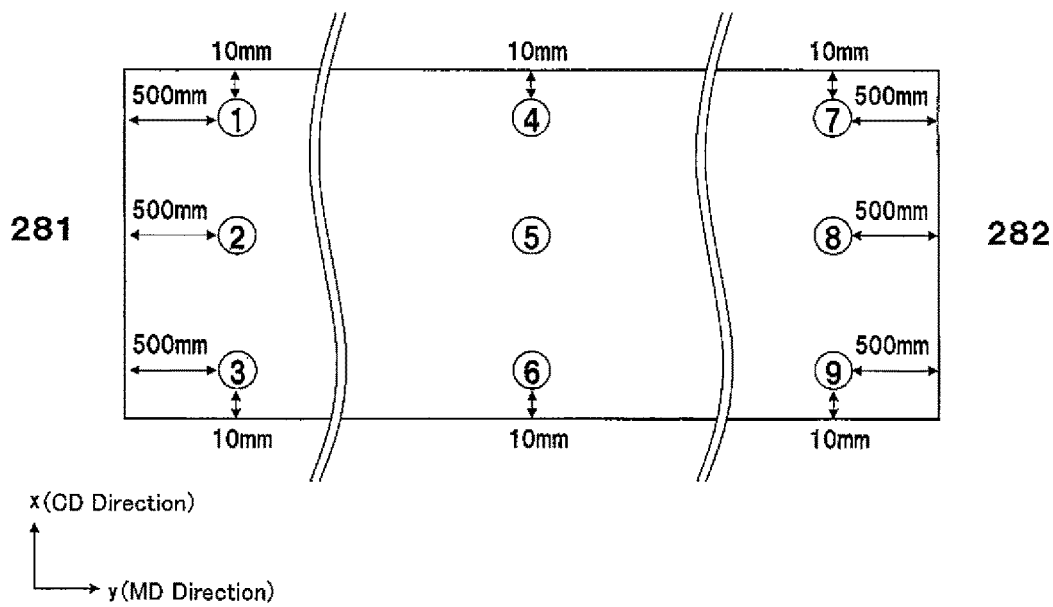
FIG. 28 is an explanatory view showing measurement points for average tearing force and thickness of a graphite film.

In the measurement of the thickness of the graphite film, a thickness gauge available from Heidenhain (HEIDENHAIN-CERTO) was used, in a temperature-controlled room at a room temperature of 25° C. The measurement positions were, as shown in FIG. 28, nine points of the polymer film and the graphite film in the form of a roll including points 1 to 3 aligning 500 mm away from the external end (roll start 281 of the film), points 7 to 9 aligning 500 mm away from the internal end of the film (roll end 282 of the film), and points 4 to 6 aligning at midpoints of them, respectively (the point 2 being midpoint between the point 1 and the point 3, and the point 5 being the midpoint of the point 2 and the point 8).

<Measurement of Width of Graphite Film>

The width of the graphite film is a length of the film in a direction perpendicular to the length direction of the film. The measurement points included, as shown in FIG. 28, a point aligning 500 mm away from the external end (roll end 281 of the film), a point aligning 500 mm away from the internal end (roll start 281 of the film), and a midpoint between the two points thereof. The width was determined as a mean value of three measurements.

<Measurement of Average Tearing Force of Graphite Film>

The measurement of average tearing force of the graphite film was carried out by Trouser tear method defined in JIS K7128. In the actual measurement, test pieces of 150 m×50 mm were taken from nine points shown in FIG. 28. On each of the sample pieces, a slit of 75 mm was made, and the test was conducted using an autograph at a test speed of 200 mm/min to measure the average tearing force. A measured value was determined as a mean value of nine measurements. To measure the average tearing force, Autograph (Model: AG-10 TB) manufactured by SIMAZU was used, and 50N load cell (Model: SBL-50N) was used.

<Tests (1) through (5)>

Tests conducted in Examples were the followings (1) through (5):

(1) Rewinding test;
(2) Slitting test;
(3) Compression test;
(4) Laminating test; and
(5) Die-cutting test.

<Evaluation of Splitting of Graphite Films in Tests (1) Through (5)>

The following describes a method for evaluating splitting of graphite films in the test (1) through (5). Across the whole area of the roll, splits of not less than 5 mm were counted and converted as the number of splits per unit length (1 m). The graphite films were rated as: "A" when the number of splits per meter was less than 0.05; "B" when the number of splits per meter was not less than 0.05 and less than 0.2; "C" when the number of splits per meter was not less than 0.2 and less than 1; "D" when the number of splits per meter was not less than 1 and less than 2; and "E" when the number of splits per meter was not less than 2.

<Evaluation of Winding Deviation in Tests (1) Through (3)>

In the tests (1) through (3), winding deviation (the degree of alignment of the edges of the roll of film) was evaluated. The edges of the rolls of graphite films after the completion of the tests were observed, and the graphite films were rated as: "A" when the edges were misaligned only by less than 5 mm at the maximum; "B" when the edges were misaligned by not less than 5 mm and less than 10 mm; "C" when the edges were misaligned by not less than 10 mm and less than 20 mm; and "D" when the edges were misaligned by not less than 20 mm and less than 30 mm; and "E" when the edges were misaligned by not less than 30 mm.

<Evaluation of Edge Burr of Graphite Films in Test (2)>

The degree of occurrence of burrs in a slit surface of the graphite film was evaluated. Across the whole area of the roll, burrs that could be visually observed were counted and converted as the number of burrs per unit length (1 m). The graphite films were rated as: "A" when the number of burrs per meter was less than 0.05; "B" when the number of burrs per meter was not less than 0.05 and less than 0.2; "C" when the number of burrs per meter was not less than 0.2 and less than 1; "D" when the number of burrs per meter was not less than 1 and less than 2; and "E" when the number of burrs per meter was not less than 2.

<Evaluation of Folding Wrinkles of Graphite Film after Completion of Test (3)>

The folding wrinkles of the graphite films after the completion of the compression test were evaluated as follows. Across the whole area of the roll, folding wrinkles of not less than 5 mm in length were counted and converted as the number of wrinkles per unit length (1 m). The graphite films were rated as: "A" when the number of wrinkles per meter was less than 0.05; "B" when the 5 number of wrinkles per meter was not less than 0.05 and less than 0.2; "C" when the number of wrinkles per meter was not less than 0.2 and less than 1; "D" when the number of wrinkles per meter was not less than 1 and less than 2; and "E" when the number of wrinkles per meter was not less than 2.

<Evaluation of Laminating Wrinkles of Graphite Composite Films after the Completion of Test (4)>

The laminating wrinkles of the graphite composite films after the completion of the laminating step were evaluated as follows. Across the whole area of the roll, laminating wrinkles of not less than 5 mm in length were counted and converted as the number of wrinkles per unit length (1 m). The graphite composite films were rated as: "A" when the number of wrinkles per meter was less than 0.05; "B" when the number of wrinkles per meter was not less than 0.05 and less than 0.2; "C" when the number of wrinkles per meter was not less than 0.2 and less than 1; "D" when the number of wrinkles per meter was not less than 1 and less than 2; and "E" when the number of wrinkles per meter was not less than 2.

<Evaluation of Dimensional Accuracy of Graphite Die-Cutting Products in Test (5)>

The dimensional accuracy of graphite die-cutting products was evaluated. With respect to all the obtained graphite die-cutting products, lengths of four sides were measured, and the products having four sides all of which fall within acceptable limit of 50 mm±0.5 mm were judged as being acceptable. From the number of acceptable products and the total number of graphite die-cutting products, an acceptance rate was calculated. The graphite die-cutting products were rated as: "A" when the acceptance rate was not less than 98%; "B" when the acceptance rate was not less than 95% and less than 98%; "C" when the acceptance rate was not less than 90% and less than 95%; "D" when the acceptance rate was not less than 85% and less than 90%; and "E" when the acceptance rate was less than 85%.

<Measurement of Thermal Diffusivity in Planar Direction of the Graphite Film Used in the Tests (1) Through (5)>

The thermal diffusivity in a planar direction of the graphite film was measured using a Thermal Constant Analyzer ("LaserPIT" available from ULVAC-RIKO, Inc.) according to an AC calorimeter Method, with a sample of pieces of each 4×40 mm cut away from the graphite film, in an atmosphere of 20° C. at 10 Hz. In the actual measurement, test pieces of each 150×50 mm were taken up from nine points of the graphite film shown in FIG. 28.

When the thermal diffusivity in a planar direction of the graphite film of the present invention is not less than $8.0 \times 10^{-4}$ m$^2$/s, the graphite film was rated as "A". When the thermal diffusivity is not less than $6.0 \times 10^{-4}$ m$^2$/s and less than $8.0 \times 10^{-4}$ m$^2$/s, the graphite film was rated as "B". When the thermal diffusivity is not less than $4.0 \times 10^{-4}$ m$^2$/s and less than $6.0 \times 10^{-4}$ m$^2$/s, the graphite film was rated as "C". When the thermal diffusivity is not less than $6.0 \times 10^{-4}$ m$^2$/s and less than $3.0 \times 10^{-4}$ m$^2$/s, the graphite film was rated as "D". When the thermal diffusivity is less than $3.0 \times 10^{-4}$ m$^2$/s, the graphite film was rated as "E".

Tables 1 through 5 provide parameters of graphite films used in Examples, Comparative Examples, and Reference Examples, and conditions for the tests (1) through (5). In addition, the following provides the parameters shown in Tables 1 through 5 with their meanings.

a=(depth of sag at the outer edge)−(depth of sag at a point 30 mm away from the outer edge)

b=Angle formed by a line connecting (the starting point of contact between the first roll and the graphite film) and (the center point of the first roll) and a line connecting (the center point of the first roll) and (the point of contact between the first roll and the second roll)

c=Angle formed by a line connecting (the starting point of contact between the second roll and the sheet having the self-adhesive layer or adhesive layer) and (the center point of the second roll) and a line connecting (the center point of the second roll) and (the point of contact between the first roll and the second roll)

(1) Rewinding Test

Example 1

As shown in FIG. 1, the rewinding test was carried out. More specifically, the GS1 wrapped around a 3-in. diameter first paper tube was rewound around a 3-in. diameter second paper tube placed in parallel with the first paper tube. A distance between the first and second paper tubes was 1000 mm. A tensile force to be applied in the MD direction of the graphite film was 30 g/cm, and the rewinding speed was 5 m/min. The degree of splitting in the graphite film and the degree of winding deviation were evaluated.

Example 2

Except that the tensile force to be applied in the MD direction was changed to 5 g/cm, the rewinding test was carried out as in Example 1.

Example 3

Except that the tensile force to be applied in the MD direction was changed to 100 g/cm, the rewinding test was carried out as in Example 1.

Example 4

Except that the tensile force to be applied in the MD direction was changed to 400 g/cm, the rewinding test was carried out as in Example 1.

Example 5

Except that the rewinding speed was changed to 20 m/min, the rewinding test was carried out as in Example 1.

Example 6

Except that the GS2 was used, the rewinding test was carried out as in Example 1.

Example 7

Except that the GS3 was used, the rewinding test was carried out as in Example 1.

Example 8

Except that the GS4 was used, the rewinding test was carried out as in Example 1.

Example 9

Except that the tensile force to be applied in the MD direction was changed to 5 g/cm, the rewinding test was carried out as in Example 8.

Example 10

Except that the tensile force to be applied in the MD direction was changed to 100 g/cm, the rewinding test was carried out as in Example 8.

Example 11

Except that the tensile force to be applied in the MD direction was changed to 400 g/cm, the rewinding test was carried out as in Example 8.

Example 12

Except that the rewinding speed was changed to 20 m/min, the rewinding test was carried out as in Example 8.

Example 13

Except that the GS5 was used, the rewinding test was carried out as in Example 1.

Example 14

Except that the GS6 was used, the rewinding test was carried out as in Example 1.

Example 15

Except that the GS7 was used, the rewinding test was carried out as in Example 1.

Example 16

Except that the GS8 was used, the rewinding test was carried out as in Example 1.

Example 17

Except that the GS9 was used, the rewinding test was carried out as in Example 1.

Example 18

Except that the GS10 was used, the rewinding test was carried out as in Example 1.

Example 19

Except that the GS11 was used, the rewinding test was carried out as in Example 1.

Example 20

Except that the GS12 was used, the rewinding test was carried out as in Example 1.

Example 21

Except that the GS13 was used, the rewinding test was carried out as in Example 1.

Comparative Example 1

Except that the GS14 was used, the rewinding test was carried out as in Example 1.

Comparative Example 2

Except that the GS15 was used, the rewinding test was carried out as in Example 1.

Comparative Example 3

Except that the GS16 was used, the rewinding test was carried out as in Example 1.

Reference Example 1

Except that the GS17 was used, the rewinding test was carried out as in Example 1.

TABLE 1

| | Conditions of graphite film | | | | | | | | Conditions of rewinding | | | Rating | | |
|---|---|---|---|---|---|---|---|---|---|---|---|---|---|---|
| | Type | Sag mm | a mm | Camber mm | Thickness μm | Width mm | Length m | Area $m^2$ | Average tearing force N | Tensile force g/cm | Speed m/min | Splitting | Winding deviation | Thermal diffusivity of GS |
| Example 1 | GS1 | 10 | 5 | <1 | 25 | 450 | 35 | 15.8 | 0.010 | 30 | 5 | B | A | A |
| Example 2 | GS1 | 10 | 5 | <1 | 25 | 450 | 35 | 15.8 | 0.010 | 5 | 5 | A | B | A |
| Example 3 | GS1 | 10 | 5 | <1 | 25 | 450 | 35 | 15.8 | 0.010 | 100 | 5 | C | A | A |
| Example 4 | GS1 | 10 | 5 | <1 | 25 | 450 | 35 | 15.8 | 0.010 | 400 | 5 | C | A | A |
| Example 5 | GS1 | 10 | 5 | <1 | 25 | 450 | 35 | 15.8 | 0.010 | 30 | 20 | C | B | A |
| Example 6 | GS2 | 10 | 2 | <1 | 25 | 450 | 35 | 15.8 | 0.010 | 30 | 5 | C | A | A |
| Example 7 | GS3 | 20 | 10 | <1 | 25 | 450 | 35 | 15.8 | 0.010 | 30 | 5 | B | A | A |
| Example 8 | GS4 | 40 | 30 | <1 | 25 | 450 | 35 | 15.8 | 0.010 | 30 | 5 | A | A | A |
| Example 9 | GS4 | 40 | 30 | <1 | 25 | 450 | 35 | 15.8 | 0.010 | 5 | 5 | A | C | A |
| Example 10 | GS4 | 40 | 30 | <1 | 25 | 450 | 35 | 15.8 | 0.010 | 100 | 5 | A | A | A |
| Example 11 | GS4 | 40 | 30 | <1 | 25 | 450 | 35 | 15.8 | 0.010 | 400 | 5 | B | A | A |
| Example 12 | GS4 | 40 | 30 | <1 | 25 | 450 | 35 | 15.8 | 0.010 | 30 | 20 | A | B | A |
| Example 13 | GS5 | 40 | 30 | <1 | 25 | 450 | 35 | 15.8 | 0.050 | 30 | 5 | A | A | C |
| Example 14 | GS6 | 40 | 2 | <1 | 25 | 450 | 35 | 15.8 | 0.010 | 30 | 5 | C | A | A |
| Example 15 | GS7 | 70 | 50 | <1 | 25 | 450 | 35 | 15.8 | 0.010 | 30 | 5 | A | C | A |
| Example 16 | GS8 | 70 | 60 | <1 | 25 | 450 | 35 | 15.8 | 0.010 | 30 | 5 | A | D | A |
| Example 17 | GS9 | 40 | 30 | <1 | 40 | 450 | 35 | 15.8 | 0.010 | 30 | 5 | A | A | A |
| Example 18 | GS10 | 10 | 5 | <1 | 25 | 250 | 35 | 8.75 | 0.010 | 30 | 5 | A | A | A |
| Example 19 | GS11 | 10 | 5 | <1 | 25 | 120 | 35 | 4.2 | 0.010 | 30 | 5 | A | A | A |
| Example 20 | GS12 | 10 | 5 | 5 | 25 | 120 | 35 | 4.2 | 0.010 | 30 | 5 | B | C | A |
| Example 21 | GS13 | 10 | 5 | 10 | 25 | 120 | 35 | 4.2 | 0.010 | 30 | 5 | C | D | A |
| Comparative Example 1 | GS14 | 2 | 2 | <1 | 25 | 450 | 35 | 15.8 | 0.010 | 30 | 5 | E | A | A |
| Comparative Example 2 | GS15 | 100 | 60 | <1 | 25 | 450 | 35 | 15.8 | 0.010 | 30 | 5 | A | E | A |
| Comparative Example 3 | GS16 | 40 | 30 | <1 | 25 | 450 | 35 | 15.8 | 0.120 | 30 | 5 | A | A | E |
| Reference Example 1 | GS17 | 2 | 2 | <1 | 50 | 450 | 35 | 15.8 | 0.120 | 30 | 5 | A | A | E |

(2) Slitting Test

Example 22

The slitting test as shown in FIG. 2 was carried out. More specifically, the GS1 wrapped around a 3-in. diameter first paper tube was slit in half lengthwise with a roll cutter while being rewound around a 3-in. diameter second paper tube placed in parallel with the first paper tube. A distance between the first and second paper tubes 5 was 1000 mm. The cutter for use in slitting was located midway between the first and second paper tubes. A tensile force to be applied in the MD direct ion of the graphite film was 30 g/cm, and the rewinding speed was 5 m/min. The degree of splitting in the graphite film, the degree of winding deviation, and the degree of edge burr were evaluated.

Example 23

Except that a straight cutter was used, the slitting test was carried out as in Example 22.

Example 24

Except that the GS2 was used, the slitting test was carried out as in Example 22.

Example 25

Except that the GS3 was used, the slitting test was carried out as in Example 22.

Example 26

Except that the GS4 was used, the slitting test was carried out as in Example 22.

Example 27

Except that the straight cutter was used, the slitting test was carried out as in Example 26.

Example 28

Except that the GS5 was used, the slitting test was carried out as in Example 22.

Example 29

Except that the GS6 was used, the slitting test was carried out as in Example 22.

Example 30

Except that the GS7 was used, the slitting test was carried out as in Example 22.

Example 31

Except that the GS8 was used, the slitting test was carried out as in Example 22.

Example 32

Except that the GS11 was used, the slitting test was carried out as in Example 22.

Example 33

Except that the GS12 was used, the slitting test was carried out as in Example 22.

Example 34

Except that the GS13 was used, the slitting test was carried out as in Example 22.

Comparative Example 4

Except that the GS14 was used, the slitting test was carried out as in Example 22.

Comparative Example 5

Except that the GS15 was used, the slitting test was carried out as in Example 22.

Comparative Example 6

Except that the GS16 was used, the slitting test was carried out as in Example 22.

Reference Example 2

Except that the GS17 was used, the slitting test was carried out as in Example 22.

TABLE 2

| | | Conditions of graphite film | | | | | | | Conditions of slitting | | | Rating | | | |
| --- | --- | --- | --- | --- | --- | --- | --- | --- | --- | --- | --- | --- | --- | --- | --- |
| | Type | Sag mm | a mm | Camber mm | Thickness μm | Width mm | Length m | Area m$^2$ | Average tearing force N | Tensile force g/cm | Speed m/min | Type of Cutter | Splitting | Winding deviation | States of edges | Thermal diffusivity of GS |
| Example 22 | GS1 | 10 | 5 | <1 | 25 | 450 | 35 | 15.8 | 0.010 | 30 | 5 | Roll cutter | B | A | A | A |
| Example 23 | GS1 | 10 | 5 | <1 | 25 | 450 | 35 | 15.8 | 0.010 | 30 | 5 | Straight cutter | C | A | C | A |
| Example 24 | GS2 | 10 | 2 | <1 | 25 | 450 | 35 | 15.8 | 0.010 | 30 | 5 | Roll cutter | C | A | A | A |
| Example 25 | GS3 | 20 | 10 | <1 | 25 | 450 | 35 | 15.8 | 0.010 | 30 | 5 | Roll cutter | B | A | A | A |
| Example 26 | GS4 | 40 | 30 | <1 | 25 | 450 | 35 | 15.8 | 0.010 | 30 | 5 | Roll cutter | A | A | A | A |
| Example 27 | GS5 | 40 | 30 | <1 | 25 | 450 | 35 | 15.8 | 0.010 | 30 | 5 | Straight cutter | B | A | B | A |

TABLE 2-continued

| | Conditions of graphite film | | | | | | | | Conditions of slitting | | | Rating | | | |
|---|---|---|---|---|---|---|---|---|---|---|---|---|---|---|---|
| | Type | Sag mm | a mm | Camber mm | Thickness μm | Width mm | Length m | Area m² | Average tearing force N | Tensile force g/cm | Speed m/min | Type of Cutter | Splitting | Winding deviation | States of edges | Thermal diffusivity of GS |
| Example 28 | GS6 | 40 | 30 | <1 | 25 | 450 | 35 | 15.8 | 0.050 | 30 | 5 | Roll cutter | B | A | C | C |
| Example 29 | GS6 | 40 | 2 | <1 | 25 | 450 | 35 | 15.8 | 0.010 | 30 | 5 | Roll cutter | C | A | A | A |
| Example 30 | GS7 | 70 | 50 | <1 | 25 | 450 | 35 | 15.8 | 0.010 | 30 | 5 | Roll cutter | A | C | A | A |
| Example 31 | GS8 | 70 | 60 | <1 | 25 | 450 | 35 | 15.8 | 0.010 | 30 | 5 | Roll cutter | A | D | A | A |
| Example 32 | GS11 | 10 | 5 | <1 | 25 | 120 | 35 | 4.2 | 0.010 | 30 | 5 | Roll cutter | A | A | A | A |
| Example 33 | GS12 | 10 | 5 | 5 | 25 | 120 | 35 | 4.2 | 0.010 | 30 | 5 | Roll cutter | B | C | A | A |
| Example 34 | GS13 | 10 | 5 | 10 | 25 | 120 | 35 | 4.2 | 0.010 | 30 | 5 | Roll cutter | C | D | A | A |
| Comparative Example 4 | GS14 | 2 | 2 | <1 | 25 | 450 | 35 | 15.8 | 0.010 | 30 | 5 | Roll cutter | E | A | A | A |
| Comparative Example 5 | GS15 | 100 | 60 | <1 | 25 | 450 | 35 | 15.8 | 0.010 | 30 | 5 | Roll cutter | A | E | A | A |
| Comparative Example 6 | GS16 | 40 | 30 | <1 | 25 | 450 | 35 | 15.8 | 0.120 | 30 | 5 | Roll cutter | B | E | E | E |
| Reference Example 2 | GS17 | 2 | 2 | <1 | 50 | 450 | 35 | 15.8 | 0.120 | 30 | 5 | Roll cutter | A | A | C | E |

(3) Compression Test

Example 35

By using a single-plate continuous press as shown in FIG. 3, the compression test was carried out. More specifically, the GS1 wrapped around a 3-in. diameter first paper tube, while being rewound around a 3-in. diameter second paper tube placed in parallel with the first paper tube, was continuously pressed at a midpoint between the first and second paper tubes by using a die measuring 30 mm in width and 500 mm in length. The number of times the graphite film was pressed was 60 times/min. A tensile force to be applied in the MD direction of the graphite film was 30 g/cm, and the rewinding speed was 1 m/min. The degree of splitting in the graphite film, the degree of winding deviation, and the degree of wrinkling caused after the compression were evaluated.

Example 36

By using a rolling mill as shown in FIG. 4, the compression test was carried out. More specifically, the compression test was carried out in such a manner that the GS1 wrapped around a 3-in. diameter first paper tube, while being rewound around a 3-in. diameter second paper tube placed in parallel with the first paper tube, was allowed to pass between a metal mill roll of 300 mm in external diameter and a resin mill roll of 280 mm in external diameter which were placed at a midpoint between the first and second paper tubes. A tensile force to be applied in the MD direction of the graphite film was 30 g/cm, and the rewinding speed was 1 m/min. The degree of splitting in the graphite film, the degree of winding deviation, and the degree of wrinkling caused after the compression were evaluated.

Example 37

Except that the tensile force to be applied in the MD direction of the graphite film was changed to 100 g/cm, the compression test was carried out as in Example 36.

Example 38

Except that the GS2 was used, the compression test was carried out as in Example 35.

Example 39

Except that the GS3 was used, the compression test was carried out as in Example 35.

Example 40

Except that the GS4 was used, the compression test was carried out as in Example 35.

Example 41

Except that the GS4 was used, the compression test was carried out as in Example 36.

Example 42

Except that the GS4 was used, the compression test was carried out as in Example 37.

Example 43

Except that the GS5 was used, the compression test was carried out as in Example 35.

Example 44

Except that the GS6 was used, the compression test was carried out as in Example 35.

Example 45

Except that the GS7 was used, the compression test was carried out as in Example 35.

Example 46

Except that the GS8 was used, the compression test was carried out as in Example 35.

Example 47

Except that the GS11 was used, the compression test was carried out as in Example 35.

Example 48

Except that the GS12 was used, the compression test was carried out as in Example 35.

Example 49

Except that the GS13 was used, the compression test was carried out as in Example 35.

Comparative Example 7

Except that the GS14 was used, the compression test was carried out as in Example 35.

Comparative Example 8

Except that the GS15 was used, the compression test was carried out as in Example 35.

Comparative Example 9

Except that the GS16 was used, the compression test was carried out as in Example 35.

Reference Example 3

Except that the GS17 was used, the compression test was carried out as in Example 35.

TABLE 3

| | | Conditions of graphite film | | | | | | | |
|---|---|---|---|---|---|---|---|---|---|
| | Type | Sag mm | a mm | Camber mm | Thickness μm | Width mm | Length m | Area m$^2$ | Average tearing force N |
| Example 35 | GS1 | 10 | 5 | <1 | 25 | 450 | 35 | 15.8 | 0.010 |
| Example 36 | GS1 | 10 | 5 | <1 | 25 | 450 | 35 | 15.8 | 0.010 |
| Example 37 | GS1 | 10 | 5 | <1 | 25 | 450 | 35 | 15.8 | 0.010 |
| Example 38 | GS2 | 10 | 2 | <1 | 25 | 450 | 35 | 15.8 | 0.010 |
| Example 39 | GS3 | 20 | 10 | <1 | 25 | 450 | 35 | 15.8 | 0.010 |
| Example 40 | GS4 | 40 | 30 | <1 | 25 | 450 | 35 | 15.8 | 0.010 |
| Example 41 | GS4 | 40 | 30 | <1 | 25 | 450 | 35 | 15.8 | 0.010 |
| Example 42 | GS4 | 40 | 30 | <1 | 25 | 450 | 35 | 15.8 | 0.010 |
| Example 43 | GS5 | 40 | 30 | <1 | 25 | 450 | 35 | 15.8 | 0.050 |
| Example 44 | GS6 | 40 | 2 | <1 | 25 | 450 | 35 | 15.8 | 0.010 |
| Example 45 | GS7 | 70 | 50 | <1 | 25 | 450 | 35 | 15.8 | 0.010 |
| Example 46 | GS8 | 70 | 50 | <1 | 25 | 450 | 35 | 15.8 | 0.010 |
| Example 47 | GS11 | 10 | 5 | <1 | 25 | 120 | 35 | 4.2 | 0.010 |
| Example 48 | GS12 | 10 | 5 | 5 | 25 | 120 | 35 | 4.2 | 0.010 |
| Example 49 | GS13 | 10 | 5 | 10 | 25 | 120 | 35 | 4.2 | 0.010 |
| Comparative Example 7 | GS14 | 2 | 2 | <1 | 25 | 450 | 35 | 15.8 | 0.010 |
| Comparative Example 8 | GS15 | 100 | 60 | <1 | 25 | 450 | 35 | 15.8 | 0.010 |
| Comparative Example 9 | GS16 | 40 | 30 | <1 | 25 | 450 | 35 | 15.8 | 0.120 |
| Reference Example 3 | GS17 | 2 | 2 | <1 | 50 | 450 | 35 | 15.8 | 0.120 |

| | Conditions of compression | | | Rating | | | |
|---|---|---|---|---|---|---|---|
| | Tensile force g/cm | Speed m/min | Method of Compression | Splitting | Winding deviation | Thermal diffusity of GS | Wrinkling |
| Example 35 | 30 | 1 | Single-plate continuous press | C | A | A | A |
| Example 36 | 30 | 1 | Rolling Mill | B | A | A | B |
| Example 37 | 100 | 1 | Rolling Mill | B | A | A | A |
| Example 38 | 30 | 1 | Single-plate continuous press | D | A | A | A |
| Example 39 | 30 | 1 | Single-plate continuous press | C | A | A | A |
| Example 40 | 30 | 1 | Single-plate continuous press | A | A | A | A |
| Example 41 | 30 | 1 | Rolling Mill | A | A | A | C |
| Example 42 | 100 | 1 | Rolling Mill | A | A | A | B |
| Example 43 | 30 | 1 | Single-plate continuous press | A | A | C | A |
| Example 44 | 30 | 1 | Single-plate continuous press | D | A | A | A |
| Example 45 | 30 | 1 | Single-plate continuous press | A | C | A | A |

TABLE 3-continued

| | | | | | | | |
|---|---|---|---|---|---|---|---|
| Example 46 | 30 | 1 | Single-plate continuous press | A | D | A | A |
| Example 47 | 30 | 1 | Single-plate continuous press | A | A | A | A |
| Example 48 | 30 | 1 | Single-plate continuous press | B | C | A | A |
| Example 49 | 30 | 1 | Single-plate continuous press | C | D | A | A |
| Comparative Example 7 | 30 | 1 | Single-plate continuous press | E | A | A | A |
| Comparative Example 8 | 30 | 1 | Single-plate continuous press | A | E | A | A |
| Comparative Example 9 | 30 | 1 | Single-plate continuous press | B | A | E | A |
| Reference Example 3 | 30 | 1 | Single-plate continuous press | A | A | E | A |

(4) Laminating Test

Example 50

The laminating test as shown in FIG. 5 was carried out. More specifically, the GS1 wrapped around a 3-in. diameter paper tube was continuously supplied, at the angle b of 120 degrees, between the first and second rolls, which are aligned in parallel with each other, each measuring 50 mm in external diameter and 635 mm in length, so that the GS1 was laminated to the PET tape measuring 10 urn in thickness and 430 mm in width. As the PET tape, a PET tape with a separator (No. 633K) available from Teraoka Seisakusho Co., Ltd. was used. The PET tape was supplied to the second roll at the angle c of 120 degrees while the separator was peeled off at an angle of 80 degrees. As the first roll, a flat roll (In FIG. 13, difference between the diameter of the middle of the roll and the diameter at a distance equivalent to one-fourth of the roll from its end is not more than 20 μm) was used. As the second roll, a crown roll (In FIG. 13, difference between the diameter of the middle of the roll and the diameter at a distance equivalent to one-fourth of the roll from its end is 200 μm) was used. A tensile force to be applied in the MD direct ion of the graphite film was 30 g/cm, and the rewinding speed was 1 m/min. The degree of splitting in the graphite film and the degree of laminating wrinkles were evaluated.

Example 51

Except that the tensile force to be applied in the MD direction of the graphite film was changed to 100 g/cm, the laminating test was carried out as in Example 50.

Example 52

Except that the GS2 was used, the laminating test was carried out as in Example 50.

Example 53

Except that the GS3 was used, the laminating test was carried out as in Example 50.

Example 54

Except that the GS4 was used, the laminating test was carried out as in Example 50.

Example 55

Except that the tensile force to be applied in the MD direction of the graphite film was changed to 5 g/cm, the laminating test was carried out as in Example 54.

Example 56

Except that the tensile force to be applied in the MD direction of the graphite film was changed to 100 g/cm, the laminating test was carried out as in Example 54.

Example 57

Except that the angle b was changed to 0 degree, the laminating test was carried out as in Example 54.

Example 58

Except that the angle b was changed to 5 degrees, the laminating test was carried out as in Example 54.

Example 59

Except that the angle b was changed to 45 degrees, the laminating test was carried out as in Example 54.

Example 60

Except that the angle c was changed to 0 degree, the laminating test was carried out as in Example 54.

Example 61

Except that the angle c was changed to 45 degrees, the laminating test was carried out as in Example 54.

Example 62

Except that the first roll was changed to a crown roll, the laminating test was carried out as in Example 54.

Example 63

Except that the first roll was changed to a crown roll and the second roll was changed to a flat roll, the laminating test was carried out as in Example 54.

Example 64

Except that the PET tape to be used was changed to a separator-free PET tape, the laminating test was carried out as in Example 54.

Example 65

Except that a width of the PET tape was 470 mm, the laminating test was carried out as in Example 54.

Example 66

Except that the GS5 was used, the laminating test was carried out as in Example 50.

Example 67

Except that the GS6 was used, the laminating test was carried out as in Example 50.

Example 68

Except that the GS7 was used, the laminating test was carried out as in Example 50.

Example 69

Except that the GS8 was used, the laminating test was carried out as in Example 50.

Example 70

Except that the GS10 was used and a width of the PET tape was 230 mm, the laminating test was carried out as in Example 50.

Example 71

Except that the GS11 was used and a width of the PET tape was 110 mm, the laminating test was carried out as in Example 50.

Example 72

Except that the GS12 was used, the laminating test was carried out as in Example 71.

Example 73

Except that the GS13 was used, the laminating test was carried out as in Example 71.

Comparative Example 10

Except that the GS14 was used, the laminating test was carried out as in Example 50.

Comparative Example 11

Except that the GS15 was used, the laminating test was carried out as in Example 50.

Comparative Example 12

Except that the GS16 was used, the laminating test was carried out as in Example 50.

Reference Example 4

Except that the GS17 was used, the laminating test was carried out as in Example 50.

TABLE 4

| | | | | | | | | | Average tearing force N | Conditions of sheet having sticky layer or adhesive layer | | |
|---|---|---|---|---|---|---|---|---|---|---|---|---|
| | Type | Sag mm | a mm | Camber mm | Thickness μm | Width mm | Length m | Area m² | | Material | Total thickness μm | Width mm |
| Example 50 | GS1 | 10 | 5 | <1 | 25 | 450 | 35 | 15.8 | 0.010 | PET tape | 10 | 430 |
| Example 51 | GS1 | 10 | 5 | <1 | 25 | 450 | 35 | 15.8 | 0.010 | PET tape | 10 | 430 |
| Example 52 | GS2 | 10 | 2 | <1 | 25 | 450 | 35 | 15.8 | 0.010 | PET tape | 10 | 430 |
| Example 53 | GS3 | 20 | 10 | <1 | 25 | 450 | 35 | 15.8 | 0.010 | PET tape | 10 | 430 |
| Example 54 | GS4 | 40 | 30 | <1 | 25 | 450 | 35 | 15.8 | 0.010 | PET tape | 10 | 430 |
| Example 55 | GS4 | 40 | 30 | <1 | 25 | 450 | 35 | 15.8 | 0.010 | PET tape | 10 | 430 |
| Example 56 | GS4 | 40 | 30 | <1 | 25 | 450 | 35 | 15.8 | 0.010 | PET tape | 10 | 430 |
| Example 57 | GS4 | 40 | 30 | <1 | 25 | 450 | 35 | 15.8 | 0.010 | PET tape | 10 | 430 |
| Example 58 | GS4 | 40 | 30 | <1 | 25 | 450 | 35 | 15.8 | 0.010 | PET tape | 10 | 430 |
| Example 59 | GS4 | 40 | 30 | <1 | 25 | 450 | 35 | 15.8 | 0.010 | PET tape | 10 | 430 |
| Example 60 | GS4 | 40 | 30 | <1 | 25 | 450 | 35 | 15.8 | 0.010 | PET tape | 10 | 430 |
| Example 61 | GS4 | 40 | 30 | <1 | 25 | 450 | 35 | 15.8 | 0.010 | PET tape | 10 | 430 |
| Example 62 | GS4 | 40 | 30 | <1 | 25 | 450 | 35 | 15.8 | 0.050 | PET tape | 10 | 430 |
| Example 63 | GS4 | 40 | 30 | <1 | 25 | 450 | 35 | 15.8 | 0.010 | PET tape | 10 | 430 |
| Example 64 | GS4 | 40 | 30 | <1 | 25 | 450 | 35 | 15.8 | 0.010 | PET tape | 10 | 430 |
| Example 65 | GS4 | 40 | 30 | <1 | 25 | 450 | 35 | 15.8 | 0.010 | PET tape | 10 | 470 |
| Example 66 | GS5 | 40 | 30 | <1 | 25 | 450 | 35 | 15.8 | 0.050 | PET tape | 10 | 430 |
| Example 67 | GS6 | 40 | 2 | <1 | 25 | 450 | 35 | 15.8 | 0.010 | PET tape | 10 | 430 |
| Example 68 | GS7 | 70 | 50 | <1 | 25 | 450 | 35 | 15.8 | 0.010 | PET tape | 10 | 430 |
| Example 69 | GS8 | 70 | 60 | <1 | 25 | 450 | 35 | 15.8 | 0.010 | PET tape | 10 | 430 |
| Example 70 | GS10 | 10 | 5 | <1 | 25 | 250 | 35 | 8.75 | 0.010 | PET tape | 10 | 230 |
| Example 71 | GS11 | 10 | 5 | <1 | 25 | 120 | 35 | 4.2 | 0.010 | PET tape | 10 | 110 |
| Example 72 | GS12 | 10 | 5 | 5 | 25 | 120 | 35 | 4.2 | 0.010 | PET tape | 10 | 110 |
| Example 73 | GS13 | 10 | 5 | 10 | 25 | 120 | 35 | 4.2 | 0.010 | PET tape | 10 | 110 |
| Comparative Example 10 | GS14 | 2 | 2 | <1 | 25 | 450 | 35 | 15.8 | 0.010 | PET tape | 10 | 430 |
| Comparative Example 11 | GS15 | 100 | 60 | <1 | 25 | 450 | 35 | 15.8 | 0.010 | PET tape | 10 | 430 |

TABLE 4-continued

| | | | | | | | | | | | | |
|---|---|---|---|---|---|---|---|---|---|---|---|---|
| Comparative Example 12 | GS16 | 40 | 30 | <1 | 25 | 450 | 35 | 15.8 | 0.120 | PET tape | 10 | 430 |
| Reference Example 4 | GS17 | 2 | 2 | <1 | 50 | 450 | 35 | 15.8 | 0.120 | PET tape | 10 | 430 |

| | Conditions of laminating | | | | | Shapes of rolls | | Rating | | |
|---|---|---|---|---|---|---|---|---|---|---|
| | Tensile | | | | Separator | | | | | Thermal |
| | force g/cm | Speed m/min | b Degree | c Degree | With or without | First roll | Second roll | Splitting | Wrinkling | diffusivity of GS |
| Example 50 | 30 | 1 | 120 | 120 | With | Flat | Crown | B | A | A |
| Example 51 | 100 | 1 | 120 | 120 | With | Flat | Crown | C | A | A |
| Example 52 | 30 | 1 | 120 | 120 | With | Flat | Crown | C | A | A |
| Example 53 | 30 | 1 | 120 | 120 | With | Flat | Crown | B | A | A |
| Example 54 | 30 | 1 | 120 | 120 | With | Flat | Crown | A | A | A |
| Example 55 | 5 | 1 | 120 | 120 | With | Flat | Crown | A | B | A |
| Example 56 | 100 | 1 | 120 | 120 | With | Flat | Crown | A | A | A |
| Example 57 | 30 | 1 | 0 | 120 | With | Flat | Crown | A | D | A |
| Example 58 | 30 | 1 | 5 | 120 | With | Flat | Crown | A | C | A |
| Example 59 | 30 | 1 | 45 | 120 | With | Flat | Crown | A | B | A |
| Example 60 | 30 | 1 | 120 | 0 | With | Flat | Crown | A | D | A |
| Example 61 | 30 | 1 | 120 | 45 | With | Flat | Crown | A | B | A |
| Example 62 | 30 | 1 | 120 | 120 | With | Crown | Flat | A | C | A |
| Example 63 | 30 | 1 | 120 | 120 | With | Crown | Crown | A | B | C |
| Example 64 | 30 | 1 | 120 | 120 | Without | Flat | Crown | A | C | A |
| Example 65 | 30 | 1 | 120 | 120 | With | Flat | Crown | A | B | A |
| Example 66 | 30 | 1 | 120 | 120 | With | Flat | Crown | A | A | C |
| Example 67 | 30 | 1 | 120 | 120 | With | Flat | Crown | C | A | A |
| Example 68 | 30 | 1 | 120 | 120 | With | Flat | Crown | A | B | A |
| Example 69 | 30 | 1 | 120 | 120 | With | Flat | Crown | A | B | A |
| Example 70 | 30 | 1 | 120 | 120 | With | Flat | Crown | A | A | A |
| Example 71 | 30 | 1 | 120 | 120 | With | Flat | Crown | A | A | A |
| Example 72 | 30 | 1 | 120 | 120 | With | Flat | Crown | B | C | A |
| Example 73 | 30 | 1 | 120 | 120 | With | Flat | Crown | C | D | A |
| Comparative Example 10 | 30 | 1 | 120 | 0 | With | Flat | Crown | E | A | A |
| Comparative Example 11 | 30 | 1 | 120 | 0 | With | Flat | Crown | A | E | A |
| Comparative Example 12 | 30 | 1 | 120 | 0 | With | Flat | Crown | A | A | E |
| Reference Example 4 | 30 | 1 | 120 | 0 | With | Flat | Crown | A | A | E |

(5) Die-Cutting Test

Example 74

The die-cutting test as shown in FIG. 6 was carried out. More specifically, the GS1 wrapped around a 3-in. diameter first paper tube, while being rewound around a 3-in. diameter second paper tube placed in parallel with the first paper tube, was punched at the midpoint between the first and second paper tube by using a die with pinnacle dies each measuring 50 mm square and placed in eight lines. The punching was carried out 100 times per minute. A tensile force to be applied in the MD direction of the graphite film was 30 g/cm, and the rewinding speed was 6 m/min. The degree of splitting in the graphite film and the dimensional accuracy of punched products were evaluated.

Example 75

Except that the GS2 was used, the die-cutting test was carried out as in Example 74.

Example 76

Except that the GS3 was used, the die-cutting test was carried out as in Example 74.

Example 77

Except that the GS4 was used, the die-cutting test was carried out as in Example 74.

Example 78

Except that the GS5 was used, the die-cutting test was carried out as in Example 74.

Example 79

Except that the GS6 was used, the die-cutting test was carried out as in Example 74.

Example 80

Except that the GS7 was used, the die-cutting test was carried out as in Example 74.

Example 81

Except that the GS8 was used, the die-cutting test was carried out as in Example 74.

Example 82

Except that the GS10 was used and the pinnacle dies were placed in four lines, the die-cutting test was carried out as in Example 74.

Example 83

Except that the GS11 was used and the pinnacle dies were placed in two lines, the die-cutting test was carried out as in Example 74.

Example 84

Except that the GS12 was used, the die-cutting test was carried out as in Example 83.

Example 85

Except that the GS13 was used, the die-cutting test was carried out as in Example 83.

Comparative Example 13

Except that the GS14 was used, the die-cutting test was carried out as in Example 74.

Comparative Example 14

Except that the GS15 was used, the die-cutting test was carried out as in Example 74.

Comparative Example 15

Except that the GS16 was used, the die-cutting test was carried out as in Example 74.

Reference Example 5

Except that the GS17 was used, the die-cutting test was carried out as in Example 74.

TABLE 5

| | | Conditions of graphite film | | | | | | | Conditions of die-cutting | | | | Rating | | |
|---|---|---|---|---|---|---|---|---|---|---|---|---|---|---|---|
| | Type | Sag mm | a mm | Camber mm | Thickness μm | Width mm | Length m | Area m$^2$ | Average tearing force N | Tensile force g/cm | Speed m/min | Punching size | Line | Splitting | Dimensional Accuracy | Thermal diffusivity of GS |
| Example 74 | GS1 | 10 | 5 | <1 | 25 | 450 | 35 | 15.8 | 0.010 | 30 | 6 | 50 mm square | 8 | B | A | A |
| Example 75 | GS2 | 10 | 2 | <1 | 25 | 450 | 35 | 15.8 | 0.010 | 30 | 6 | 50 mm square | 8 | C | A | A |
| Example 76 | GS3 | 20 | 10 | <1 | 25 | 450 | 35 | 15.8 | 0.010 | 30 | 6 | 50 mm square | 8 | B | A | A |
| Example 77 | GS4 | 40 | 30 | <1 | 25 | 450 | 35 | 15.8 | 0.010 | 30 | 6 | 50 mm square | 8 | A | A | A |
| Example 78 | GS5 | 40 | 30 | <1 | 25 | 450 | 35 | 15.8 | 0.050 | 30 | 6 | 50 mm square | 8 | A | A | C |
| Example 79 | GS6 | 40 | 2 | <1 | 25 | 450 | 35 | 15.8 | 0.010 | 30 | 6 | 50 mm square | 8 | C | A | A |
| Example 80 | GS7 | 70 | 50 | <1 | 25 | 450 | 35 | 15.8 | 0.010 | 30 | 6 | 50 mm square | 8 | A | B | A |
| Example 81 | GS8 | 70 | 60 | <1 | 25 | 450 | 35 | 15.8 | 0.010 | 30 | 6 | 50 mm square | 8 | A | B | A |
| Example 82 | GS10 | 10 | 5 | <1 | 25 | 250 | 35 | 8.75 | 0.010 | 30 | 6 | 50 mm square | 4 | A | A | A |
| Example 83 | GS11 | 10 | 5 | <1 | 25 | 120 | 35 | 4.2 | 0.010 | 30 | 6 | 50 mm square | 2 | A | A | A |
| Example 84 | GS12 | 10 | 5 | 5 | 25 | 120 | 35 | 4.2 | 0.010 | 30 | 6 | 50 mm square | 2 | B | C | A |
| Example 85 | GS13 | 10 | 5 | 10 | 25 | 120 | 35 | 4.2 | 0.010 | 30 | 6 | 50 mm square | 2 | C | D | A |
| Comparative Example 13 | GS14 | 2 | 2 | <1 | 25 | 450 | 35 | 15.8 | 0.010 | 30 | 6 | 50 mm square | 8 | E | A | A |
| Comparative Example 14 | GS15 | 100 | 60 | <1 | 25 | 450 | 35 | 15.8 | 0.010 | 30 | 6 | 50 mm square | 8 | A | E | A |
| Comparative Example 15 | GS16 | 40 | 30 | <1 | 25 | 450 | 35 | 15.8 | 0.120 | 30 | 6 | 50 mm square | 8 | A | A | E |
| Reference Example 5 | GS17 | 2 | 2 | <1 | 50 | 450 | 35 | 15.8 | 0.120 | 30 | 6 | 50 mm square | 8 | A | A | E |

Example 86

To a DMF (dimethyl formamide) solution dissolving 1 equivalent of 4,4'-oxydiani line was dissolved 1 equivalent of pyromellitic dianhydride to obtain a polyamic acid solution (18.5% by weight).

To this solution were added while cooling 1 equivalent of acetic anhydride, 1 equivalent of isoquinoline, and an imidization catalyst including DMF, relative to carboxylic acid groups included in the polyamic acid, and then the mixture was degassed.

The polyamic acid DMF solution prepared in the polymerization step was mixed with a curing agent (acetic anhydride and isoquinoline) in a given ratio by using a blender, and the resulting mixture was continuously flown from the T-die and applied onto the endless belt (surface roughness Ra of 10 µm) to be formed into a thickness of approximately 600 µm. Then, it was dried up by hot air while the belt was rotated. In this process, temperature conditions in the belt chamber were as follows. A temperature of the belt was 120° C. for 4 minutes, and a temperature of the cooling pulley was 70° C. When the mixture varnish was heated, dehydration occurs in its molecules, and imidization reaction proceeded. The self-supporting film (gel film) having a remaining solvent ratio of 46% at the exit of the belt chamber that results from evaporation of the solvent was stripped from the belt, and fixed in a pin frame. The film was subjected to heat treatment for 4 minutes in total at temperatures in the range from 300° C. to 580° C. in the tenter chamber. Thereafter, the film was cooled down to room temperature in the cooling room. Then, the film was stripped from the pin frame and wound. In this manner, a polyimide film A having a thickness of 50 µm was produced. The obtained polyimide film A was such that the amount of warpage was 5 mm. The first side of the polyimide film A was the belt side, and the second side thereof was the air side. A surface roughness Ra of the first side was 43 µm, and a surface roughness Ra of the second side was 36 µm.

Figure 35:
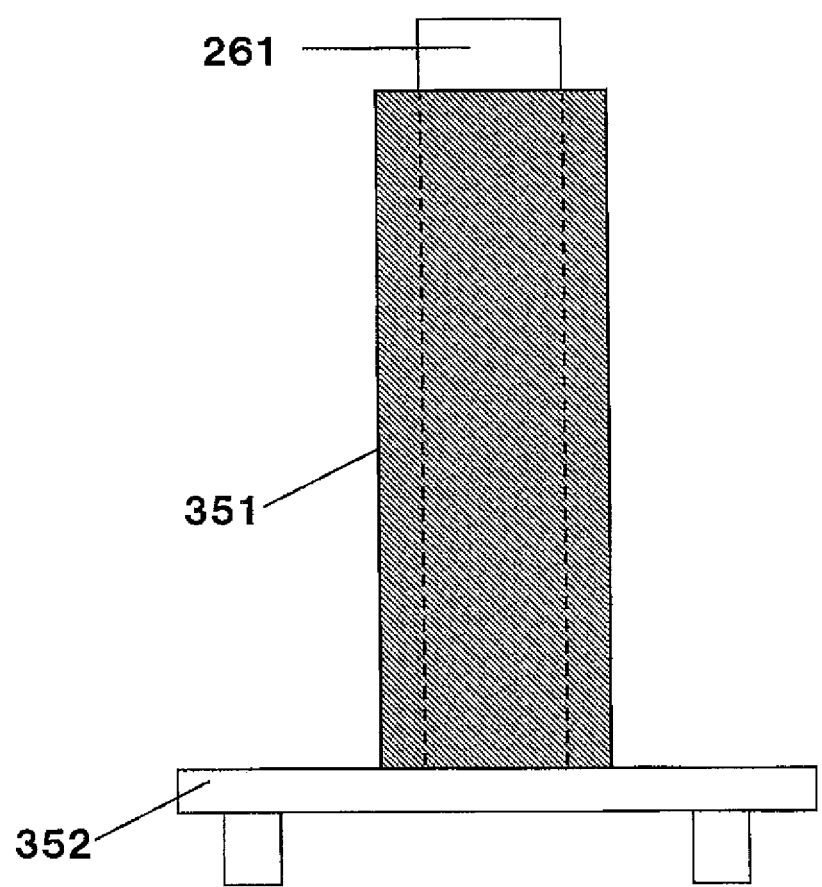
FIG. 35 is a view showing the state of a film vertically set in a furnace in the graphitization step of the present invention.

The polyimide film A having a thickness of 50 µm, a width of 250 mm, and a length of 50 m was wrapped around a cylindrical internal core made of graphite having an external diameter of 100 mm and a length of 300 mm, as shown in FIG. 26, with a first side of the polyimide film A facing inside, and then covered with an external cylinder having an inner diameter of 130 mm. A vessel has several holes, as indicated by reference numeral 264, for allowing the vessel to have ventilation. This vessel was transversely set in an electric furnace. Carbonization treatment was carried out under the conditions where the temperature was increased by 2° C. per minute to reach 1400° C. Next, an obtained carbonized film in the form of a roll was set, as shown in FIG. 35, to the internal core having an external diameter of 100 mm, and this vessel was longitudinally set on a mount in a furnace. Graphitization treatment was carried out under the conditions where the temperature was increased by 5° C. per minute to reach 2900° C.

Figure 36:
FIG. 36 is a view showing deformation of cylindrical shape of a graphite film after the graphitization step.
Figure 36:
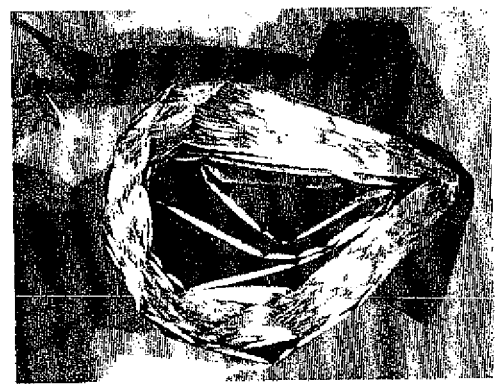

The graphitized film taken out of the furnace was rated as: "C" when the cylindrical shape of the graphitized film was significantly deformed as indicated by reference numeral 362 shown in FIG. 36; "B" when the cylindrical shape of the graphitized film was slightly deformed; and "A" when the cylindrical shape of the graphitized film was not deformed as indicated by reference numeral 361 shown in FIG. 36. Such an evaluation item concerning the cylindrical shape of the graphitized film when taken out of the furnace is referred to as "shape deformation".

Further, in the same methods as in Examples 8, 26, 40, 54, and 77, (1) rewinding test, (2) slitting test, (3) compression test, (4) laminating test, (5) die-cutting test were carried out, respectively.

Example 87

Except that the polyimide film A was wrapped around the internal core with the second side facing inside, the test were carried out as in Example 86.

TABLE 6

| | | Polymer film | | | | | | | Surface roughness Ra | |
| --- | --- | --- | --- | --- | --- | --- | --- | --- | --- | --- |
| | | | | | | | Side at the film production | | | |
| | | | | | | Amount of | | | First | Second |
| | Type | Thickness µm | Width mm | Length m | Area m² | warpage*** mm | First side* | Second side** | side µm | side |
| Example 86 | Polyimide film A | 50 | 250 | 50 | 12.5 | 5 | Belt side | Air side | 43 | 36 |
| Example 87 | Polyimide film A | 50 | 250 | 50 | 12.5 | 5 | Belt side | Air side | 43 | 36 |

| | | Carbonization step | | | Graphitization step | | | | |
| --- | --- | --- | --- | --- | --- | --- | --- | --- | --- |
| | | | | | | | | | Vertical |
| | | Side facing | Vessel | | Maximum | Side facing | Vessel | | Maximum | setting or |
| | | inside at the winding | Type | Diameter mm | temperature ° C. | inside at the winding | Type | Diameter mm | temperature ° C. | transverse setting |
| | Example 86 | First side | Cylinder | 100 | 1400 | First side | Cylinder | 100 | 2900 | Vertical |
| | Example 87 | Second side | Cylinder | 100 | 1400 | Second side | Cylinder | 100 | 2900 | Vertical |

*First side: Side opposite the side in which warpage occurs
**Second side: Side in which warpage occurs
***Amount of warpage: Slit film 100 mm in width was measured

TABLE 7

| | | Physical properties of graphite film | | | | | | | | |
|---|---|---|---|---|---|---|---|---|---|---|
| | Shape deformation | Thermal diffusivity $cm^2/s$ | Sag mm | a mm | Camber mm | Thickness μm | Width mm | Length m | Area $m^2$ | Average tearing force N |
| Example 86 | A | 8.3 | 40 | 30 | <1 | 25 | 225 | 45 | 10.125 | 0.010 |
| Example 87 | C | 8.3 | 40 | 30 | <1 | 25 | 225 | 45 | 10.125 | 0.010 |

| | Rating | | | | | |
|---|---|---|---|---|---|---|
| | (1) Rewinding test | (2) Slitting test | (3) Compression test Splitting | (4) Laminating test | (5) Die-cutting test | Thermal diffusivity of GS |
| Example 86 | A | A | A | A | A | A |
| Example 87 | C | C | C | C | C | A |

<Results>

(1) Rewinding Test

<Sag of Graphite Film in Rewinding Method>

Examples 1, 7, 8, and 15 and Comparative Examples 1 and 2 will be compared.

In Comparative Example 1, since the graphite film had sag of less than 5 mm, stress concentration occurred on the edges of the film, which caused many splits. On the contrary, in Comparative Example 1, no splitting occurred. However, since the graphite film had sag of greater than 80 mm, winding deviation occurred at the winding.

In the Examples 1, 7, 8, and 15, since the graphite film had sag of not less than 5 mm and not greater than 80 mm, which is an appropriate sag range, splitting and winding deviation were less likely to occur. Particularly, in Example 8, splitting and winding deviation did not occur at all.

<Value "a" Obtained by Subtracting (Depth of Sag at Point 30 mm Away from Outer Edge of the Graphite Film in TD Direction) from (Depth of Sag at Outer Edge of the Graphite Film in the TD Direction) in the Rewinding Method>

Examples 1, 7, 8, and 15 and Comparative Examples 1 and 2 will be compared.

In Comparative Example 1, since the graphite film had the value "a" of less than 5 mm, stress was more likely to be applied to the edges of the film, and many splits thus occurred.

In Examples 1, 7, 8, and 15, since the graphite film had the value "a" of not less than 5 mm and not greater than 50 mm, which is an appropriate range of the value "a", splitting was less likely to occur. Particularly, in Example 8, splitting did not occur at all.

Further, comparisons will be made between Examples 1 and 6 and between Examples 8 and 14.

In Examples 1 and 8, the value "a" is as large as not less than 5 mm. Therefore, Examples 1 and 8 could reduce the occurrence of splitting, as compared to Examples 6 and 14, which had the same sags as Examples 1 and 8, respectively.

<Camber of Graphite Film in the Rewinding Method>

Examples 19 and 20 will be compared.

As a result of comparison between Examples 19 and 20, the smaller the camber of the graphite film as 10 mm, 5 mm, and less than 1 mm, the less splitting and winding deviation were likely to occur. Particularly, in Example 19, splitting and winding deviation did not occur at all.

<Tearing Strength in the Rewinding Method>

Examples 1, 7, 8, 13, and 15, Comparative Examples 1 and 3, and Reference Example 1 will be compared.

As is clear from the comparison to Comparative Example 1, rewinding can be carried out even with the graphite films having low tearing strength, specifically, as in Examples 1, 7, 8, 13, and 15, without suffering from defects like splitting and winding deviation. This is because these graphite films were adjusted to have sag of not less than 5 mm and not greater than 80 mm and the value "a" of not less than 5 mm and not greater than 50 mm.

Note that the graphite films in Reference Example 1 and Comparative Example 3 are free from the problem of low tearing strength, but have low thermal diffusivities, as compared to the graphite film of the present invention.

<Rewinding Tensile Force in the Rewinding Method>

Examples 1 through 4 and Examples 8 through 11 will be compared.

As is clear from the comparisons of Examples 1 through 4 and Examples 8 through 11, it was possible to reduce winding deviation by increasing the rewinding tensile force to 5 g/cm, 30 g/cm, 100 g/cm, and 400 g/cm. As is clear from the comparison between Examples 1 through 4 and Examples 8 through 11, the larger the sag and the value "a", the more the occurrence of splitting that increases with increase of the tensile force could be reduced.

<Rewinding Speed in the Rewinding Method>

Comparisons will be made between Examples 1 and 5 between Examples 8 and 12. As is clear from the comparisons between Examples 1 and 5 and between Examples 8 and 12, even when the rewinding speed was increased to 5 m/min and 20 m/min, the larger the sag and the value "a", the less splitting and winding deviation were likely to occur.

<Thickness of Graphite Film in the Rewinding Method>

Examples 8 and 17 will be compared. When the graphite films had the same degree of sag, they could be rewound in the same manner regardless of whether the thickness is 25 μm or 40 μm.

<Width of Graphite Film in the Rewinding Method>

Examples 1, 18, and 19 will be compared. Even when the width is as large as 450 mm, excellent results could be obtained due to selection of the tag and the value "a". However, as is clear from the comparison of Examples 1, 18, and 19, when the width was increased to 250 mm and 120 mm with the sag and the value "a" being equal, less splitting occurred.

(2) Slitting Test

<Sag of Graphite Film in the Slitting Step>

Examples 22, 25, 26, and 30 and Comparative Examples 4 and 5 will be compared. In Comparative Example 4, since the sag of the graphite film was less than 5 mm, stress concentration occurred on the edges of the film, which caused many splits. On the contrary, in Comparative Example 5, no splitting occurred. However, since the graphite film had sag of greater than 80 mm, winding deviation occurred.

In Examples 22, 25, 26, and 30, since the graphite film had sag of not less than 5 mm and not greater 5 than 80 mm, which is an appropriate sag range, splitting and winding deviation were less likely to occur. Particularly in Example 26, splitting and winding deviation did not occur at all.

<Value "a" Obtained by Subtracting (Depth of Sag at Point 30 mm Away from Outer Edge of the Graphite Film in TD Direct Ion) from (Depth of Sag at Outer Edge of the Graphite Film in the TD Direction) in the Slitting Step>

Examples 22, 25, 26, and 30 and Comparative Examples 4 and 5 will be compared.

In Comparative Example 4, since the graphite film had the value "a" of less than 5 mm, stress was more likely to be applied to the edges of the film, and many splits thus occurred.

In Examples 22, 25, 26, and 30, since the graphite film had the value "a" of not less than 5 mm and not greater than 50 mm, which is an appropriate range of the value "a", splitting was less likely to occur. Particularly, in Example 26, splitting did not occur at all.

Further, comparisons will be made between Examples 22 and 24 and between Examples 26 and 29.

In Examples 22 and 26, the value "a" is as large as not less than 5 mm. Therefore, Examples 22 and 26 could reduce the occurrence of splitting, as compared to Examples 24 and 29, which had the same sags as Examples 22 and 26, respectively.

<Camber of Graphite Film in the Slitting Step>
Examples 32 through 34 will be compared.

As a result of comparison of Examples 32 through 34, the smaller the camber of the graphite film as 10 mm, 5 mm, and less than 1 mm, the less splitting and winding deviation were likely to occur. Particularly, in Example 32, splitting and winding deviation did not occur at all.

<Tearing Strength in the Slitting Step>
Examples 22, 25, 26, 28, and 30, Comparative Examples 4 and 6, and Reference Example 2 will be compared. As is clear from the comparison to Comparative Example 4, the slitting step could be carried out even with the graphite films having low tearing strength, specifically, as in Examples 22, 25, 26, 28, and 30, without suffering from defects like splitting and winding deviation. This is because these graphite films were adjusted to have sag of not less than 5 mm and not greater than 80 mm and the value "a" of not less than 5 mm and not greater than 50 mm.

Note that the graphite films in Reference Example 2 and Comparative Example 6 are free from the problem of low tearing strength, but have low thermal diffusivities, as compared to the graphite film of the present invention.

<Type of Slitter in the Slitting Step>
Comparisons will be made between Examples 22 and 23 and between Examples 26 and 27. In Examples 22 and 26, less splitting and a smaller number of edge burrs occurred, as compared with the cases where the straight cutter was used with all other things being equal. This is because the roll cutter, which is rotated to slit, is less likely to cause load on the film.

(3) Compression Test
<Sag of Graphite Film in the Compression Step>
Examples 35, 39, 40, and 45 and Comparative Examples 7 and 8 will be compared.

In Comparative Example 7, since the sag of the graphite film was less than 5 mm, stress concentration occurred on the edges of the film, which caused many splits. On the contrary, in Comparative Example 8, no splitting occurred. However, since the graphite film had sag of greater than 80 mm, winding deviation occurred.

In Examples 35, 39, 40, and 45, since the graphite film had sag of not less than 5 mm and not greater than 80 mm, which is an appropriate sag range, splitting and winding deviation were less likely to occur. Particularly in Example 40, splitting and winding deviation did not occur at all.

<Value "a" Obtained by Subtracting (Depth of Sag at Point 30 mm Away from Outer Edge of the Graphite Film in TD Direction) from (Depth of Sag at Outer Edge of the Graphite Film in the TD Direction) in the Compression Step>

Examples 35, 39, 40, and 45 and Comparative Examples 7 and 8 will be compared.

In Comparative Example 7, since the graphite film had the value "a" of less than 5 mm, stress was more likely to be applied to the edges of the film, and many splits thus occurred.

In Examples 35, 39, 40, and 45, since the graphite film had the value "a" of not less than 5 mm and not greater than 50 mm, which is an appropriate range of the value "a", splitting was less likely to occur. Particularly, in Example 40, splitting did not occur at all.

Further, comparisons will be made between Examples 35 and 38 and between Examples 40 and 44.

In Examples 35 and 40, the value "a" is as large as not less than 5 mm. Therefore, Examples 35 and 40 could reduce the occurrence of splitting, as compared to Examples 38 and 44, which had the same sags as Examples 35 and 40, respectively.

<Camber of Graphite Film in the Compression Step>
Examples 47 through 49 will be compared.

As a result of comparison of Examples 47 through 49, the smaller the camber of the graphite film as 10 mm, 5 mm, and less than 1 mm, the less splitting and winding deviation were likely to occur. Particularly, in Example 47, splitting and winding deviation did not occur at all.

<Tearing Strength in the Compression Step>
Examples 35, 39, 40, 43, and 45, Comparative Examples 7 and 9, and Reference Example 3 will be compared.

As is clear from the comparison to Comparative Example 7, the compression step can be carried out even with the graphite films having low tearing strength, specifically, as in Examples 35, 39, 40, 43, and 45, without suffering from defects like splitting and winding deviation. This is because these graphite films were adjusted to have sag of not less than 5 mm and not greater than 80 mm and the value "a" of not less than 5 mm and not greater than 50 mm.

Note that the graphite films in Reference Example 3 and Comparative Example 9 are free from the problem of low tearing strength, but have low thermal diffusivities, as compared to the graphite film of the present invention.

<Compression Method in the Compression Step>
Comparisons will be made between Examples 35 and 36 and between Examples 40 and 41.

In Example 36, the rolling mill was used, which is less likely to cause load on the graphite film. Therefore, the graphite film in Example 36 was less likely to suffer from splitting, as compared to the graphite film in Example 35 pressed by the single-plate continuous press, under the same conditions. On the contrary, in the Example 40 having great sag and a large value "a", splitting could be reduced although the single-plate continuous press was used.

Comparisons will be made between Examples 36 and 37 and between Examples 41 and 42. In Examples 37 and 42, high tensile force was applied, Therefore, the problem of winding wrinkles was improved, as compared to Examples 36 and 41 other conditions of which were the same as those of Examples 37 and 42, respectively. In Examples 37 and 42, since the sag and the value "a" were in appropriate ranges, no splitting occurred despite a high tensile force applied.

(4) Laminating Test

<Sag of Graphite Film in the Laminating Step>

Examples 50, 53, 54, and 68 and Comparative Examples 10 and 11 will be compared.

In Comparative Example 10, since the sag of the graphite film was less than 5 mm, stress concentration occurred on the edges of the film, which caused many splits. On the contrary, in Comparative Example 11, no splitting occurred. However, since the graphite film had sag of greater than 80 mm, wrinkles occurred at the laminating.

In Examples 50, 53, 54, and 68, since the graphite film had sag of not less than 5 mm and not greater than 80 mm, which is an appropriate sag range, splitting and laminating wrinkles were less likely to occur. Particularly in Example 54, splitting and laminating wrinkles did not occur at all.

<Value "a" Obtained by Subtracting (Depth of Sag at Point 30 mm Away from Outer Edge of the Graphite Film in TD Direction) from (Depth of Sag at Outer Edge of the Graphite Film in the TD Direction) in the Laminating Step>

Examples 50, 53, 54, and 68 and Comparative Examples 10 and 11 will be compared.

In Comparative Example 10, since the graphite film had the value "a" of less than 5 mm, stress was more likely to be applied to the edges of the film, and many splits thus occurred.

In Examples 50, 53, 54, and 68, since the graphite film had the value "a" of not less than 5 mm and not greater than 50 mm, which is an appropriate range of the value "a", splitting was less likely to occur. Particularly, in Example 54, splitting did not occur at all.

Further, comparisons will be made between Examples 50 and 52 and between Examples 54 and 67.

In Examples 50 and 54, the value "a" is as large as not less than 5 mm. Therefore, Examples 50 and 54 could reduce the occurrence of splitting, as compared to Examples 52 and 67, which had the same sags as Examples 50 and 54, respectively.

<Camber of Graphite Film in the Laminating Step>

Examples 71 through 73 will be compared.

As a result of comparison of Examples 71 through 73, the smaller the camber of the graphite film as 10 mm, 5 mm, and less than 1 mm, the less splitting and laminating wrinkles were likely to occur. Particularly, in Example 71, splitting and laminating wrinkles did not occur at all.

<Tearing Strength in the Laminating Step>

Examples 50, 53, 54, 66, and 68, Comparative Examples 10 and 12, and Reference Example 4 will be compared.

As is clear from the comparison to Comparative Example 10, the laminating step can be carried out even with the graphite films having low tearing strength, specifically, as in Examples 50, 53, 54, 66, and 68, without suffering from defects like splitting and winding deviation. This is because these graphite films were adjusted to have sag of not less than 5 mm and not greater than 80 mm and the value "a" of not less than 5 mm and not greater than 50 mm.

Note that the graphite films in Reference Example 4 and Comparative Example 12 are free from the problem of low tearing strength, but have low thermal diffusivities, as compared to the graphite film of the present invention.

<Angle b Formed by Line Contacting Starting Point of Contact Between the Graphite Film and First Roll and Center Point of First Roll and Line Connecting Center Point of First Roll and Point of Contact Between First Roll and Second Roll>

Examples 54, 57, 58, and 59 will be compared. As in Example 59, when the graphite film was directly supplied, at the angle b of 0, without contact with the first roll, many laminating wrinkles occurred. As in Examples 58, 59, and 54, when the angle b was increased, the occurrence of laminating wrinkles could be reduced. Particularly, when the angle b was set to not less than 45 degrees, laminating wrinkles decreased. This is because when the graphite film was supplied in contact with the roll, the film could reach a laminating point in such a state that the uneven surface of the graphite film was reduced.

<Angle c Formed by Line Connecting (Starting Point of Contact Between the Second Roll and the Sheet Having Self-Adhesive Layer or Adhesive Layer) and (Center Point of the Second Roll) and Line Connecting (Center Point of the Second Roll) and (Point of Contact Between the First Roll and the Second Roll)>

Examples 54, 60, and 61 will be compared. As in Example 60, when the sheet having the self-adhesive layer or the adhesive layer was directly supplied, at the angle c of 0, without contact with the second roll, many laminating wrinkles occurred. As in Examples 60 and 54, when the angle c was increased, the occurrence of laminating wrinkles could be reduced. This is because when the sheet having the self-adhesive layer or the adhesive layer is supplied in contact with the roll, the film can reach the laminating point in such a state that the sheet is stretched.

<Presence or Absence of Separator>

Examples 54 and 64 will be compared. It was found that as in Example 54, when the laminating was carried out while the separator was peeled from the sheet having the self-adhesive layer or adhesive layer, a smaller number of laminating wrinkles occurred, as compared to Example 64 using the separator-free sheet.

<Width of the Sheet Having Self-Adhesive Layer or Adhesive Layer>

Examples 54 and 65 will be compared. In Example 54, since the width of the sheet having the self-adhesive layer or the adhesive layer is smaller than the width of the graphite film to be bonded thereto, laminating could be carried out with stability.

<Tensile Force in the Laminating Step>

Comparison between Examples 50 and 51 and Examples 54 through 56 will be made. In Examples 50 and 51, owing to small sag, splitting was more likely to occur with increase of the tensile force. On the contrary, in Examples 54 through 56, since the sag is large to some degree, almost no splitting occurred with increase of the tensile force.

Further, in Examples 50 and 51 and Examples 54 through 56, when the tensile force was increased, wrinkles tended to be less likely to occur.

<Shapes of Rolls>

Examples 54, 62, and 63 will be compared. As in Examples 54 and 63, when one of the rolls is flat, laminating wrinkles could be reduced, as compared to Example 62 where both of the rolls were crown rolls. Particularly, in Example 54, in cases where the first roll contacting the graphite film is a flat roll, laminating could be made with occurrence of extremely small number of wrinkles occurred at the laminating.

(5) Die-Cutting Test

<Sag of Graphite Film in the Die-Cutting Step>

Examples 74, 76, 77, and 80 and Comparative Examples 13 and 14 will be compared.

In Comparative Example 13, since the sag of the graphite film was less than 5 mm, stress concentration occurred on the edges of the film, which caused many splits. On the contrary, in Comparative Example 14, no splitting occurred. However, since the graphite film had sag of greater than 80 mm, accuracy of punching decreased.

In Examples 74, 76, 77, and 80, since the graphite film had sag of not less than 5 mm and not greater than 80 mm, which is an appropriate sag range, splitting and poor dimensional accuracy of the graphite die-cutting product were less likely to occur. Particularly in Example 77, splitting and poor dimensional accuracy of the graphite die-cutting product did not occur at all.

<Value "a" Obtained by Subtracting (Depth of Sag at Point 30 mm Away from Outer Edge of the Graphite Film in TD Direction) from (Depth of Sag at Outer Edge of the Graphite Film in the TD Direction) in the Die-Cutting Step>

Examples 74, 76, 77, and 80 and Comparative Examples 13 and 14 will be compared.

In Comparative Example 13, since the graphite film had the value "a" of less than 5 mm, stress was more likely to be applied to the edges of the film, and many splits thus occurred.

In Examples 74, 76, 77, and 80, since the graphite film had the value "a" of not less than 5 mm and not greater than 50 mm, which is an appropriate range of the value "a", splitting was less likely to occur. Particularly, in Example 77, splitting did not occur at all.

Further, comparisons will be made between Examples 74 and 75 and between Examples 77 and 79.

In Examples 74 and 77, the value "a" is as large as not less than 5 mm. Therefore, Examples 74 and 77 could reduce the occurrence of splitting, as compared to Examples 75 and 79, which had the same sags as Examples 74 and 77, respectively.

<Camber of Graphite Film in the Die-Cutting Step>

Examples 83 through 85 will be compared.

As a result of comparison of Examples 83 through 85, the smaller the camber of the graphite film as 10 mm, 5 mm, and less than 1 mm, the less splitting and poor dimensional accuracy of the graphite die-cutting product were likely to occur. Particularly, in Example 83, splitting and poor dimensional accuracy of the graphite die-cutting product did not occur at all.

<Tearing Strength in the Die-Cutting Step>

Examples 74, 76, 77, 78, and 80, Comparative Examples 13 and 15, and Reference Example 5 will be compared. As is clear from the comparison to Comparative Example 13, the die-cutting step could be carried out even with the graphite films having low tearing strength, specifically, as in Examples 74, 76, 77, 78, and 80, without suffering from defects like splitting and poor dimensional accuracy of the graphite die-cutting product. This is because these graphite films were adjusted to have sag of not less than 5 mm and not greater than 80 mm and the value "a" of not less than 5 mm and not greater than 50 mm.

Note that the graphite films in Reference Example 5 and Comparative Example 15 are free from the problem of low tearing strength, but have low thermal diffusivities, as compared to the graphite film of the present invention.

With regard to the GS18 through 20, because they have too large sag and too large value "a", great number of defects, such as splitting, winding deviation, folding wrinkles, laminating wrinkles, and poor dimensional accuracy, occurred in the rewinding test, the slitting test, the compression test, the laminating test, and the die-cutting test.

<Graphite Film Prepared after the Roll of Polymer Film was Screened to Make Sure that the Polymer Film was Wrapped with its First Side Facing Inside the Roll>

Comparison will be made between Example 86 using the graphite film prepared by subjecting the polymer film to heat treatment in such a state that the polymer film was wound with its first side facing inside and Example 87 using the graphite film prepared by subjecting the polymer film to heat treatment in such a state that the polymer film was wrapped with its second side facing inside.

As shown in Table 1, with regard to Example 86 in which the polymer film was subjected to heat treatment in such a state that the polymer film was wrapped with its first side facing inside, the cylindrical shape of the graphite film thus obtained was not deformed. Moreover, almost no splitting occurred in the variety of tests. On the contrary, with regard to Example 87 in which the polymer film was subjected to heat treatment in such a state that the polymer film was wrapped with its second side facing inside, the cylindrical shape of the graphite film was significantly deformed as indicated by reference numeral 362 in FIG. 36. In addition, splitting occurred at the edges of the film when the graphite film was just stretched. Moreover, many splits occurred in the variety of tests, and the graphite film exhibited extremely poor handleability.

INDUSTRIAL APPLICABILITY

The present invention is the one for al lowing a graphite film showing extremely low average tearing force to be processed with less defects caused in the processing step.

According to a method for rewinding a graphite film of the present invention, a graphite film can be rewound without suffering from splitting.

Further, according to a method for rewinding a graphite film of the present invent ion, a graphite film can be rewound without suffering from winding deviation.

Still further, according to a method for producing a graphite film of the present invent ion, a graphite film can be produced without suffering from splitting.

Yet further, according to a method for producing a graphite film of the present invention, a graphite film can be produced without suffering from winding deviation.

Further, according to a method for producing a graphite film of the present invent ion, a graphite film can be produced without suffering from defects at the edges thereof.

Still further, according to a method for producing a graphite composite film of the present invention, the occurrence of wrinkling can be reduced at the lamination of a graphite film to a self-adhesive material layer or the like object to be laminated to the graphite film.

Yet further, according to a method for producing a graphite composite film of the present invention, the occurrence of winding deviation can be reduced at the lamination of a graphite film to a self-adhesive material layer or the like object to be laminated to the graphite film.

Further, according to a method for producing a graphite composite film of the present invention, the occurrence of splitting can be reduced at the lamination of a graphite film to a self-adhesive material layer or the like object to be laminated to the graphite film.

Still further, according to a method for producing a graphite-film die-cutting product of the present invention, the occurrence of splitting can be reduced.

Yet further, according to a method for producing a graphite-film die-cutting product of the present invention, the occurrence of poor dimensional accuracy can be reduced.

REFERENCE SIGNS LIST

11 Graphite film
12 Wind-off roll
13 Wind-up roll
14 Distance between rolls
21 Roll cuter (upper cutter) for slitting
22 Roll cuter (lower cutter) for slitting
31 Die (upper die) of single-plate continuous press
32 Die (lower die) of single-plate continuous press
41 Rolling-mill roll (upper roll)
42 Rolling-mill roll (lower roll)
51 Sheet having a self-adhesive layer or adhesive layer
52 Wind-off roll for the sheet having the self-adhesive layer or adhesive layer
53 First roll
54 Second roll
55 Separator
56 Wind-up roll for separator
57 Bar as a trigger at which peeling of the separator is started
58 PET tape with separator
59 Width of the graphite film
510 Width of the sheet having the self-adhesive layer or adhesive layer
61 Die-cutting die
62 Pinnacle cutter
71 Roll 1
72 Roll 2
73 Graphite film
74 Suspended line
75 Sag
81 Sag at an outer edge
82 Sag at a point 30 mm away from the outer edge
91 Table
92 Graphite film
93 Positions of a ruler
101 Supplied without contact with the first roll
102 Supplied in contact with the first roll
103 First roll
104 Soft film that cannot be supplied in a flat state or film having great sag
111 Graphite film
112 First roll
113 Angle formed by a line connecting (the starting point of contact between the first roll and the graphite film) and (the center point of the first roll) and a line connecting (the center point of the first roll) and (the point of contact between the first roll and the second roll)
114 Starting point of contact between the first roll and the graphite film
115 Center point of the first roll
116 Point of contact between the first roll and the second roll
131 Crown roll
132 Diameter in the middle of the roll
133 Diameter at a distance equivalent to one-fourth of the roll
141 PET tape (protective tape)
142 Graphite film
143 Double-faced tape (adhesive tape)
144 Separator
171 Graphite die-cutting product
172 Sticker-bearing separator
181 Splitting of graphite film
191 Winding deviation of graphite film
201 Edge burr of graphite film
211 Folding wrinkles of graphite film
221 Graphite composite film
222 Enlarged view
223 Laminating wrinkles
231 Graphite film having sag of 10 mm
232 Graphite film having sag of 40 mm
233 Graphite film having sag of 80 mm
241 Short
242 Long
261 Cylindrical internal core made of graphite
262 External cylinder
263 Polyimide film wrapped around the cylindrical core
264 Apertures for ventilation
271 Carbonized film
272 Anchorage
281 Roll end facing an inner core
282 External roll end
291 Punching cutter
292 Stage
293 Feed roller
294 Separated graphite film
301 Upward warpage
302 Downward warpage
311 Case where a film is sagged in the middle
312 Case where a film is sagged at the edges
313 Sag in the middle of the film
314 Sag at the edge of the film
321 Outward warpage of a roll of film
322 Inward warpage of a roll of film
3310 Belt chamber
3312 T-die
3314 Endless belt
3316 Gel film
3318 Tenter chamber
3320 Heating furnace
3322 Slow-cooling furnace
3324 Polyimide film
3326 Cooling pulley
341 Splitting
351 Carbonized film
352 Mount
361 Graphite film without deformed cylindrical shape
362 Graphite film with deformed cylindrical shape

The invention claimed is:

1. A method for producing a graphite composite film, comprising:
a step of laminating a graphite film to a sheet having a self-adhesive layer or adhesive layer, wherein;
an angle b formed by a line connecting a starting point of contact between the graphite film and a first roll and a center point of the first roll and a line connecting the center point of the first roll and a point of contact between the first roll and a second roll is not less than 5 degrees; and
an angle c formed by a line connecting (a starting point of contact between the second roll and the sheet having the self-adhesive layer or adhesive layer) and (a center point of the second roll) and a line connecting (the center point of the second roll) and (the point of contact between the first roll and the second roll) is not less than 5 degrees.

2. The method according to claim 1, wherein the angle b is not less than 45 degrees.

3. The method according to claim 1, wherein the sheet having the self-adhesive layer or adhesive layer has a thickness of not more than 60 µm.

4. The method according to claim 2, wherein the sheet having the self-adhesive layer or adhesive layer has a thickness of not more than 60 µm.

5. The method according to claim 1, wherein the sheet having the self-adhesive layer or adhesive layer has a separator laminated on a self-adhesive surface or an adhesive surface thereof.

6. The method according to claim 5, wherein:
the sheet having the self-adhesive layer or the adhesive layer is continuously supplied between the first roll and the second roll while the separator is peeled off from the sheet; and
an angle at which the separator is peeled off from the sheet is not greater than 90 degrees.

7. The method according to claim 1, wherein (a length of the sheet having the self-adhesive layer or adhesive layer in a TD direction) is smaller than (a length of the graphite film in the TD direction).

8. The method according to claim 1, wherein the first roll and the second roll are a combination of a crown roll and a flat roll.

9. The method according to claim 8, wherein the first roll and the second roll are a flat roll and a crown roll, respectively.

10. The method according to claim 1, wherein the step of laminating the graphite film is carried out at any position between a location where the graphite film wrapped around one roll is wound off and a location where the graphite film is wound up around another roll.

11. A method for producing a graphite composite film, comprising:
a step of laminating, to each other, a graphite film and a sheet having a self-adhesive layer or adhesive layer, the step being carried out while the graphite film and the sheet are supplied between a first roll and a second roll, wherein:
the first roll and the second roll are a flat roll and a crown roll, respectively; and
the first roll is a roll placed on a side of the graphite film, whereas the second roll is a roll placed on a side of the sheet having the self-adhesive layer or adhesive layer.

12. A method for producing a graphite composite film, comprising:
a step of laminating, to each other, a graphite film and a sheet having a self-adhesive layer or adhesive layer, the step being carried out while the graphite film and the sheet are supplied between a first roll and a second roll, wherein:
the first roll and the second roll are a combination of a crown roll and a flat roll; and
(a length of the sheet having the self-adhesive layer or adhesive layer in a TD direction) is smaller than (a length of the graphite film in the TD direction).

13. The method according to claim 12, wherein,
the first roll and the second roll are a flat roll and a crown roll, respectively; and
the first roll is a roll placed on a side of the graphite film, whereas the second roll is a roll placed on a side of the sheet having the self-adhesive layer or adhesive layer.

14. The method according to claim 11, wherein,
in the step of laminating the graphite film and the sheet to each other, the graphite film and the sheet are continuously supplied between the first roll and the second roll.

15. The method according to claim 11, wherein,
the sheet having the self-adhesive layer or adhesive layer has a separator laminated on a self-adhesive surface or an adhesive surface thereof.

16. The method according to claim 15, wherein,
the sheet having the self-adhesive layer or the adhesive layer is continuously supplied between the first roll and the second roll while the separator is peeled off from the sheet.

17. The method according to claim 16, wherein,
an angle at which the separator is peeled off from the sheet is not greater than 90 degrees.

18. The method according to claim 11, wherein,
(a length of the sheet having the self-adhesive layer or adhesive layer in a TD direction) is smaller than (a length of the graphite film in the TD direction).

19. The method according to claim 11, wherein,
an angle b formed by a line connecting a starting point of contact between the graphite film and the first roll and a center point of the first roll and a line connecting the center point of the first roll and a point of contact between the first roll and the second roll is not less than 5 degrees.

20. The method according to claim 11, wherein,
the step of laminating the graphite film and the sheet is carried out at any position between a location where the graphite film wrapped around one roll is wound off and a location where the graphite film is wound up around another roll.

* * * * *